(12) United States Patent
Mizuno

(10) Patent No.: US 7,613,352 B2
(45) Date of Patent: Nov. 3, 2009

(54) COMPRESSION ENCODER

(75) Inventor: Yusuke Mizuno, Osaka (JP)

(73) Assignee: Mega Chips LSI Solutions Inc., Osaka-shi (JP)

( * ) Notice: Subject to any disclaimer, the term of this patent is extended or adjusted under 35 U.S.C. 154(b) by 864 days.

(21) Appl. No.: 11/004,905

(22) Filed: Dec. 7, 2004

(65) Prior Publication Data

US 2005/0141773 A1 Jun. 30, 2005

(30) Foreign Application Priority Data

Dec. 26, 2003 (JP) ............................. 2003-433362

(51) Int. Cl.
*G06K 9/46* (2006.01)
(52) U.S. Cl. .................. 382/240; 382/232; 382/233; 382/251
(58) Field of Classification Search ................ 382/240, 382/248, 166, 251, 233, 242, 232; 348/395.1, 348/398.1; 375/E7.048, E7.051
See application file for complete search history.

(56) References Cited

U.S. PATENT DOCUMENTS 6,778,709 B1 * 8/2004 Taubman .................... 382/240

FOREIGN PATENT DOCUMENTS

| JP | 2000-41249 | 2/2000 |
| JP | 2002-165098 | 6/2002 |
| JP | 2003153228 | * 5/2003 |

OTHER PUBLICATIONS

David S. Taubman, et al., "JPEG2000 Image Compression Fundamentals, Standards, and Practice", Kluwer Academic Publishers, 4 cover pages, p. 142, pp. 192 and 193, 1 page chapter 16, and pp. 626 through 631, 2002.
"JPEG 2000 Part 1 FDIS (includes COR 1, COR 2, and DCOR 3)", ISO/IEC JTC 1/SC 29/WG1 (ITU-T SG8) N2406, Dec. 4, 2001, 2 cover pages, pp. i-iii, pp. 214-217.
U.S. Appl. No. 11/333,280, filed Jan. 18, 2006, Mizuno.

* cited by examiner

*Primary Examiner*—Anh Hong Do
(74) *Attorney, Agent, or Firm*—Oblon, Spivak, McClelland, Maier & Neustadt, L.L.P.

(57) ABSTRACT

A DWT unit applies wavelet transform to an input signal to output transform coefficients, and a quantization unit quantizes those transform coefficients with a quantization step size determined according to target image quality. Then, a rate control unit controls the rate of coded data according to information on the quantization step size. Also, an image-quality control unit controls the rate of only part of coded data which is determined from a priority table. This achieves a compression encoder which operates at high speed with minimal operations.

54 Claims, 45 Drawing Sheets

FIG. 2    Table J-24 — Recommended frequency weighting

| level | Viewing distance 1000 | | | Viewing distance 2000 | | | Viewing distance 4000 | | |
|---|---|---|---|---|---|---|---|---|---|
| | HL | LH | HH | HL | LH | HH | HL | LH | HH |
| 5 | 1 | 1 | 1 | 1 | 1 | 1 | 1 | 1 | 1 |
| 4 | 1 | 1 | 1 | 1 | 1 | 1 | 1 | 1 | 0,731 668 |
| 3 | 1 | 1 | 0,727 172 | 1 | 1 | 0,727 203 | 0,564 344 | 0,564 344 | 0,285 968 |
| 2 | 0,560 805 | 0,560 805 | 0,284 173 | 0,560 841 | 0,560 841 | 0,284 193 | 0,179 609 | 0,179 609 | 0,043 903 |
| 1 | 0,178 494 | 0,178 494 | 0,043 631 | 0,014 774 | 0,014 774 | 0,000 573 | | | |

F I G. 3

Table J-25  Recommended frequency weighting for multiple component (colour) images

| Comp | Lev | Viewing distance 1000 | | | Viewing distance 1700 | | | Viewing distance 3000 | | |
|---|---|---|---|---|---|---|---|---|---|---|
| | | HL | LH | HH | HL | LH | HH | HL | LH | HH |
| Y (Y0) | 5 | 1 | 1 | 1 | 1 | 1 | 1 | 1 | 1 | 1 |
| | 4 | 1 | 1 | 1 | 1 | 1 | 1 | 1 | 1 | 1 |
| | 3 | 1 | 1 | 1 | 1 | 1 | 1 | 0,921 045 | 0,921 045 | 0,848 324 |
| | 2 | 0,998 276 | 0,998 276 | 0,996 555 | 0,861 593 | 0,861 593 | 0,742 342 | 0,410 628 | 0,410 628 | 0,182 760 |
| | 1 | 0,756 353 | 0,756 353 | 0,573 057 | 0,307 191 | 0,307 191 | 0,108 920 | 0,038 487 | 0,038 487 | 0,003 075 |
| Cb (Y1) | 5 | 0,883 196 | 0,883 196 | 0,833 582 | 0,818 766 | 0,818 766 | 0,745 875 | 0,717 086 | 0,717 086 | 0,613 777 |
| | 4 | 0,793 487 | 0,793 487 | 0,712 295 | 0,689 404 | 0,689 404 | 0,579 220 | 0,539 437 | 0,539 437 | 0,403 353 |
| | 3 | 0,650 482 | 0,650 482 | 0,531 700 | 0,501 652 | 0,501 652 | 0,362 279 | 0,319 773 | 0,319 773 | 0,185 609 |
| | 2 | 0,450 739 | 0,450 739 | 0,309 177 | 0,280 068 | 0,280 068 | 0,152 290 | 0,124 021 | 0,124 021 | 0,044 711 |
| | 1 | 0,230 503 | 0,230 503 | 0,113 786 | 0,097 816 | 0,097 816 | 0,031 179 | 0,023 308 | 0,023 308 | 0,003 413 |

F I G . 4

Table J-25 — Recommended frequency weighting for multiple component (colour) images   (continued)

| Comp | Lev | Viewing distance 1000 | | | Viewing distance 1700 | | | Viewing distance 3000 | | |
|---|---|---|---|---|---|---|---|---|---|---|
| | | HL | LH | HH | HL | LH | HH | HL | LH | HH |
| Cr (Y2) | 5 | 0,910 877 | 0,910 877 | 0,872 378 | 0,860 885 | 0,860 885 | 0,803 172 | 0,780 091 | 0,780 091 | 0,695 128 |
| | 4 | 0,841 032 | 0,841 032 | 0,776 180 | 0,757 626 | 0,757 626 | 0,665 951 | 0,631 632 | 0,631 632 | 0,509 729 |
| | 3 | 0,725 657 | 0,725 657 | 0,625 103 | 0,598 537 | 0,598 537 | 0,470 893 | 0,428 659 | 0,428 659 | 0,287 593 |
| | 2 | 0,552 901 | 0,552 901 | 0,418 938 | 0,388 492 | 0,388 492 | 0,248 566 | 0,211 871 | 0,211 871 | 0,100 658 |
| | 1 | 0,336 166 | 0,336 166 | 0,200 507 | 0,177 435 | 0,177 435 | 0,077 130 | 0,060 277 | 0,060 277 | 0,014 977 |

FIG. 10

| SUBBANDS | | | | | | | | | | | Δb |
|---|---|---|---|---|---|---|---|---|---|---|---|
| YLL5 | 9 | 8 | 7 | 6 | 5 | 4 | 3 | 2 | 1 | | 1.88652 |
| VLL4 | | 9 | 8 | 7 | 6 | 5 | 4 | 3 | 2 | 0 | 1.33503 |
| ULL4 | | 9 | 8 | 7 | 6 | 5 | 4 | 3 | 2 | 0 | 1.33503 |
| YLH5 | | 9 | 8 | 7 | 6 | 5 | 4 | 3 | 2 | 0 | 1.86407 |
| YHL5 | | 9 | 8 | 7 | 6 | 5 | 4 | 3 | 2 | 1 | 1.86407 |
| VHL4 | | 9 | 8 | 7 | 6 | 5 | 4 | 3 | 2 | 1 | 1.78840 |
| YHH5 | | 9 | 8 | 7 | 6 | 5 | 4 | 3 | 2 | 1 | 1.84191 |
| ... | | | | | | | | | | | ... |
| ... | | 9 | 8 | 7 | 6 | 5 | 4 | 3 | 2 | 0 | ... |
| ... | | 9 | 8 | 7 | 6 | 5 | 4 | 3 | 2 | 1 | ... |
| ... | | 9 | 8 | 7 | 6 | 5 | 4 | 3 | 2 | 1 | ... |
| ... | | 9 | 8 | 7 | 6 | 5 | 4 | 3 | 2 | 1 | ... |
| UHH1 | | 9 | 8 | 7 | 6 | 5 | 4 | 3 | 2 | 1 | 1825.95586 |
| YHH1 | | 9 | 8 | 7 | 6 | 5 | 4 | 3 | 2 | 1 | 10002.06109 |

FIG. 12

| SUBBANDS | | | | | | | | | | | Δb |
|---|---|---|---|---|---|---|---|---|---|---|---|
| YT1LL5 | 9 | 8 | 7 | 6 | 5 | 4 | 3 | 2 | 1 | 0 | 1.88652 |
| YT2LL5 | 9 | 8 | 7 | 6 | 5 | 4 | 3 | 2 | 1 | 0 | 1.88652 |
| ... | | | | | | | | | | | |
| YTnLL5 | 9 | 8 | 7 | 6 | 5 | 4 | 3 | 2 | 1 | 0 | 1.88652 |
| VY1LL4 | | 9 | 8 | 7 | 6 | 5 | 4 | 3 | 2 | 1 | 1.33503 |
| VT2LL4 | | 9 | 8 | 7 | 6 | 5 | 4 | 3 | 2 | 1 | 1.33503 |
| ... | | | | | | | | | | | |
| VTnLL4 | | 9 | 8 | 7 | 6 | 5 | 4 | 3 | 2 | 1 | 1.33503 |
| UT1LL4 | | 9 | 8 | 7 | 6 | 5 | 4 | 3 | 2 | 1 | 1.33503 |
| UT2LL4 | | 9 | 8 | 7 | 6 | 5 | 4 | 3 | 2 | 1 | 1.33503 |
| ... | | | | | | | | | | | |
| UTnLL4 | | 9 | 8 | 7 | 6 | 5 | 4 | 3 | 2 | 1 | 1.33503 |
| YT1LH5 | | 9 | 8 | 7 | 6 | 5 | 4 | 3 | 2 | 1 | 1.33507 |
| YT2LH5 | | 9 | 8 | 7 | 6 | 5 | 4 | 3 | 2 | 1 | 1.33507 |
| ... | | | | | | | | | | | |
| UTnHH1 | | | 9 | 8 | 7 | 6 | 5 | 4 | 3 | 2 | 1 | 1825.95586 |
| YT1HH1 | | | 9 | 8 | 7 | 6 | 5 | 4 | 3 | 2 | 1 | 0 | 10002.06109 |
| YT2HH1 | | | 9 | 8 | 7 | 6 | 5 | 4 | 3 | 2 | 1 | 0 | 10002.06109 |
| ... | | | | | | | | | | | |
| YTnHH1 | | | 9 | 8 | 7 | 6 | 5 | 4 | 3 | 2 | 1 | 0 | 10002.06109 |

F I G . 1 5
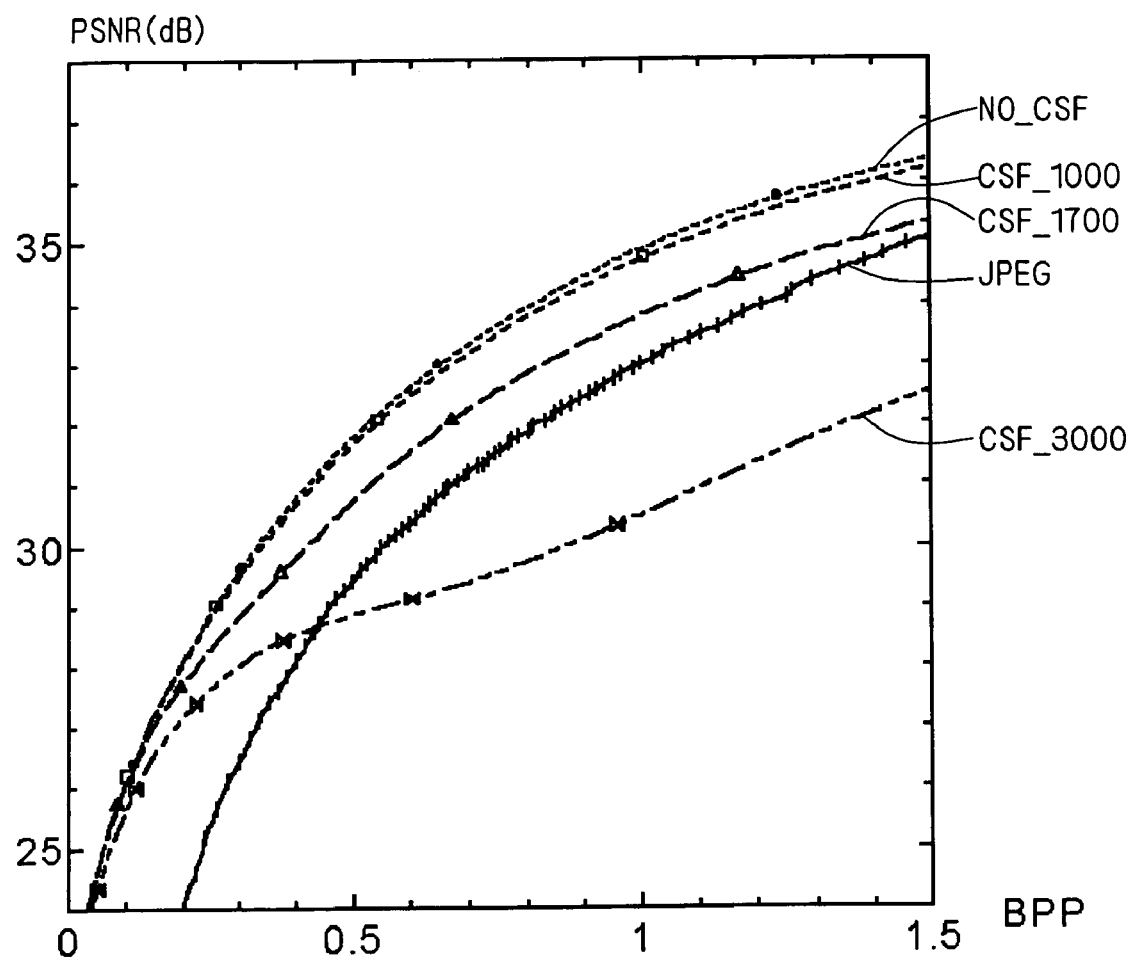

F I G. 4 1
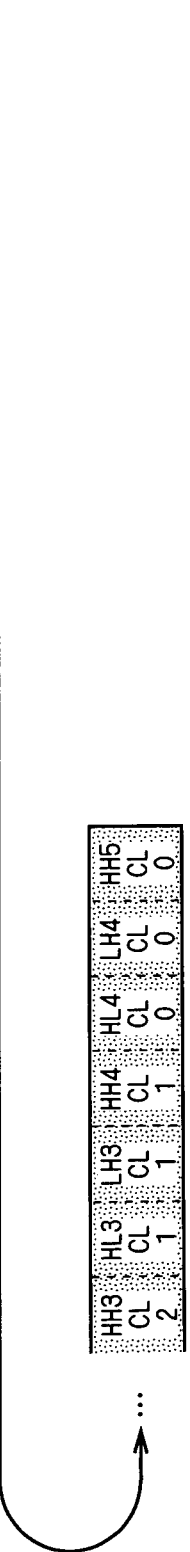

PRIOR ART

PRIOR ART

PRIOR ART

COMPRESSION ENCODER

BACKGROUND OF THE INVENTION

1. Field of the Invention

The present invention relates to a compression encoder for use in image compression and expansion technology.

2. Description of the Background Art

As a next-generation high-efficiency coding standard for image data, the International Organization for Standardization (ISO) and the International Telecommunications Union-Telecommunication Standardization Sector (ITU-T) have being developing the Joint Photographic Experts Group 2000 (JPEG2000) standard. The JPEG2000 standard provides functions superior to the Joint Photographic Experts Group (JPEG) standard which is currently in the mainstream, and features the adoption of discrete wavelet transform (DWT) for orthogonal transformation and of a technique called "Embedded Block Coding with Optimized Truncation (EBCOT)" which preforms bit-plane coding, for entropy coding.

FIG. 44 is a functional block diagram showing a general configuration of a compression encoder 100 for image compression and coding based on the JPEG2000 standard. Hereinbelow, the procedure of compression and coding according to the JPEG2000 standard is generally described with reference to FIG. 44.

An image signal inputted to the compression encoder 100 is DC level shifted in a DC level shift unit 102 as needed, and outputted to a color-space conversion unit 103. The color-space conversion unit 103 converts the color space of a signal inputted from the DC level shift unit 102. For example, an RGB signal inputted to the color-space conversion unit 103 is converted into a YCbCr signal (a signal consisting of a luminance signal Y and color-difference signals Cb and Cr).

Then, a tiling unit 104 divides an image signal inputted from the color-space conversion unit 103 into a plurality of rectangular regional components called "tiles" and outputs those components to a DWT unit 105. The DWT unit 105 performs integer or real-number DWT on each tile of an image signal inputted from the tiling unit 104 and outputs transform coefficients as a result. In DWT, a one-dimensional (1-D) filter, which divides a two-dimensional (2-D) image signal into high-pass (high-frequency) and low-pass (low-frequency) components, is applied in vertical and horizontal directions in this order. In the fundamentals of the JPEG2000 standard, an octave band splitting method is adopted in which only those bandpass components (subbands) which are divided into the low frequency side in both the vertical and horizontal directions are recursively divided into further subbands. The number of recursive divisions is called the decomposition level.

FIG. 45 is a schematic view showing a 2-D image 120 subjected to the DWT with the third decomposition level. At the first decomposition level, the 2-D image 120 is divided into four subbands HH1, HL1, LH1, and LL1 (not shown) by sequential application of the aforementioned 1-D filter in the vertical and horizontal directions. Here, "H" and "L" stand for high- and low-pass components, respectively. For example, HL1 is the subband consisting of a horizontally high-pass component H and a vertically low-pass component L of the first decomposition level. To generalize the notation, "XYn" (X and Y are either H or L; n is an integer of 1 or more) represents a subband consisting of a horizontal component X and a vertical component Y of the n-th decomposition level.

At the second decomposition level, the low-pass component LL1 is divided into subbands HH2, HL2, LH2, and LL2 (not shown). Further, at the third decomposition level, the low-pass component LL2 is divided into further subbands HH3, H13, LH3, and LL3. An arrangement of the resultant subbands HH1, HL1, LH1, HH2, HL2, LH2, HH3, HL3, LH3, and L13 is shown in FIG. 45. While FIG. 45 shows an example of third-order decomposition, the JPEG2000 standard generally adopts approximately third- to eighth-order decomposition.

A quantization unit 106 has the function of performing scalar quantization on transform coefficients outputted from the DWT unit 105 as needed. The quantization unit 106 also has the function of performing a bit-shift operation in which higher priority is given to the image quality of an ROI (region of interest) which is specified by an ROI unit 107. Now, in reversible (lossless) transformation, scalar quantization is not performed in the quantization unit 106. The JPEG2000 standard provides two kinds of quantization means: the scalar quantization in the quantization unit 106 and post-quantization (truncation) which will be described later.

Then, transform coefficients outputted from the quantization unit 106 are, according to the aforementioned EBCOT, entropy coded on a block-by-block basis in a coefficient bit modeling unit 108 and an arithmetic coding unit 109, and they are rate controlled in a rate control unit 110. More specifically, the coefficient bit modeling unit 108 divides each subband of input transform coefficients into regions called "code blocks" of, for example, approximately size 16×16, 32×32, or 64×64 and further decomposes each code block into a plurality of bit planes each constituting a two-dimensional array of respective one bits of the transform coefficients.

FIG. 46 is a schematic view showing the 2-D image 120 decomposed into a plurality of code blocks 121. FIG. 47 is a schematic view showing n bit planes $122_0$ through $122_{n-1}$ (n is a natural number) consisting of each code block 121. As shown in FIG. 47, decomposition is performed such that, where a binary value 123 representing one transform coefficient in a code block 121 is "011 . . . 0," then bits constituting this binary value 123 belong respectively to the bit planes $122_{n-1}$, $122_{n-2}$, $122_{n-3}$, . . . , and $122_0$. In the figure, the bit plane $122_{n-1}$ represents the most-significant bit plane consisting only of the most-significant bits of the transform coefficients, and the bit plane $122_0$ represents the least-significant bit plane consisting only of the least-significant bits of the transform coefficients.

Then, the coefficient bit modeling unit 108 judges the context of each bit in each bit plane $122_k$ (k=0 to n−1), and as shown in FIG. 48, decomposes the bit plane $122_k$ according to the significance of each bit judgment result), into three types of coding passes: a cleanup (CL) pass, a magnitude refinement (MR) pass, and a significance propagation (SIG) pass. The context judgment algorithm for each coding pass is determined by the EBCOT. According to the algorithm, the state of being "significant" means that a coefficient concerned has already been found not to be zero in previous coding, and the state of being "not significant" means that the value of a coefficient concerned is or possibly zero.

The coefficient bit modeling unit 108 performs bit-plane coding with three types of coding passes: the SIG pass (coding pass for insignificant coefficients with significant neighbors), the MR pass (coding pass for significant coefficients), and the CL pass (coding pass for the remaining coefficients which belongs to neither the SIG nor MR pass). The bit-plane coding is performed, starting from the most-significant to the least-significant bit plane, by scanning each bit plane in four bits at a time and determining whether there exist significant coefficients. The number of bit planes consisting only of insignificant coefficients (0 bits) is recorded in a packet header, and actual coding starts from a bit plane where a significant coefficient first appears. The bit plane from which coding starts is coded in only the CL pass, and lower-order bit planes than that bit plane are sequentially coded in the above three types of coding passes.

FIG. 49 shows the rate-distortion (R-D) curve representing the relationship between rate (R) and distortion (D). In this R-D curve, $R_1$ represents the rate before bit-plane coding, $R_2$ the rate after bit-plane coding, $D_1$ the distortion before bit-plane coding, and $D_2$ the distortion after bit-plane coding. In the figure, A, B, and C are labels representing the above coding passes. For efficient coding, as a route from the starting point $P_1$ ($R_1$, $D_1$) to the end point $P_2$ ($R_2$, $D_2$), the route A-B-C of a concave curve is more desirable than the route C-B-A of a convex carve. In order to achieve such a concave curve, it is known that coding should start from the most-significant to the least-significant bit plane.

Then, the arithmetic coding unit 109, using an MQ coder and according to the result of context judgment, performs arithmetic coding of a coefficient sequence provided from the coefficient bit modeling unit 108 on a coding-pass-by-coding-pass basis. This arithmetic coding unit 109 also has a mode of performing bypass processing in which a part of the coefficient sequence inputted from the coefficient bit modeling unit 108 is not arithmetically coded.

Then, the rate control unit 110 performs post-quantization for truncation of lower-order bit planes of a code sequence outputted from the arithmetic coding unit 109, thereby to control a final rate. A bit-stream generation unit 111 generates a bit stream by multiplexing a code sequence outputted from the rate control unit 110 and attached information (header information, layer structure, scalability information, quantization table, etc.) and outputs it as a compressed image.

The compression encoder with the aforementioned configuration adopts, as a method for compressing the amount of image data, for example a technique called rate-distortion (R-D) optimization utilizing the rate control method employed in the rate control unit 110 (cf. David S. Taubman and Michael W. Marcellin, "JPEG2000 Image Compression Fundamentals, Standards and Practice," Kluwer Academic Publishers, which is hereinafter referred to as the "first non-patent literature").

SUMMARY OF THE INVENTION

The present invention is directed to a compression encoder for compression and coding of an image signal.

According to an aspect of the present invention, the compression encoder comprises a wavelet transformer for recursively dividing an image signal into high- and low-pass components by wavelet transform and generating and outputting transform coefficients in a plurality of bandpass components; an image-quality controller for determining a quantization step size by dividing a quantization parameter which indicates target image quality by a norm of a synthesis filter coefficient; and a quantizer for quantizing the transform coefficients with the quantization step size.

This achieves high-speed quantization with minimal operations as compared with conventional techniques.

According to another aspect of the present invention, the compression encoder comprises a wavelet transformer for recursively dividing an image signal into high- and low-pass components by wavelet transform and generating and outputting transform coefficients in a plurality of bandpass components; an entropy coder for selectively entropy coding only a target to be coded which is specified from the transform coefficients; and an image-quality controller for setting a priority for each of the bandpass components according to the number of recursive divisions into the low-pass components and for determining the target to be coded which is provided to the entropy coder according to the priority.

This allows efficient rate control.

According to still another aspect of the present invention, the compression encoder comprises a wavelet transformer for recursively dividing an image signal into high- and low-pass components by wavelet transform and generating and outputting transform coefficients in a plurality of bandpass components; and a layer splitter for bit shifting the transform coefficients in each of the bandpass components by the number of bits corresponding to the priority which is determined by the number of recursive divisions into the low-pass components, and for dividing the transform coefficients which have been bit shifted into a plurality of layers.

This allows efficient generation of a plurality of layers.

Thus, an object of the present invention is to compress and code image data at high speed with minimal operations.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2, 3, and 4 give numerical tables of energy weighting factors;

FIG. 10 shows bit shifting and sorting of a code sequence in YUV format;

FIG. 12 shows bit shifting and sorting of a tiled code sequence in YUV format;

FIG. 15 shows the comparison result of objective evaluation of the R signal in YUV420 compressed images between the first preferred embodiment according to the present invention and the conventional JPEG standard;

FIG. 41 shows a code sequence sorted by coding pass;

DESCRIPTION OF THE PREFERRED EMBODIMENTS

First Preferred Embodiment

<Compression Encoder>

Figure 1:
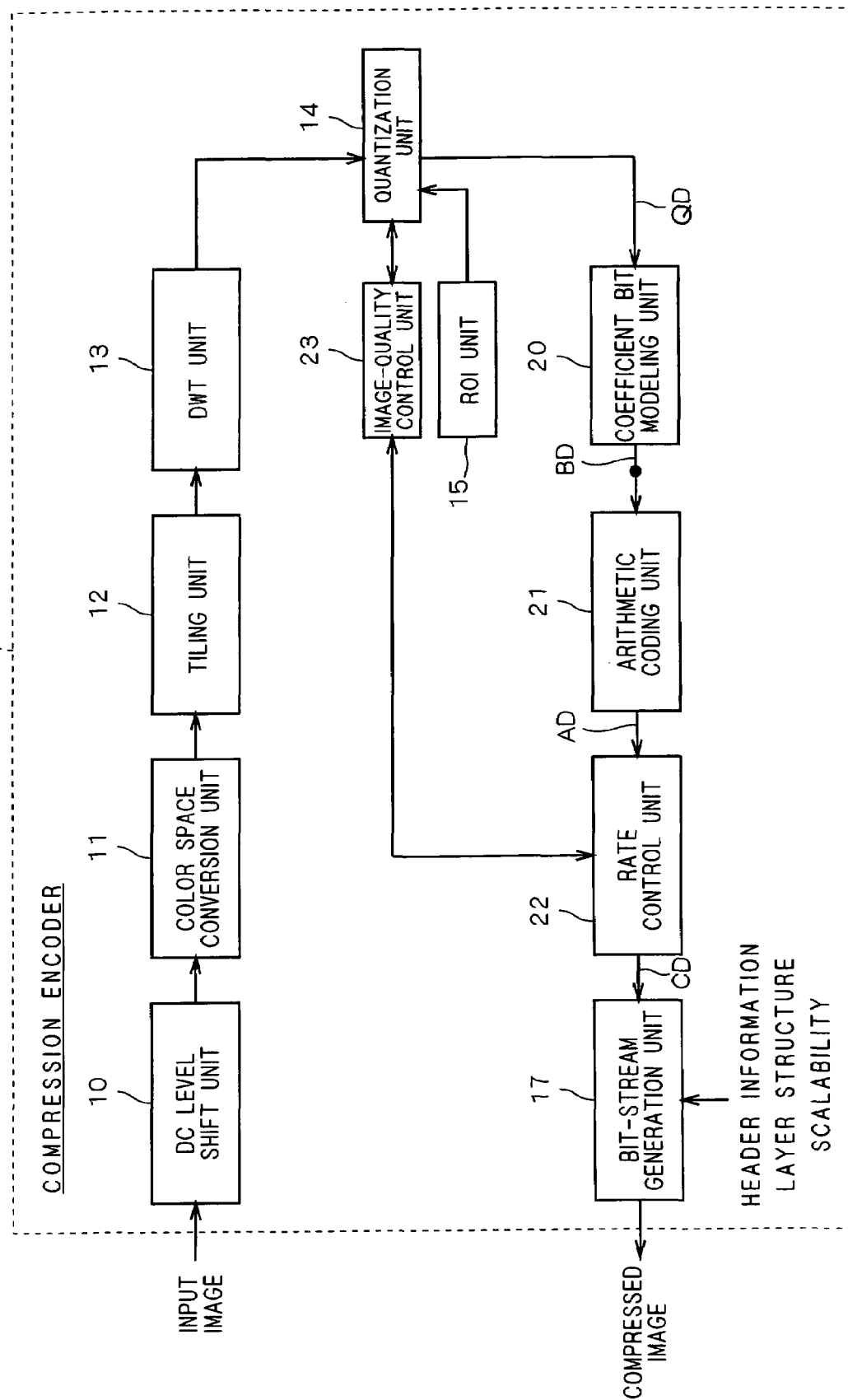
FIG. 1 shows a general configuration of a compression encoder according to a first preferred embodiment of the present invention.

FIG. 1 is a functional block diagram showing a general configuration of a compression encoder 1 according to a first preferred embodiment of the present invention. After general description of the configuration and function of this compression encoder 1, quantization and coding techniques according to this preferred embodiment will be described in detail.

The compression encoder 1 comprises a DC level shift unit 10, a color-space conversion unit 11, a tiling unit 12, a DWT unit 13, a quantization unit 14, an ROI unit 15, a coefficient bit modeling unit 20, an arithmetic coding (entropy coding) unit 21, a rate control unit 22, an image-quality control unit 23, and a bit-stream generation unit 17.

All or parts of the units 10-15, 17, and 20-23 in the compression encoder 1 may consist of hardware or programs that run on a microprocessor.

An image signal inputted to the compression encoder 1 is DC level shifted in the DC level shift unit 10 as needed, and outputted to the color-space conversion unit 11. The color-space conversion unit 11 converts and outputs the color space of an input signal. The JPEG2000 standard provides reversible component transformation (RCT) and irreversible component transformation (ICT) for color-space conversion, either of which can be selected as necessary. Thus, for example, an input RGB signal is converted into a YCbCr or YUV signal.

Then, the tiling unit 12 divides an image signal inputted from the color-space conversion unit 11 into a plurality of rectangular regional components called "tiles" and outputs those components to the DWT unit 13. Here, the image signal is not always necessarily divided into tiles, and instead a single frame of image signal may be outputted as-is to the next functional block.

Figure 45:
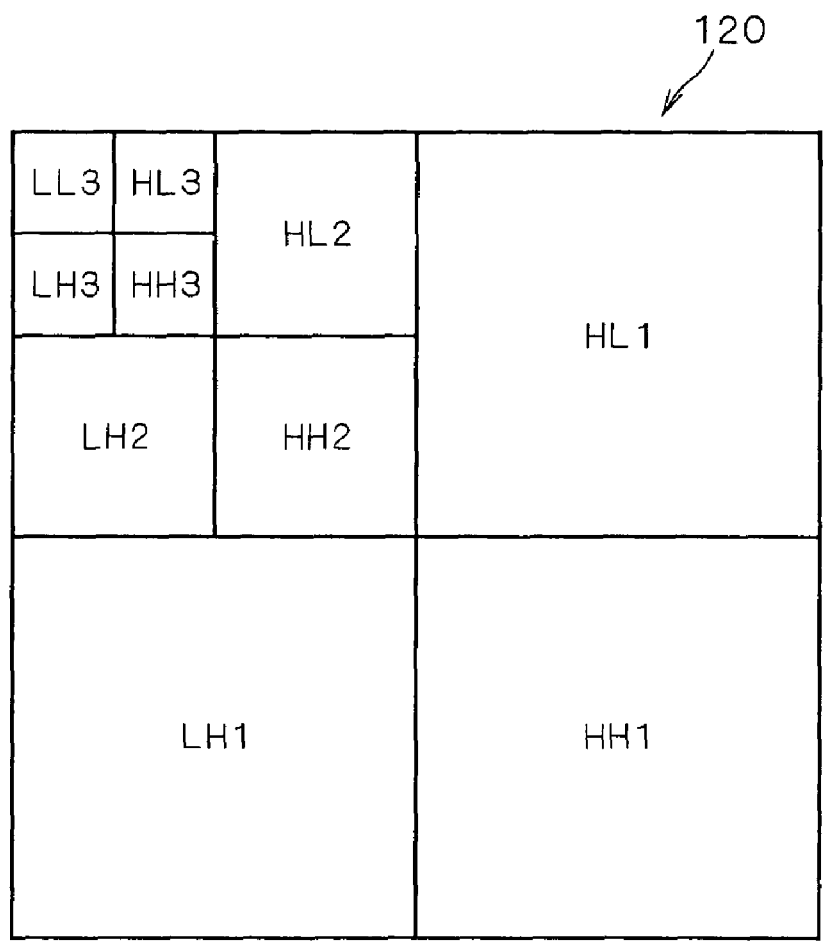
FIG. 45 is a schematic view showing a 2-D image divided into subbands according to an octave band splitting method.
Figure 46:
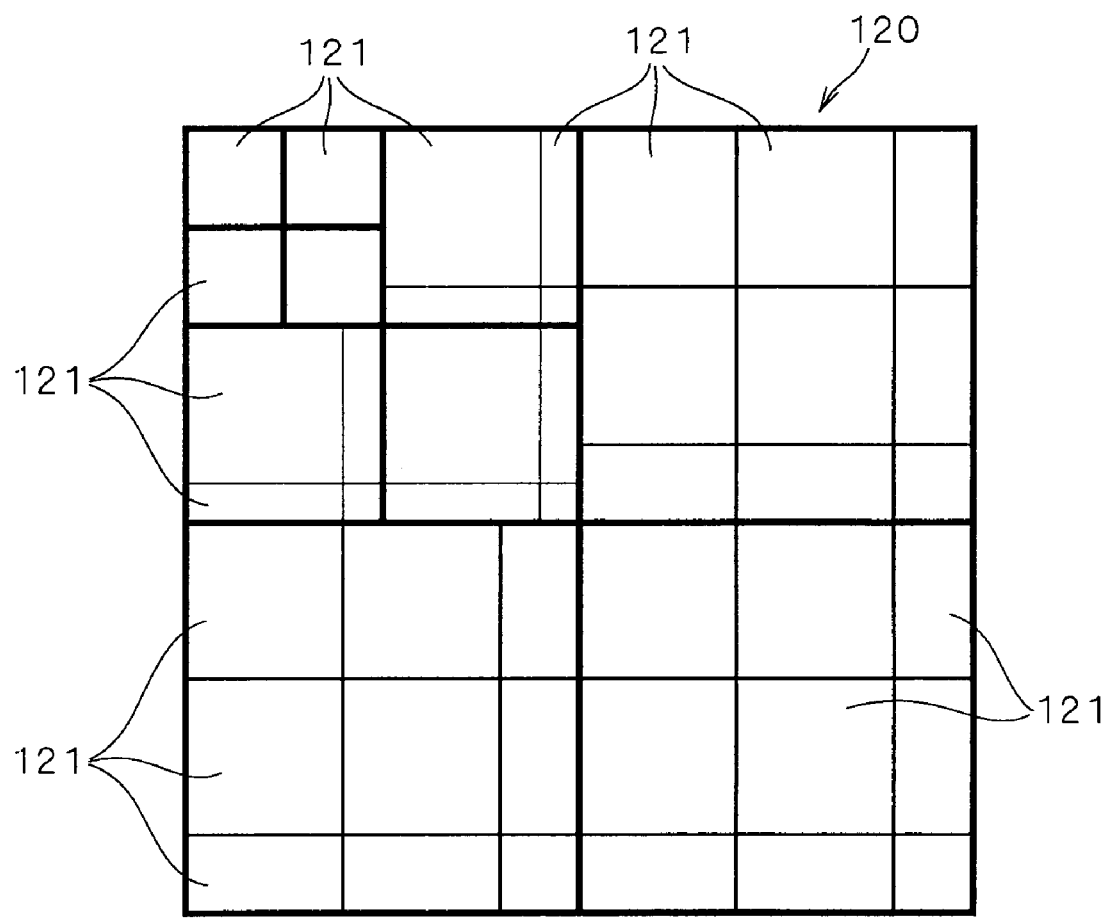
FIG. 46 is a schematic view showing a 2-D image decomposed into a plurality of code blocks.

The DWT unit 13 performs integer or real-number DWT on each tile of an image signal inputted from the tiling unit 12, thereby to recursively divide the image signal into high- and low-pass components according to the aforementioned octave band splitting method. As a result, transform coefficients in a plurality of bandpass components (subbands) HH1-LL3 as shown in FIG. 45 are generated and outputted to the quantization unit 14. More specifically, the real-number DWT uses a 9/7-, 5/3-, or 7/5-tap filter, and the integer DWT uses a 5/3- or 13/7-tap filter. Such filtering may be implemented through a convolution operation or by a lifting scheme which is more efficient than the convolution operation.

The quantization unit 14 has the function of performing scalar quantization on transform coefficients inputted from the DWT unit 13 according to quantization parameters which are determined by the image-quality control unit 23. The quantization unit 14 also has the function of performing a bit-shift operation in which higher priority is given to the image quality of an ROI (region of interest) which is specified by the ROI unit 15. The method of determining the quantization parameters in the image-quality control unit 23 and the method of quantization in the quantization unit 14 will be described later in detail.

Then, transform coefficients QD outputted from the quantization unit 14 are entropy coded on a block-by-block basis in the coefficient bit modeling unit 20 and the arithmetic coding unit 21, and they are rate controlled in the rate control unit 22.

Figure 44:
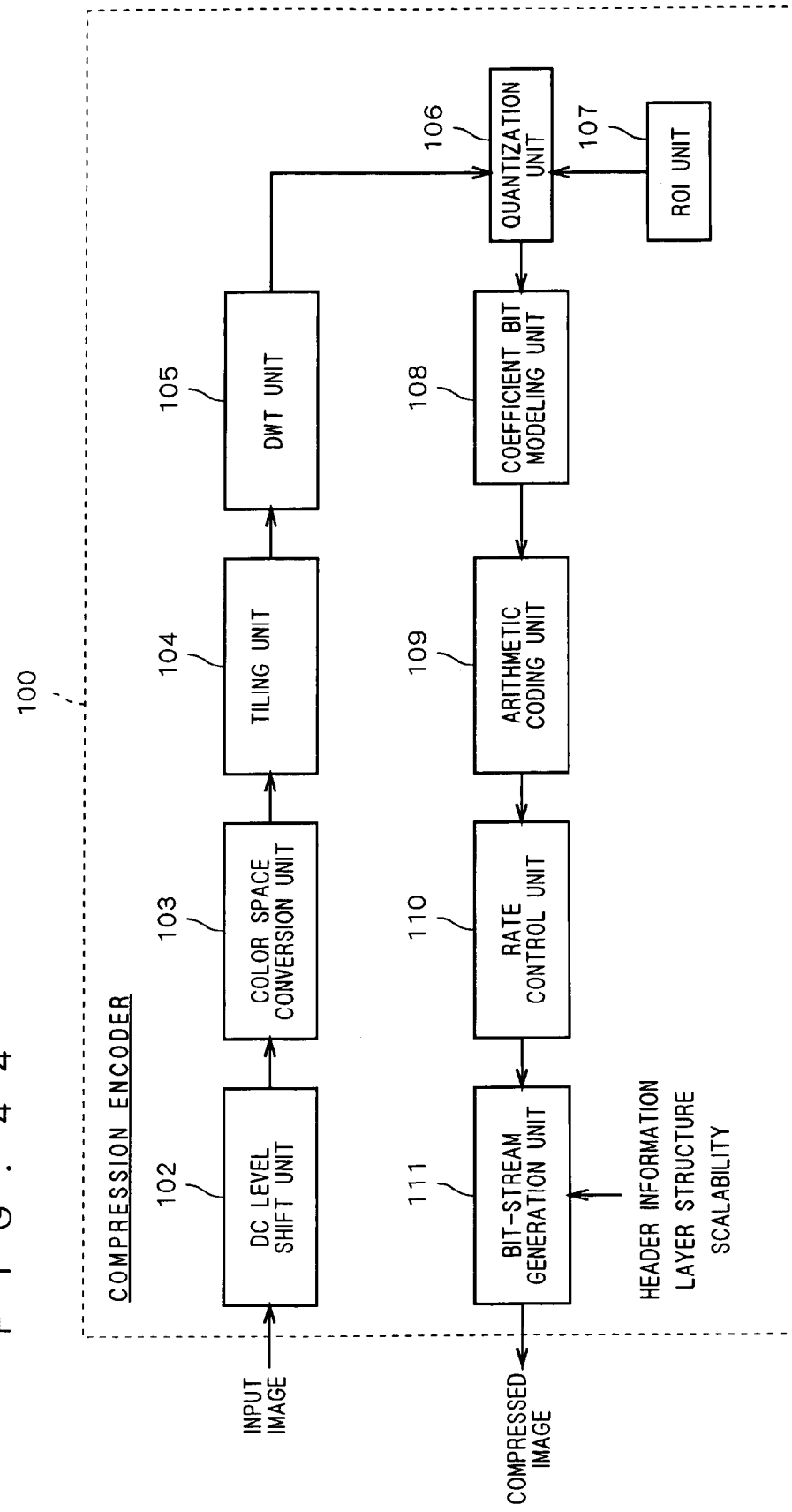
FIG. 44 shows a general configuration of a compression encoder according to the JPEG2000 standard.
Figure 47:
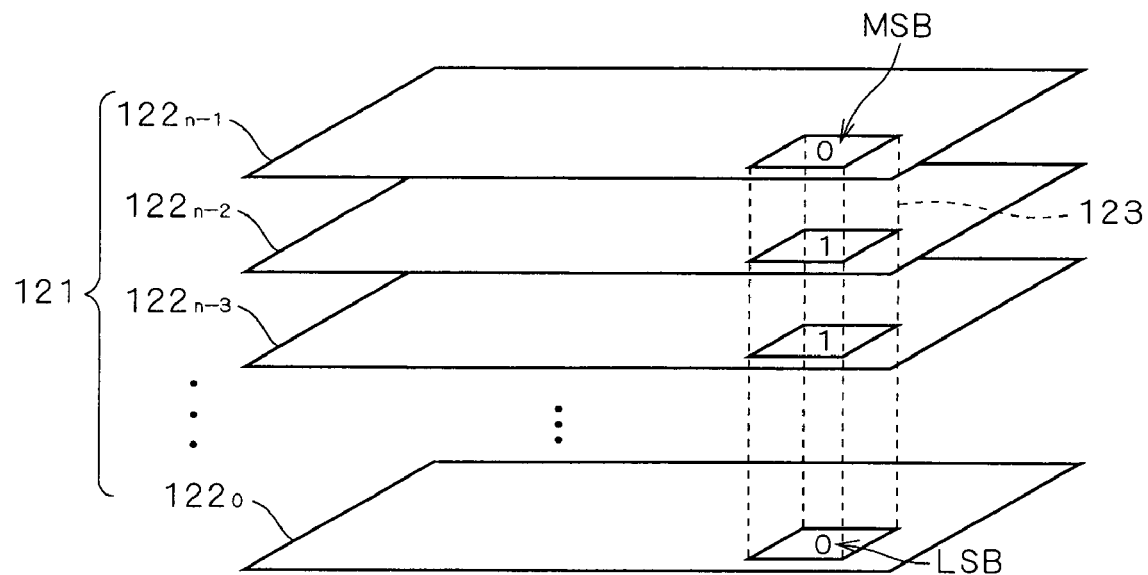
FIG. 47 is a schematic view showing a plurality of bit planes constituting a code block.
Figure 48:
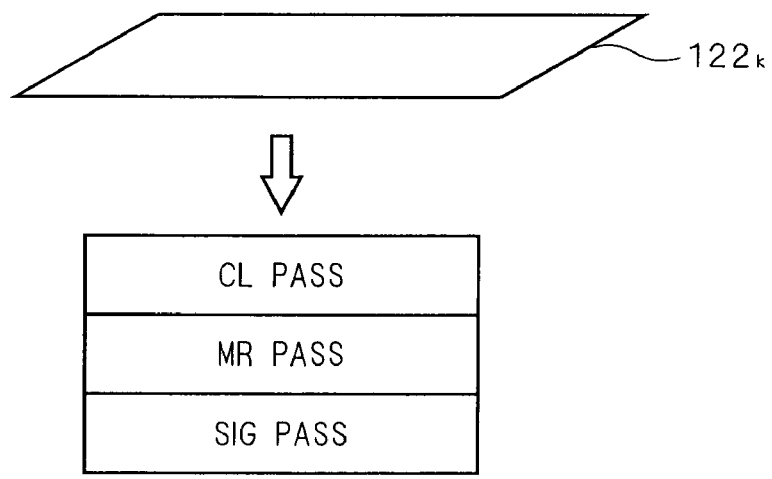
FIG. 48 is a schematic view showing three types of coding passes.
Figure 49:
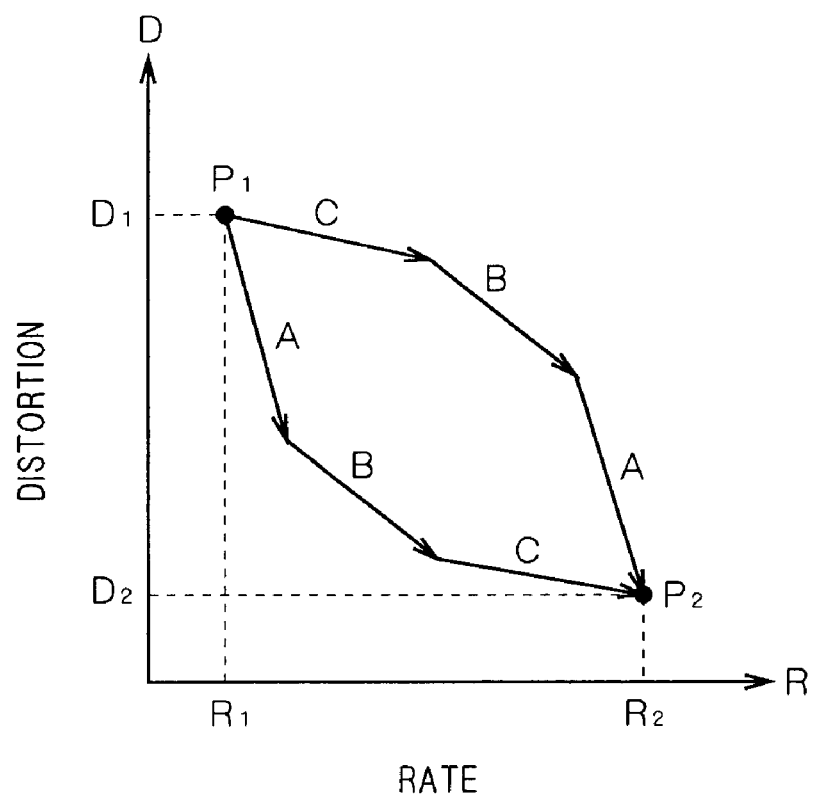
FIG. 49 shows an R-D curve representing the relationship between rate and distortion.

The coefficient bit modeling unit 20, like the coefficient bit modeling unit 108 shown in FIG. 44, divides each subband of input transform coefficients QD into code blocks of approximately size 32×32 or 64×64 and further decomposes each code block into a plurality of bit planes each constituting a 2-D array of bits. As a result, each code block is decomposed into a plurality of bit planes $122_0$ through $122_{n-1}$ as shown in FIG. 47.

The arithmetic coding unit 21 performs arithmetic coding on coded data BD inputted from the coefficient bit modeling unit 20 and outputs resultant coded data AD to the rate control unit 22. The arithmetic coding unit 21 sometimes performs bypass processing in which part of data to be coded is not arithmetically coded but instead is outputted as-is as part of the coded data AD. While this preferred embodiment adopts the arithmetic coding, the present invention is not limited to this only and may adopt other techniques for entropy coding.

The rate control unit 22 has the function of controlling the rate of the coded data AD inputted from the arithmetic coding unit 21 according to instructions from the image-quality control unit 23. That is, the rate control unit 22 has the function of performing post-quantization in which the coded data AD is sequentially truncated in ascending order of priority on a subband-by-subband, bit-plane-by-bit-plane, or coding-pass-by-coding-pass basis.

The bit-stream generation unit 17 generates a bit stream by multiplexing coded data CD outputted from the rate control unit 22 and attached information (header information, layer structure, scalability, quantization table, etc.) and outputs it as a compressed image.

<Image Quality Control>

Next, the structure and processing details of the image-quality control unit 23 shown in FIG. 1 is described. The image-quality control unit 23 has the function of determining a quantization step size $\Delta_b$ for use in quantizing transform coefficients inputted from the DWT unit 13 in the quantization unit 14 on the basis of target quality information (high quality, standard quality, low quality, resolution information, etc.) which is provided from the outside. Hereinbelow, a method of determining the quantization step size $\Delta_b$ is described.

When an original image is divided by the DWT unit 13 into subbands (bandpass components) "XYn" (X and Y are either a high- or low-pass component H or L; n is the decomposition level) as shown in FIG. 45, the quantization step size $\Delta_b$ for use in quantization of each subband is given by:

$$\Delta_b = Q_P/Q_b \quad (1)$$

where $Q_p$ is a positive value inputted according to the target quality information, i.e., a quantization parameter; the higher the image quality, the smaller the input value. The quantization parameter $Q_p$ may be specified by direct input of a numerical value from the user or, for example, a predetermined table may be provided which associates a predetermined keyword indicating target quality information such as high quality, standard quality, and low quality with each numerical value of the quantization parameter $Q_p$, and then, the value of the quantization parameter $Q_p$ may be read out from that table by the user specifying desired image quality of compressed image data by that keyword.

Further, $Q_b$ is the quantized coefficient in each subband and expressed as a norm of a synthesis filter coefficient by:

$$Q_b = \sqrt{G_b} \quad (2)$$

Here, the weighting factor $G_b$ for subband b is calculated from the following equation (3):

$$G_b = \|S_b\|^2, \text{ where } S_b = s_b[n] \quad (3)$$

In the above equation (3), $s_b[n]$ is the one-dimensional (1-D) synthesis filter coefficient for subband b, and $\|x\|$ is the norm of the vector x.

According to the equations (4.39) and (4.40) given in the foregoing first no-patent literature, a 1-D synthesis filter coefficient $S_{L[1]}[n]$ for the low-pass component L1 of the first decomposition level and a 1-D synthesis filter coefficient $S_{H[1]}[n]$ for the high-pass component H1 of the same decomposition level are calculated from the following equations (4):

$$\begin{cases} S_{L[1]}[n] = g_0[n] \\ S_{H[1]}[n] = g_1[n] \end{cases} \quad (4)$$

In the above equations (4), $g_0[n]$ and $g_1[n]$ are respectively low- and high-pass coefficients for a forward transform filter used in band splitting of image signals.

A 1-D synthesis filter coefficient $S_{L[d]}[n]$ for the low-pass component Ld of the d-th decomposition level (d=1, 2, ..., D) and a 1-D synthesis filter coefficient $S_{H[d]}[n]$ for the high-pass component Hd of the same decomposition level are calculated from the following equations (5):

$$\begin{cases} S_{L[d]}[n] = \sum_k S_{L[d-1]}[k]g_0[n-2k] \\ S_{H[d]}[n] = \sum_k S_{H[d-1]}[k]g_0[n-2k] \end{cases} \quad (5)$$

Then, the squared norm of the 1-D synthesis filter coefficient for the low-pass component Ld of the d-th decomposition level is calculated from the following equation (6):

$$G_{L[d]} = \|S_{L[d]}[n]\|^2 = \sum_j |S_{L[d]}[j]|^2 \quad (6)$$

Also, the squared norm of the 1-D synthesis filter coefficient for the high-pass component Hd can be calculated from a similar equation to the equation (6).

TABLE 1 gives the calculation results of the squared norms of 1-D synthesis filter coefficients. In the table, n is the decomposition level; for example, $G_{L1}$ shows the calculation result for the low-pass component L of the first decomposition level.

TABLE 1

Squared norms of 1D synthesis filter coefficients

| Decomposition Level | GLn | GHn |
|---|---|---|
| 1 | 1.96591 | 0.52022 |
| 2 | 4.12241 | 0.96722 |
| 3 | 8.41674 | 2.07926 |
| 4 | 16.93557 | 4.30048 |
| 5 | 33.92493 | 8.68672 |
| 6 | 67.87717 | 17.41884 |
| 7 | 135.76805 | 34.86078 |
| 8 | 271.54296 | 69.73317 |
| 9 | 543.08936 | 139.47215 |

TABLE 1-continued

Squared norms of 1D synthesis filter coefficients

| Decomposition Level | GLn | GHn |
|---|---|---|
| 10 | 1086.18043 | 278.94721 |
| 11 | 2172.36172 | 557.89587 |

Two-dimensional (2-D) synthesis filter coefficients for subbands LLD, HLd, LHd, HHd of the d-th decomposition level (d=1, 2, ..., D; D is an integer value) can be expressed by the product of the above 1-D synthesis filter coefficients, and a 2-D weighting factor $G_b$ for subband b can be expressed by the product of the 1-D weighting factors. More specifically, the 2-D synthesis filter coefficients and the 2-D weighting factors can be calculated from the following equations (7):

$$\begin{cases} S_{LL[D]}[n_1, n_2] = S_{L[D]}[n_1]S_{L[D]}[n_2] \Rightarrow G_{LL[D]} = G_{L[D]} \cdot G_{L[D]} \\ S_{HL[d]}[n_1, n_2] = S_{L[d]}[n_1]S_{H[d]}[n_2] \Rightarrow G_{HL[d]} = G_{L[d]} \cdot G_{H[d]} \\ S_{LH[d]}[n_1, n_2] = S_{H[d]}[n_1]S_{L[d]}[n_2] \Rightarrow G_{LH[d]} = G_{H[d]} \cdot G_{L[d]} \\ S_{HH[d]}[n_1, n_2] = S_{H[d]}[n_1]S_{H[d]}[n_2] \Rightarrow G_{HH[d]} = G_{H[d]} \cdot G_{H[d]} \end{cases} \quad (7)$$

In the above equations (7), the subscripts LL[D], HL[d], LH[d], and HH[d] stand for the subbands LLD, HLd, LHd, and HHd, respectively.

The square root of the weighting factor $G_b$ is the norm. TABLEs 2 and 3 below the calculation results of the 2-D weighting factors $G_b$ obtained from TABLE 1. TABLE 2 gives the numerical values of the squared norms of each subband for the 9/7 filter (9/7-tap filter), and TABLE 3 gives the numerical values of the norms corresponding to TABLE 2.

TABLE 2

(Squared norms of) weighting coefficients G for distortion model for 9/7 filter

| Decomposition Level | LL | HL | LH | HH |
|---|---|---|---|---|
| 1 | 3.86479 | 1.02270 | 1.02270 | 0.27063 |
| 2 | 16.99426 | 3.98726 | 3.98726 | 0.93551 |
| 3 | 70.84158 | 17.50056 | 17.50056 | 4.32330 |
| 4 | 286.81360 | 72.83113 | 72.83113 | 18.49415 |
| 5 | 1150.90066 | 294.69647 | 294.69647 | 75.45917 |
| 6 | 4607.30956 | 1182.34209 | 1182.34209 | 303.41630 |
| 7 | 18432.96262 | 4732.98083 | 4732.98083 | 1215.27440 |
| 8 | 73735.57967 | 18935.55202 | 18935.55202 | 4862.71528 |
| 9 | 294946.04918 | 75745.84127 | 75745.84127 | 19452.48118 |
| 10 | 1179787.92756 | 302986.99951 | 302986.99951 | 77811.54539 |
| 11 | 4719155.44117 | 1211951.63280 | 1211951.63280 | 311247.80240 |

TABLE 3

Norms of 9/7 filter

| Decomposition Level | LL | HL | LH | HH |
|---|---|---|---|---|
| 1 | 1.96591 | 1.01129 | 1.01129 | 0.52022 |
| 2 | 4.12241 | 1.99681 | 1.99681 | 0.96722 |
| 3 | 8.41674 | 4.18337 | 4.18337 | 2.07926 |
| 4 | 16.93557 | 8.53412 | 8.53412 | 4.30048 |
| 5 | 33.92493 | 17.16673 | 17.16673 | 8.68672 |

TABLE 3-continued

Norms of 9/7 filter

| Decomposition Level | LL | HL | LH | HH |
|---|---|---|---|---|
| 6 | 67.87717 | 34.38520 | 34.38520 | 17.41885 |
| 7 | 135.76805 | 68.79666 | 68.79666 | 34.86079 |
| 8 | 271.54296 | 137.60651 | 137.60651 | 69.73317 |
| 9 | 543.08936 | 275.21962 | 275.21962 | 139.47215 |
| 10 | 1086.18043 | 550.44255 | 550.44255 | 278.94721 |
| 11 | 2172.36172 | 1100.88675 | 1100.88675 | 557.89587 |

For example, let the quantization parameter $Q_p=16$ for all of the luminance signal Y and the color difference signals U and V. Then, the quantization step sizes $\Delta_b$ for the luminance signal Y and the color difference signals U and V are obtained from the values given in TABLE 3 using the above equations (1) and (2), which are as shown in TABLE 4.

TABLE 4

Quantization step sizes $\Delta_b$

| Decomposition Level | LL | HL | LH | HH |
|---|---|---|---|---|
| 1 | X | 15.82143 | 15.82143 | 30.75634 |
| 2 | X | 8.01277 | 8.01277 | 16.54233 |
| 3 | X | 3.82467 | 3.82467 | 7.69506 |
| 4 | X | 1.87483 | 1.87483 | 3.72051 |
| 5 | 0.47163 | 0.93204 | 0.93204 | 1.84189 |

The quantization parameter $Q_p$ used in obtaining the quantization step size $\Delta_b$ for each of the luminance signal Y and the color difference signals U and V is not necessarily the same value, and different values may be used according to the contents of image data. For example, for enhancement of color components, the quantization parameter $Q_p$ used for the color difference signals U and V may be smaller than that used for the luminance signal Y. In this way, an appropriate quantization parameter $Q_p$ for each signal may be used in consideration of the contents of image data, and the like.

The image-quality control unit 23 obtains the quantization step size $\Delta_b$ in this way and gives it to the quantization unit 14. Then, the quantization unit 14 performs quantization with the given quantization step size $\Delta_b$ for each subband.

However, if the value of the quantization step size $\Delta_b$ is less than 1, it is multiplied by powers of 2 to obtain a value of 1 or more before quantization. For example, although the quantization step size $\Delta_b$ for the subband LL5 calculated by the aforementioned method is 0.47163, for actual quantization of image data, it is multiplied by $2^2$ to obtain the value of 1.88652. Similarly, the quantization step size $\Delta_b$ of 0.93204 for the subband HL5 is multiplied by 2 to obtain the value of 1.86408 for quantization. In this way, the function of converting the quantization step size $\Delta_b$ into a predetermined numerical value depending on the performance of a quantizer for use in quantization simplifies the structure of a quantizer as well as achieves data compression that is the intended purpose of quantization. It should be noted here that making the quantization step size $\Delta_b$ a value of 1 or more is only one example. Thus, depending on the performance of a quantizer, for example if a quantizer uses the value of ½ or more, the quantization step size $\Delta_b$ should be converted into a value of ½ or more. That is, if the lower limit value handled by a quantizer is $½^m$, every quantization step size $\Delta_b$ should be multiplied by powers of 2 to obtain a value of $½^m$ or more before quantization.

Instead of the aforementioned method, the image-quality control unit 23 can also determine the quantization step size $\Delta_b$ in consideration of human visual characteristics. This method is described hereinbelow.

The foregoing first non-patent literature describes in chapter 16 the weighted mean squared error (WMSE) based on the contrast sensitivity function (CSF) of the human visual system. Using this for improvement in human visual evaluation of image data after compression and coding, the above equation (2) is rewritten as:

$$Q_b = \sqrt{W_{b[i]}^{csf} G_{b[i]}} \quad (8)$$

where $$W_{b[i]}^{csf}$$

is called the "energy weighting factor" for subband b[i], the recommended numerical value of which is described in ISO/IEC JTC 1/SC 29/WG1 (ITU-T SG8) N2406, "JPEG 2000 Part 1 FDIS (including COR 1, COR 2, and DCOR 3)," 4 Dec. 2001 (which is hereinafter referred to as the "second non-patent literature"). FIGS. 2 through 4 show the numerical values of the "energy weighting factors" described in the second non-patent literature.

In FIGS. 2 to 4, "level" and "Lev" stand for the deposition level, and "Comp" stands for the luminance component Y and the color difference components Cb and Cr. Examples are shown for viewing distances of 1000, 1700, 2000, 3000, and 4000. The "Viewing distance 1000," "Viewing distance 1700," "Viewing distance 2000," "Viewing distance 3000," and "Viewing distance 4000", respectively, represent viewing distances when displays or prints of 100 dpi, 170 dpi, 200 dpi, 300 dpi, and 400 dpi are viewed from 10 inches away.

For example, in the case of color image data, a specific method for obtaining the quantization step size $\Delta_b$ is described hereinbelow. Here, the color space of input color image data consisting of RGB signals shall be converted by the color-space conversion unit 11 into YUV 422 or 420 color-space data.

Figure 5:
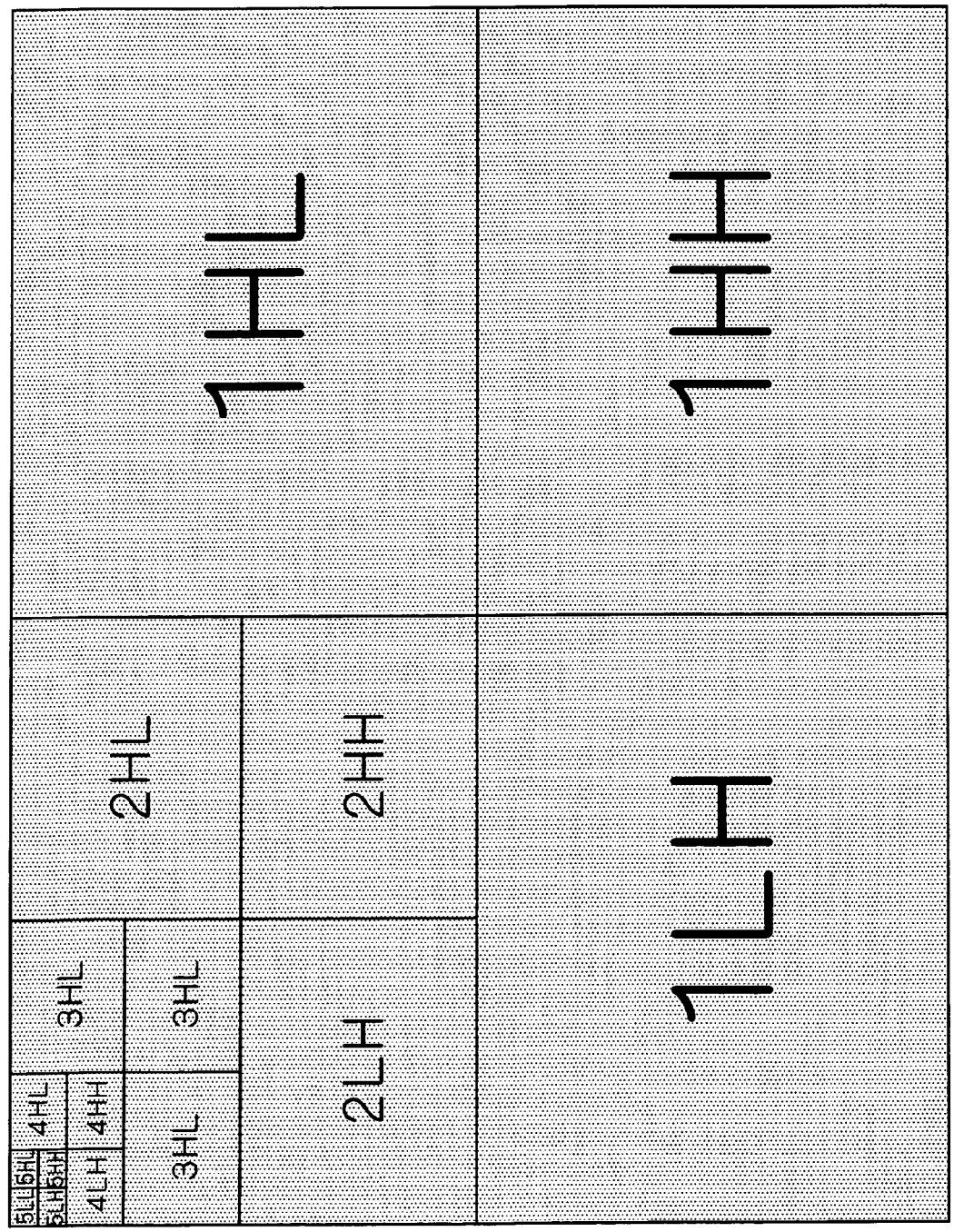
FIG. 5 shows a wavelet plane of a luminance signal.
Figure 6:
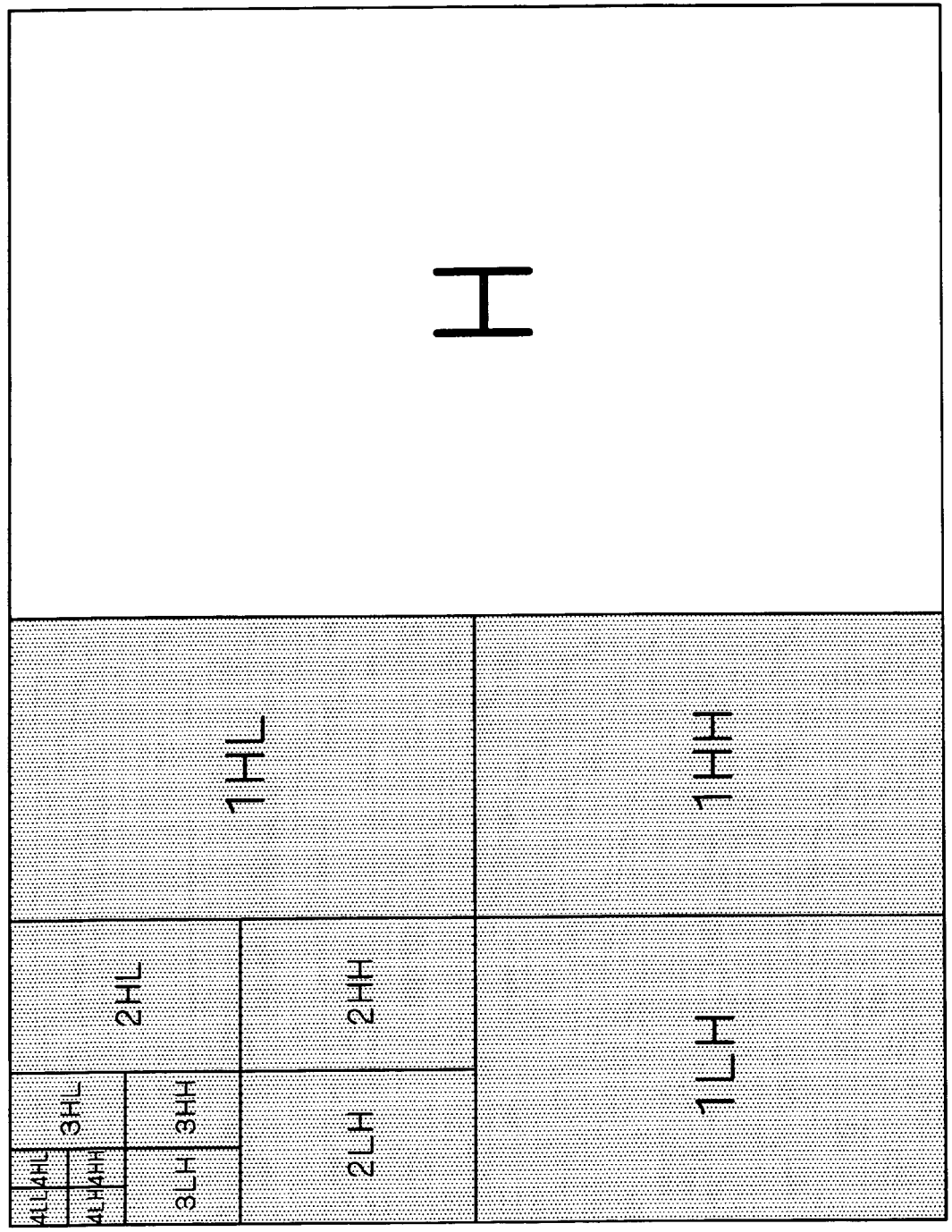
FIG. 6 shows a wavelet plane of color difference signals in YUV 422 format.

In YUV 422 image data, the amount of data for the color difference signals U and V is one-half of that for the luminance signal Y, and in YUV 420 image data, it is one fourth. A wavelet plane of the luminance signal Y subjected to DWT is as shown in FIG. 5. Assuming that one half of the data amount is equivalent to one application of DWT in the horizontal direction to the wavelet plane shown in FIG. 5, the dotted area in FIG. 6 is the wavelet plane of the color difference signals U and V in YUV 422 format. Similarly, assuming that one fourth of the data amount is equivalent to each one application of DWT in the horizontal and vertical directions to the wavelet plane shown in FIG. 5, the dotted area in FIG. 7 is the wavelet plane of the color difference signals U and V in YUV 420 format.

In YUV 422 format, it is assumed that the horizontal component is subjected to one more filtering than the vertical component as shown in FIG. 6. Thus, the above equations (7) for calculating the 2-D synthesis filter coefficients and the 2-D weighting coefficients can be rewritten as:

$$\begin{cases} S_{LL[D]}[n_1, n_2] = S_{L[D]}[n_1]S_{L[D+1]}[n_2] \Rightarrow G_{LL[D]} = G_{L[D]} \cdot G_{L[D+1]} \\ S_{HL[d]}[n_1, n_2] = S_{L[d]}[n_1]S_{H[d+1]}[n_2] \Rightarrow G_{HL[d]} = G_{L[d]} \cdot G_{H[d+1]} \\ S_{LH[d]}[n_1, n_2] = S_{H[d]}[n_1]S_{L[d+1]}[n_2] \Rightarrow G_{LH[d]} = G_{H[d]} \cdot G_{L[d+1]} \\ S_{HH[d]}[n_1, n_2] = S_{H[d]}[n_1]S_{H[d+1]}[n_2] \Rightarrow G_{HH[d]} = G_{H[d]} \cdot G_{H[d+1]} \end{cases} \quad (9)$$

Figure 7:
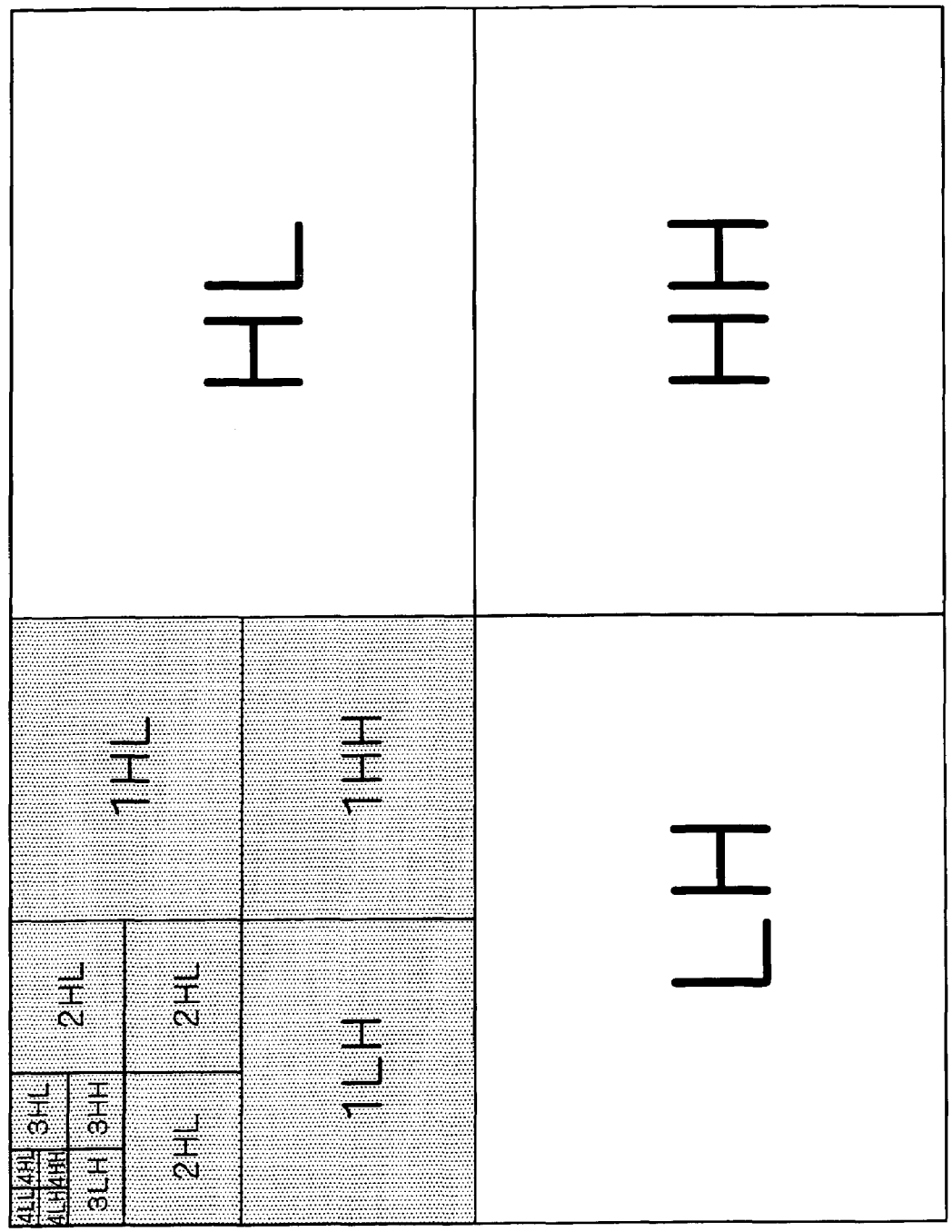
FIG. 7 shows a wavelet plane of color difference signals in YUV 420 format.

Similarly, in YUV 420 format, it is assumed that both the horizontal and vertical components are subjected to one more filtering as shown in FIG. 7. Thus, the above equations (7) can be rewritten as:

$$\begin{cases} S_{LL[D]}[n_1, n_2] = S_{L[D+1]}[n_1]S_{L[D+1]}[n_2] \Rightarrow G_{LL[D]} = G_{L[D+1]} \cdot G_{L[D+1]} \\ S_{HL[d]}[n_1, n_2] = S_{L[d+1]}[n_1]S_{H[d+1]}[n_2] \Rightarrow G_{HL[d]} = G_{L[d+1]} \cdot G_{H[d+1]} \\ S_{LH[d]}[n_1, n_2] = S_{H[d+1]}[n_1]S_{L[d+1]}[n_2] \Rightarrow G_{LH[d]} = G_{H[d+1]} \cdot G_{L[d+1]} \\ S_{HH[d]}[n_1, n_2] = S_{H[d+1]}[n_1]S_{H[d+1]}[n_2] \Rightarrow G_{HH[d]} = G_{H[d+1]} \cdot G_{H[d+1]} \end{cases} \quad (10)$$

Using the above equations (9) and (10) and the values given in TABLE 1, the norms of the color difference signals in YUV 422 and 420 formats are obtained, the results of which are shown in TABLEs 5 and 6, respectively.

TABLE 5

Norms of color difference signals in YUV 422 format

| Decomposition Level | LL | HL | LH | HH |
|---|---|---|---|---|
| 1 | 2.84680 | 1.378933 | 1.46443 | 0.70934 |
| 2 | 5.89044 | 2.92722 | 2.85321 | 1.41813 |
| 3 | 11.93911 | 6.01632 | 5.93409 | 2.99028 |
| 4 | 23.96952 | 12.12908 | 12.07864 | 6.11205 |
| 5 | 47.98675 | 24.30912 | 24.28230 | 12.30092 |
| 6 | 95.99766 | 48.64413 | 48.63048 | 24.64213 |
| 7 | 192.00744 | 97.30127 | 97.29440 | 49.30780 |
| 8 | 384.02095 | 194.60905 | 194.60561 | 98.61965 |
| 9 | 768.04494 | 389.22135 | 389.21963 | 197.24444 |
| 10 | 1536.09140 | 778.44433 | 778.44347 | 394.49144 |

TABLE 6

Norms of color difference signals in YUV 420 format

| Decomposition Level | LL | HL | LH | HH |
|---|---|---|---|---|
| 1 | 4.12241 | 1.996813 | 1.99681 | 0.96722 |
| 2 | 8.41674 | 4.18337 | 4.18337 | 2.07926 |

TABLE 6-continued

Norms of color difference signals in YUV 420 format

| Decomposition Level | LL | HL | LH | HH |
|---|---|---|---|---|
| 3 | 16.93557 | 8.53412 | 8.53412 | 4.30048 |
| 4 | 33.92493 | 17.16673 | 17.16673 | 8.68672 |
| 5 | 67.87717 | 34.38520 | 34.38520 | 17.41885 |
| 6 | 135.76805 | 68.79666 | 68.79666 | 34.86079 |
| 7 | 271.54296 | 137.60651 | 137.60651 | 69.73317 |
| 8 | 543.08936 | 275.21962 | 273.21962 | 139.47215 |
| 9 | 1086.18043 | 550.44255 | 550.44255 | 278.94721 |
| 10 | 2172.36172 | 1100.88675 | 1100.88675 | 557.89587 |

Next, according to the description of the first non-patent literature, the energy weighting factor $$W_{b[i]}^{csf}$$

for subband b[i] can be expressed as the product of energy weighting factors for that subband in the horizontal and vertical directions, which can be expressed by:

$$\begin{cases} \sqrt{W_{LL[D]}^{csf}} = 1 \\ \sqrt{W_{HL[d]}^{csf}} = \sqrt{W_{L[d]}^{csf}} \cdot \sqrt{W_{H[d]}^{csf}} \\ \sqrt{W_{LH[d]}^{csf}} = \sqrt{W_{H[d]}^{csf}} \cdot \sqrt{W_{L[d]}^{csf}} \\ \sqrt{W_{HH[d]}^{csf}} = \sqrt{W_{H[d]}^{csf}} \cdot \sqrt{W_{H[d]}^{csf}} \end{cases} \quad (11)$$

The energy weighting factor for the luminance signal Y in YUV 422 or 420 image data can be obtained from the above equations (11). In the YUV 444 format, all the energy weighting factors for the luminance signal and the color difference signals can be obtained from the above equations (11).

For the color difference signals U and V in YUV 422 format, since it is assumed as above described that the horizontal component is subjected to one more filtering than the vertical component, energy weighting factors for those signals can be expressed by the following equations (12), instead of the above equations (11).

$$\begin{cases} \sqrt{W_{LL[D]}^{csf}} = 1 \\ \sqrt{W_{HL[d]}^{csf}} = \sqrt{W_{L[d]}^{csf}} \cdot \sqrt{W_{H[d+1]}^{csf}} \\ \sqrt{W_{LH[d]}^{csf}} = \sqrt{W_{H[d]}^{csf}} \cdot \sqrt{W_{L[d+1]}^{csf}} \\ \sqrt{W_{HH[d]}^{csf}} = \sqrt{W_{H[d]}^{csf}} \cdot \sqrt{W_{H[d+1]}^{csf}} \end{cases} \quad (12)$$

Similarly, for the color difference signals U and V in YUV 420 format, since it is assumed that both the horizontal and vertical components are subjected to one more filtering, energy weighting factors for those signals can be expressed by the following equations (13), instead of the above equations (11).

$$\begin{cases} \sqrt{W_{LL[D]}^{csf}} = 1 \\ \sqrt{W_{HL[d]}^{csf}} = \sqrt{W_{L[d+1]}^{csf}} \cdot \sqrt{W_{H[d+1]}^{csf}} \\ \sqrt{W_{LH[d]}^{csf}} = \sqrt{W_{H[d+1]}^{csf}} \cdot \sqrt{W_{L[d+1]}^{csf}} \\ \sqrt{W_{HH[d]}^{csf}} = \sqrt{W_{H[d+1]}^{csf}} \cdot \sqrt{W_{H[d+1]}^{csf}} \end{cases} \quad (13)$$

The values of the energy weighting factors for the color difference signals U and V for "Viewing distance 1000," "Viewing distance 1700," and "Viewing distance 3000", obtained from the description of the second non-patent literature, are shown in TABLEs 7-9. In those and following tables, Cb and Cr represent the color difference signals U and V, respectively.

TABLE 7

Energy weighting factors $\sqrt{W_{b[i]}^{csf}}$ (Viewing distance 1000)

| | Decomposition Level | $\sqrt{W_{L[n]}^{csf}}$ | $\sqrt{W_{H[n]}^{csf}}$ |
|---|---|---|---|
| Cb | 1 | 0.68333 | 0.33732 |
| | 2 | 0.81063 | 0.55604 |
| | 3 | 0.89207 | 0.72918 |
| | 4 | 0.94018 | 0.84398 |
| | 5 | 0.96735 | 0.91301 |
| Cr | 1 | 0.75074 | 0.44778 |
| | 2 | 0.85423 | 0.64725 |
| | 3 | 0.91782 | 0.79063 |
| | 4 | 0.95462 | 0.88101 |
| | 5 | 0.97523 | 0.93401 |

TABLE 8

Energy weighting factors $\sqrt{W_{b[i]}^{csf}}$ (Viewing distance 1700)

| | Decomposition Level | $\sqrt{W_{L[n]}^{csf}}$ | $\sqrt{W_{H[n]}^{csf}}$ |
|---|---|---|---|
| Cb | 1 | 0.55396 | 0.17658 |
| | 2 | 0.71767 | 0.39024 |
| | 3 | 0.83345 | 0.60190 |
| | 4 | 0.90584 | 0.76107 |
| | 5 | 0.94801 | 0.86364 |
| Cr | 1 | 0.63889 | 0.27772 |
| | 2 | 0.77922 | 0.49856 |
| | 3 | 0.87223 | 0.68622 |
| | 4 | 0.92840 | 0.81606 |
| | 5 | 0.96060 | 0.89620 |

TABLE 9

Energy weighting factors $\sqrt{W_{b[i]}^{csf}}$ (Viewing distance 3000)

| | Decomposition Level | $\sqrt{W_{L[n]}^{csf}}$ | $\sqrt{W_{H[n]}^{csf}}$ |
|---|---|---|---|
| Cb | 1 | 0.39897 | 0.05842 |
| | 2 | 0.58653 | 0.21145 |
| | 3 | 0.74224 | 0.43082 |
| | 4 | 0.84937 | 0.63510 |
| | 5 | 0.91531 | 0.78344 |
| Cr | 1 | 0.49254 | 0.12238 |
| | 2 | 0.66780 | 0.31727 |

TABLE 9-continued

Energy weighting factors $\sqrt{W_{b[i]}^{csf}}$ (Viewing distance 3000)

| Decomposition Level | $\sqrt{W_{L[n]}^{csf}}$ | $\sqrt{W_{H[n]}^{csf}}$ |
|---|---|---|
| 3 | 0.79932 | 0.53628 |
| 4 | 0.84470 | 0.71395 |
| 5 | 0.93565 | 0.83374 |

Using the values given in TABLEs 7-9 and the above equations (11)-(13), energy weighting factors for image data in YUV 422 and 420 formats are obtained, which are shown in TABLEs 10-12 and 13-15, respectively.

TABLE 10

Energy weighting factors $\sqrt{W_{b[i]}^{csf}}$ in YUV 422 format (Viewing distance 1000)

| | Decomposition Level | LL | HL | LH | HH |
|---|---|---|---|---|---|
| Y | 1 | X | 0.75635 | 0.75635 | 0.57306 |
| | 2 | X | 0.99828 | 0.99828 | 0.99656 |
| | 3 | X | 1 | 1 | 1 |
| | 4 | X | 1 | 1 | 1 |
| | 5 | 1 | 1 | 1 | 1 |
| Cb | 1 | X | 0.37996 | 0.27344 | 0.18756 |
| | 2 | X | 0.59109 | 0.49603 | 0.40545 |
| | 3 | X | 0.75289 | 0.68556 | 0.61541 |
| | 4 | 1 | 0.85839 | 0.81642 | 0.77056 |
| | 5 | | | | |
| Cr | 1 | X | 0.48592 | 0.38251 | 0.28983 |
| | 2 | X | 0.67538 | 0.59406 | 0.51174 |
| | 3 | X | 0.80861 | 0.75476 | 0.69656 |
| | 4 | 1 | 0.89163 | 0.85919 | 0.82287 |
| | 5 | | | | |

TABLE 11

Energy weighting factors $\sqrt{W_{b[i]}^{csf}}$ in YUV 422 format (Viewing distance 1700)

| | Decomposition Level | LL | HL | LH | HH |
|---|---|---|---|---|---|
| Y | 1 | X | 0.30719 | 0.30719 | 0.10892 |
| | 2 | X | 0.86159 | 0.86159 | 0.75234 |
| | 3 | X | 1 | 1 | 1 |
| | 4 | X | 1 | 1 | 1 |
| | 5 | 1 | 1 | 1 | 1 |
| Cb | 1 | X | 0.21617 | 0.12672 | 0.06891 |
| | 2 | X | 0.43191 | 0.32525 | 0.23489 |
| | 3 | X | 0.63431 | 0.54522 | 0.45808 |
| | 4 | 1 | 0.78232 | 0.72152 | 0.65729 |
| | 5 | | | | |
| Cr | 1 | X | 0.31853 | 0.216414 | 0.13846 |
| | 2 | X | 0.53471 | 0.43486 | 0.34212 |
| | 3 | X | 0.71179 | 0.63708 | 0.55999 |
| | 4 | 1 | 0.83203 | 0.78390 | 0.73135 |
| | 5 | | | | |

TABLE 12

Energy weighting factors $\sqrt{W_{b[i]}^{csf}}$ in YUV 422 format (Viewing distance 3000)

| | Decomposition Level | LL | HL | LH | HH |
|---|---|---|---|---|---|
| Y | 1 | X | 0.03818 | 0.03849 | 0.00308 |
| | 2 | X | 0.41063 | 0.41063 | 0.18276 |
| | 3 | X | 0.92105 | 0.92105 | 0.84832 |
| | 4 | X | 1 | 1 | 1 |
| | 5 | 1 | 1 | 1 | 1 |
| Cb | 1 | X | 0.08436 | 0.03427 | 0.01235 |
| | 2 | X | 0.25269 | 0.15695 | 0.09110 |
| | 3 | X | 0.47139 | 0.36593 | 0.27362 |
| | 4 | 1 | 0.66543 | 0.58131 | 0.49756 |
| | 5 | | | | |
| Cr | 1 | X | 0.15627 | 0.08173 | 0.03883 |
| | 2 | X | 0.35813 | 0.25360 | 0.17014 |
| | 3 | X | 0.57068 | 0.47444 | 0.38288 |
| | 4 | 1 | 0.73761 | 0.66801 | 0.59525 |
| | 5 | | | | |

TABLE 13

Energy weighting factors $\sqrt{W_{b[i]}^{csf}}$ in YUV 420 format (Viewing distance 1000)

| | Decomposition Level | LL | HL | LH | HH |
|---|---|---|---|---|---|
| Y | 1 | X | 0.75635 | 0.75635 | 0.57306 |
| | 2 | X | 0.99828 | 0.99828 | 0.99656 |
| | 3 | X | 1 | 1 | 1 |
| | 4 | X | 1 | 1 | 1 |
| | 5 | 1 | 1 | 1 | 1 |
| Cb | 1 | X | 0.45074 | 0.45074 | 0.30918 |
| | 2 | X | 0.65048 | 0.65048 | 0.5317 |
| | 3 | X | 0.79349 | 0.79349 | 0.71230 |
| | 4 | 1 | 0.88320 | 0.88320 | 0.83358 |
| | 5 | | | | |
| Cr | 1 | X | 0.55290 | 0.55290 | 0.41894 |
| | 2 | X | 0.72566 | 0.72566 | 0.62510 |
| | 3 | X | 0.84103 | 0.84103 | 0.77618 |
| | 4 | 1 | 0.91088 | 0.91088 | 0.87238 |
| | 5 | | | | |

TABLE 14

Energy weighting factors $\sqrt{W_{b[i]}^{csf}}$ in YUV 420 format (Viewing distance 1700)

| | Decomposition Level | LL | HL | LH | HH |
|---|---|---|---|---|---|
| Y | 1 | X | 0.30719 | 0.30719 | 0.10892 |
| | 2 | X | 0.86159 | 0.86159 | 0.74234 |
| | 3 | X | 1 | 1 | 1 |
| | 4 | X | 1 | 1 | 1 |
| | 5 | 1 | 1 | 1 | 1 |
| Cb | 1 | X | 0.28007 | 0.28006 | 0.15229 |
| | 2 | X | 0.50165 | 0.50165 | 0.36228 |
| | 3 | X | 0.68940 | 0.68940 | 0.57922 |
| | 4 | 1 | 0.81877 | 0.81876 | 0.74588 |
| | 5 | | | | |
| Cr | 1 | X | 0.38849 | 0.38849 | 0.24857 |
| | 2 | X | 0.59854 | 0.59854 | 0.47089 |
| | 3 | X | 0.75763 | 0.75763 | 0.66595 |
| | 4 | 1 | 0.86089 | 0.86089 | 0.80317 |
| | 5 | | | | |

TABLE 15

Energy weighting factors $\sqrt{W_{b[i]}^{csf}}$ in YUV 420 format
(Viewing distance 3000)

| | Decomposition Level | LL | HL | LH | HH |
|---|---|---|---|---|---|
| Y | 1 | X | 0.03849 | 0.03849 | 0.00308 |
| | 2 | X | 0.41063 | 0.41063 | 0.18276 |
| | 3 | X | 0.92105 | 0.92105 | 0.84832 |
| | 4 | X | 1 | 1 | 1 |
| | 5 | 1 | 1 | 1 | 1 |
| Cb | 1 | X | 0.12402 | 0.12402 | 0.04471 |
| | 2 | X | 0.31977 | 0.31977 | 0.18561 |
| | 3 | X | 0.53943 | 0.53944 | 0.40335 |
| | 4 | 1 | 0.71709 | 0.71709 | 0.61378 |
| | 5 | | | | |
| Cr | 1 | X | 0.21187 | 0.21187 | 0.10066 |
| | 2 | X | 0.42866 | 0.42866 | 0.28759 |
| | 3 | X | 0.63163 | 0.63163 | 0.50973 |
| | 4 | 1 | 0.78009 | 0.78009 | 0.69513 |
| | 5 | | | | |

Substituting the values of the norms given in TABLEs 5 and 6 into the above equations (1) and (2) yields a normalized quantization step size $\Delta_b$; and substituting the values of the norms given in TABLEs 5 and 6 and the values of the energy weighting factors given in TABLEs 10-15 into the above equations (1) and (8) yields a visually weighted quantization step size $\Delta_b$ which takes into account the human visual characteristics.

For example, let the quantization parameter $Q_p=16$ for all of the luminance signal Y and the color difference signals U and V. Then, the quantization step sizes $\Delta_b$ for the luminance signal Y and the color difference signals U and V when visual weighting optimized for a viewing distance of 3000 is applied to YUV 422 color image data are obtained by using the values of the norms given in TABLE 5, the values of the energy weighting factors given in TABLE 12, and the above equations (1) and (8). The results are shown in TABLEs 16-18.

TABLE 16

Quantization step sizes $\Delta_b$ for luminance
signal Y in YUV 422 format (Viewing distance 3000)

| Decomposition Level | LL | HL | LH | HH |
|---|---|---|---|---|
| 1 | X | 411.08509 | 411.08509 | 10002.06109 |
| 2 | X | 19.51345 | 19.51345 | 90.51394 |
| 3 | X | 4.15253 | 4.15253 | 9.07090 |
| 4 | X | 1.87483 | 1.87483 | 3.72051 |
| 5 | 0.47163 | 0.93204 | 0.93204 | 1.84189 |

TABLE 17

Quantization step sizes $\Delta_b$ for color difference
signal U(Cb) in YUV 422 format (Viewing distance 3000)

| Decomposition Level | LL | HL | LH | HH |
|---|---|---|---|---|
| 1 | X | 137.54117 | 4318.85669 | 1825.95586 |
| 2 | X | 21.62733 | 35.73031 | 123.85047 |
| 3 | X | 5.64163 | 7.36832 | 19.55534 |
| 4 | 0.66751 | 1.98239 | 2.27873 | 5.26121 |

TABLE 18

Quantization step sizes $\Delta_b$ for color difference
signal V(Cr) in YUV 422 format (Viewing distance 3000)

| Decomposition Level | LL | HL | LH | HH |
|---|---|---|---|---|
| 1 | X | 74.25290 | 133.68785 | 580.93701 |
| 2 | X | 15.25998 | 22.11257 | 66.31184 |
| 3 | X | 4.66012 | 5.68306 | 13.97490 |
| 4 | 0.66751 | 1.78840 | 1.98298 | 4.39776 |

Here, the quantization parameter $Q_p$ used in obtaining the quantization step size $\Delta_b$ for each of the luminance signal Y and the color difference signals U and V is not necessarily the same value, and different values may be used according to the contents of image data. For example, for enhancement of color components, the quantization parameter $Q_p$ used for the color difference signals U and V may be smaller than that used for the luminance signal Y. In this way, an appropriate quantization parameter $Q_p$ for each signal may be used in consideration of the contents of image data and the like.

The image-quality control unit 23 obtains the quantization step size $\Delta_b$ in this way and gives it to the quantization unit 14. Then, the quantization unit 14 performs quantization with the given quantization step size $\Delta_b$ for each subband. At this time, if the quantization step size $\Delta_b$ is less than 1, as previously described, it is multiplied by powers of 2 to obtain a value of 1 or more before quantization.

As so far described, the image-quality control method according to this preferred embodiment implements image quality control by quantization and thereby allows precise control according to target image quality. Since there is no need for complicated processes such as finding an optimal solution, high speed processing is allowed with minimal operations. Besides, it is also possible to generate a compressed image with high display image quality in consideration of the human visual characteristics.

<Rate Control>

Next, the processing details of the rate control unit 22 shown in FIG. 1 are described. The rate control unit 22 controls the rate of the coded data AD inputted from the arithmetic coding unit 21 according to instructions from the image-quality control unit 23. The specifics of the rate control are described hereinbelow.

First, when a predetermined value of the quantization parameter $Q_p$ is specified as target image quality, the image-quality control unit 23 calculates, the quantization step size $\Delta_b$ based on this value by the aforementioned method and gives it to the quantization unit 14 and the rate control unit 22.

Upon receipt of the quantization step size $\Delta_b$, the quantization unit 14, based on this value, quantizes image data which has been subjected to DWT in the DWT unit 13.

The rate control unit 22 sorts the coded data AD which has been processed by the coefficient bit modeling unit 20 and the arithmetic coding unit 21 after quantized by the quantization unit 14, in ascending order of the quantization step size $\Delta_b$ which corresponds to the coded data AD provided from the image-quality control unit 23.

When the coded data AD is quantized with the quantization step size $\Delta_b$ which has been converted into a value of 1 or more as previously described, the sorting is performed according to the converted quantization step size $\Delta_b$; however, at this time, the coded data AD is shifted to the left by the number of bits corresponding to the exponent of the powers of 2 used for multiplication to convert the quantization step size $\Delta_b$. A specific form of processing is described hereinbelow.

For example, the quantization step size $\Delta_b$ for the subband LL5 in TABLE 4 is 0.47163, but for actual quantization of image data, this value is multiplied by $2^2$ to obtain the value of 1.88652. In rate control, therefore, coded data AD in the subband LL5 is shifted to the left by 2 bits in correspondence with the exponent of $2^2$ used for multiplication to convert the quantization step size $\Delta_b$. Similarly, the quantization step size $\Delta_b$ of 0.93204 for the subband HL5 is multiplied by 2 to obtain the value of 1.86408 for quantization. In rate control, therefore, coded data AD in the subband HL5 is shifted to the left by 1 bit in correspondence with the exponent of 2 used for multiplication. That is, when quantization is performed with the quantization step size $\Delta_b$ multiplied by $2^m$, coded data concerned is shifted to the left by the number of bits corresponding to the exponent m during rate control, whereby the priority of data is controlled.

Figure 8:
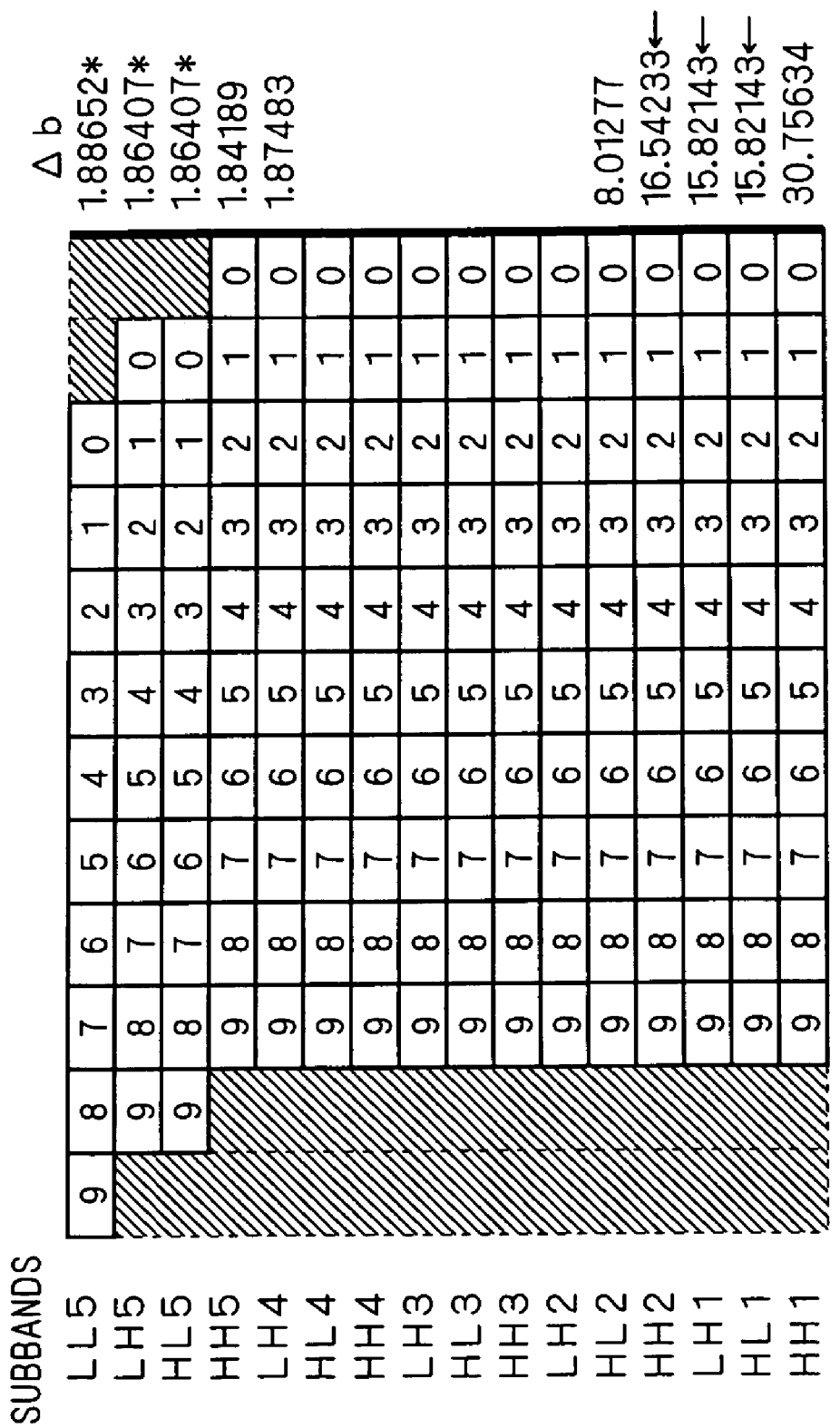
FIG. 8 shows bit shifting of a code sequence.

FIG. 8 shows a code sequence subjected to such a bit-shift operation based on the quantization step size $\Delta_b$ shown in TABLE 4. In the figure, each part of the code sequence marked with an asterisk indicates that the value of the quantization step size $\Delta_b$ is converted for quantization, and the numbers 0 through 9 on each bit of the code sequence indicate a number of a bit plane to which that bit belongs. Here, the least significant bit number is 0, and the most significant bit number is 9.

Figure 9:
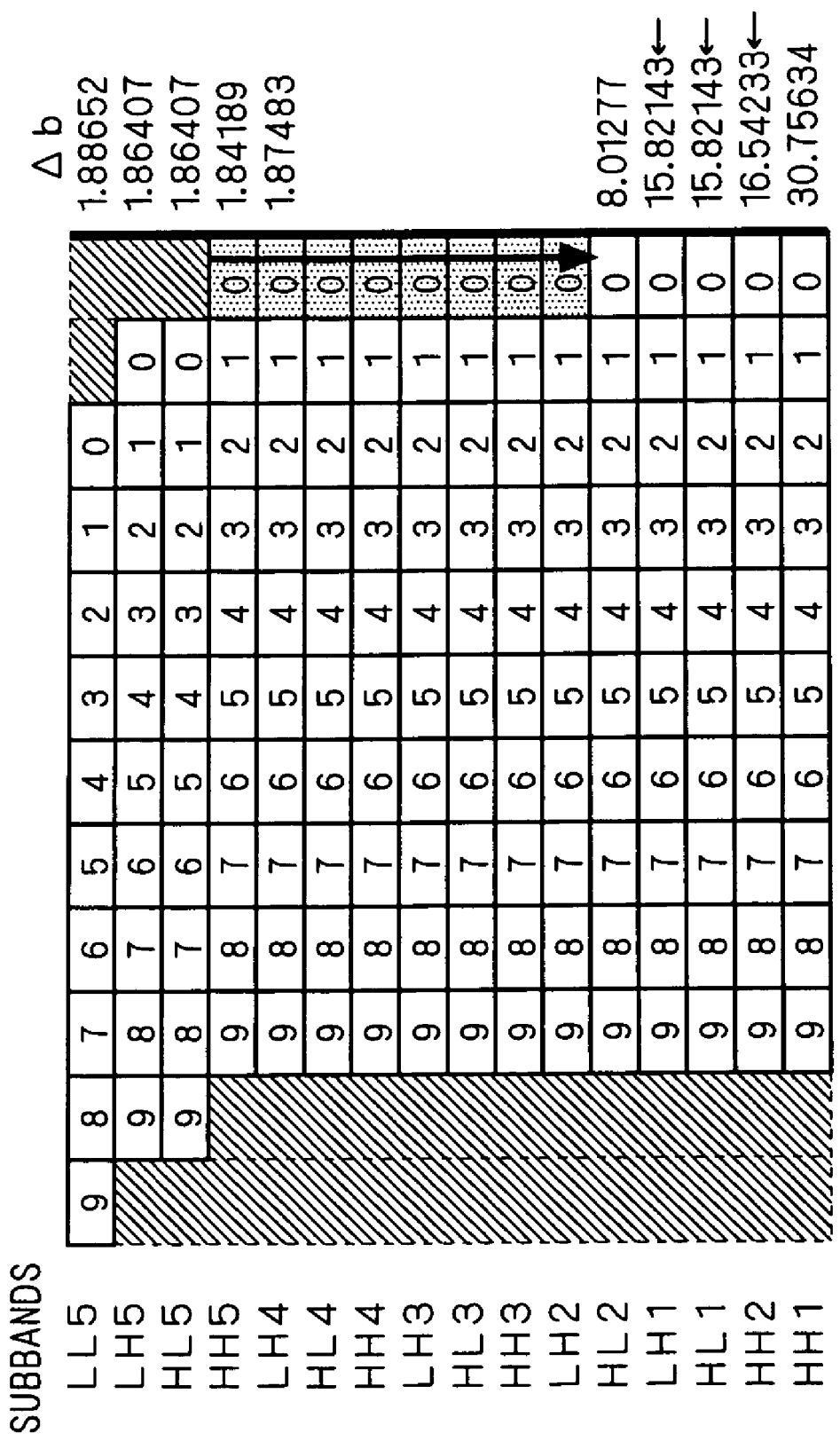
FIG. 9 shows sorting of a code sequence.

Then, the code sequence is sorted in ascending order of the quantization step size $\Delta_b$ used for quantization. In FIG. 8, the values of the quantization step sizes $\Delta_b$ in the parts indicated by the arrows are not in ascending order; thus, those parts are sorted. The code sequence sorted in this way is shown in FIG. 9. The arrows in FIG. 9 indicate parts of the code sequence whose positions are shifted from their positions in FIG. 8.

Using the sorted code sequence as shown in FIG. 9, the rate control unit 22 truncates data so that a total capacity of data falls within a predetermined capacity. The data truncation occurs in sequence from the rightmost bit. For example, in the case of FIG. 9, if the total capacity of data can be managed within a predetermined capacity by truncation of up to data of bit 0 in the subband LH2, data will be truncated from data of bit 0 in the subband HH5 downwardly in sequence through data of bit 0 in the subband LH4, data of bit 0 in the subband HL4, and so on, then to the data of bit 0 in the subband LH2, i.e., data in the dotted area in FIG. 9 will be truncated.

In this way, bit data in each subband, sorted by the value of the quantization step size $\Delta_b$, is truncated from the lower-order bits, by which rate control is achieved.

The rate control can also be achieved in a similar way in the case of color images and in the case where the quantization step size $\Delta_b$ is calculated by applying visual weighting.

For example, if, as previously described, the quantization parameter $Q_p$=16 and visual weighting optimized for a viewing distance of 3000 is applied to YUV 422 color image data, the quantization step sizes $\Delta_b$ for the luminance signal Y and the color difference signals U and V are as shown in TABLEs 16-18.

At this time, the quantization step sizes $\Delta_b$ of less than 1 in TABLEs 16-18 are, as previously described, multiplied by powers of 2 for quantization. Then, in rate control, the coded data AD which has been quantized with the converted quantization step size $\Delta_b$ is shifted to the left by the number of bits corresponding to the exponent of the powers of 2 used for multiplication of the original quantization step size $\Delta_b$. In the case of color images, there are data on each of the luminance signal Y and the color difference signals U and V; however, in rate control, all those data are sorted together in ascending order of the quantization step size $\Delta_b$ without being classified by signal. A resultant code sequence is shown in FIG. 10. In the figure, YLL5 represents data on the luminance signal Y in the subband LL5. In this way, all the data on the luminance signal Y and the color difference signals U and V are subjected to the aforementioned bit shifting and sorting processes. Then, as previously described, data as shown for example by the dotted area in FIG. 10 is truncated in sequence from the rightmost bit, in order to control the amount of data within a predetermined capacity.

The aforementioned rate control can also be achieved in a similar way in the case where image data is divided into tiles for processing.

Figure 11:
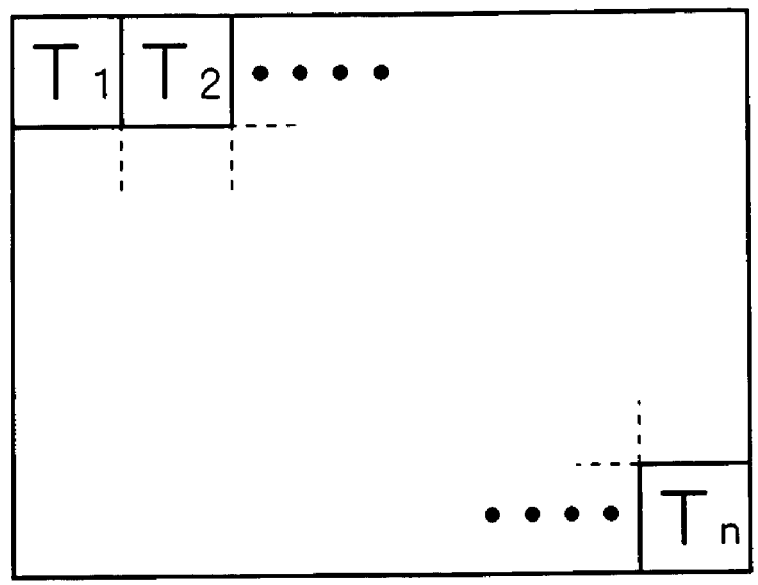
FIG. 11 shows tiling of image data.

For example, if color image data is divided into tiles $T_1$ to $T_n$ for processing as shown in FIG. 11, the quantization step size $\Delta_b$ is obtained for quantization for every one of the luminance signal Y and the color difference signals U and V in each tile, as above described.

At this time, the quantization step size $\Delta_b$ of less than 1 is multiplied by powers of 2 to obtain a numerical value of 1 or more for quantization, and in rate control, such data is shifted to the left by the number of bits corresponding to the exponent of the powers of 2, as previously described.

In the processing of a tiled color image, there are data on the luminance signal Y and the color difference signals U and V for each tile; however, in rate control, all those data are sorted together in ascending order of the quantization step size $\Delta_b$ without being classified by tile or by signal. A resultant code sequence is shown in FIG. 12. In the figure, YT1LL5 represents data on the luminance signal Y in the subband LL5 in the tile $T_1$. In this way, all the data on the luminance signal Y and the color difference signals U and V in all of the tiles $T_1$-$T_n$ are subjected to the aforementioned bit shifting and sorting processes. Then, as previously described, data as shown for example by the dotted area in FIG. 12 is truncated in sequence from the rightmost bit, in order to control the amount of data within a predetermined capacity.

Thus, rate control can always be implemented through the same process steps, irrespective of whether image data is color or not, whether visual weighting is considered or not, or whether data is tiled for processing or not. Such rate control allows precise control over the amount of data.

Now, it should be noted that if, at a stage of after-quantization in the quantization unit 14, the total capacity of data is already within a predetermined capacity intended by the user, the aforementioned rate control is not necessary.

From the above description, the rate control process according to this preferred embodiment eliminates the necessity of calculating the amount of distortion in each coding pass for rate-distortion optimization and thereby achieves highly efficient rate control with high immediacy and with significantly reduced overhead.

<Image Data Evaluation>

FIGS. 13 through 23 show the results of objective evaluation of compressed image data, using the aforementioned image-quality control process by quantization.

Image data used for evaluation is high-resolution standard digital color image data, "portrait," of image size 2048×2560 pixels, Sample No. 1, Image Identification No. N1, defined by ISO/JIS-SCD JIS X 9201-1995.

In the figures, the vertical axis represents the peak signal to noise ratio (PSNR), and the horizontal axis represents the bit per pixel (BPP).

Figure 13:
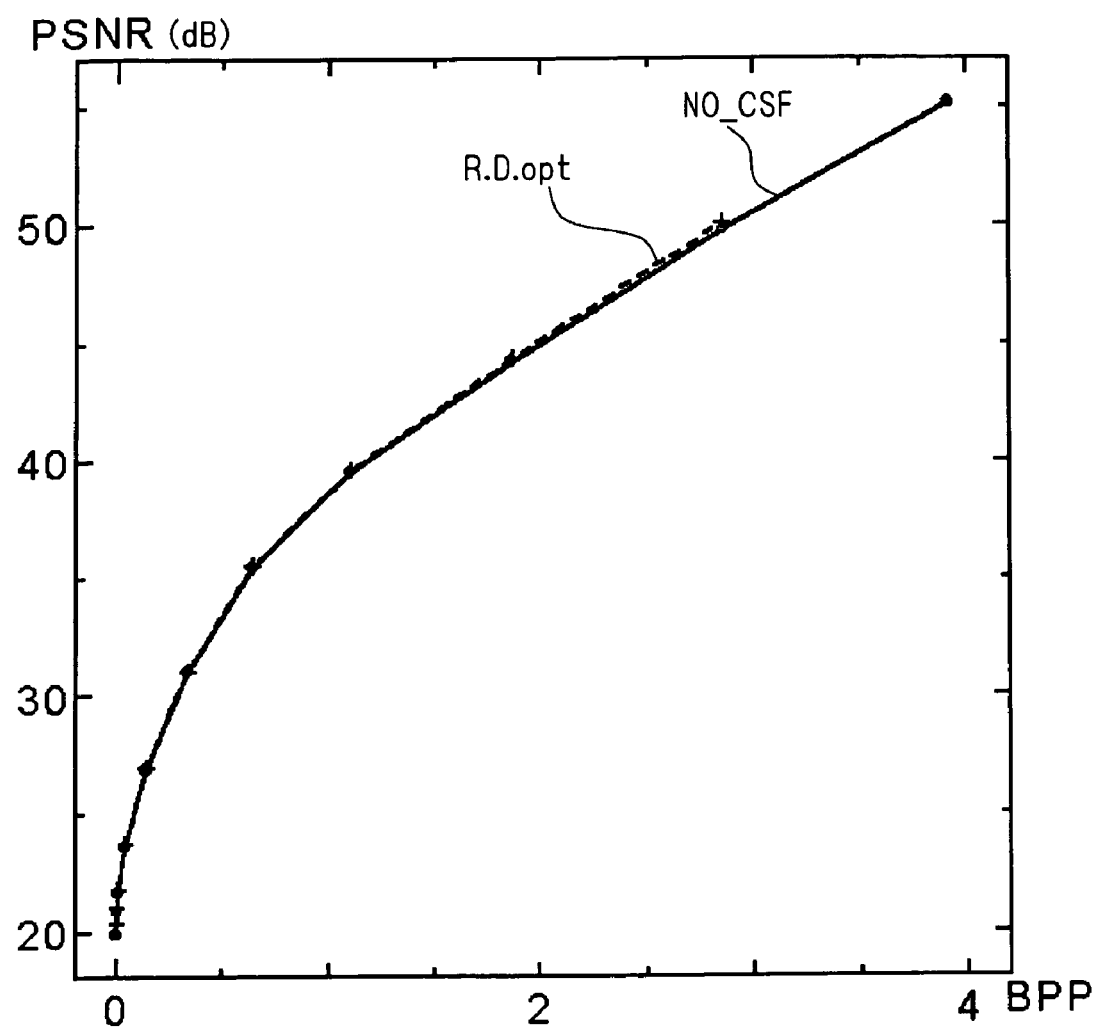
FIG. 13 shows the comparison result of objective evaluation of compressed images between the first preferred embodiment according to the present invention and a conventional technique.

FIG. 13 shows data "NO_CSF" which is compressed without visual weighting by the aforementioned method; and data "R.D.opt" which is compressed by the rate-distortion (R-D) optimization method described in the first non-patent literature. Since both curves are mostly overlapped, it can be found that the aforementioned method can achieve similar coding efficiency to the conventional method described in the first non-patent literature, in spite of its compression and coding techniques without requiring any complicated process such as finding an optimal solution.

Figure 14:
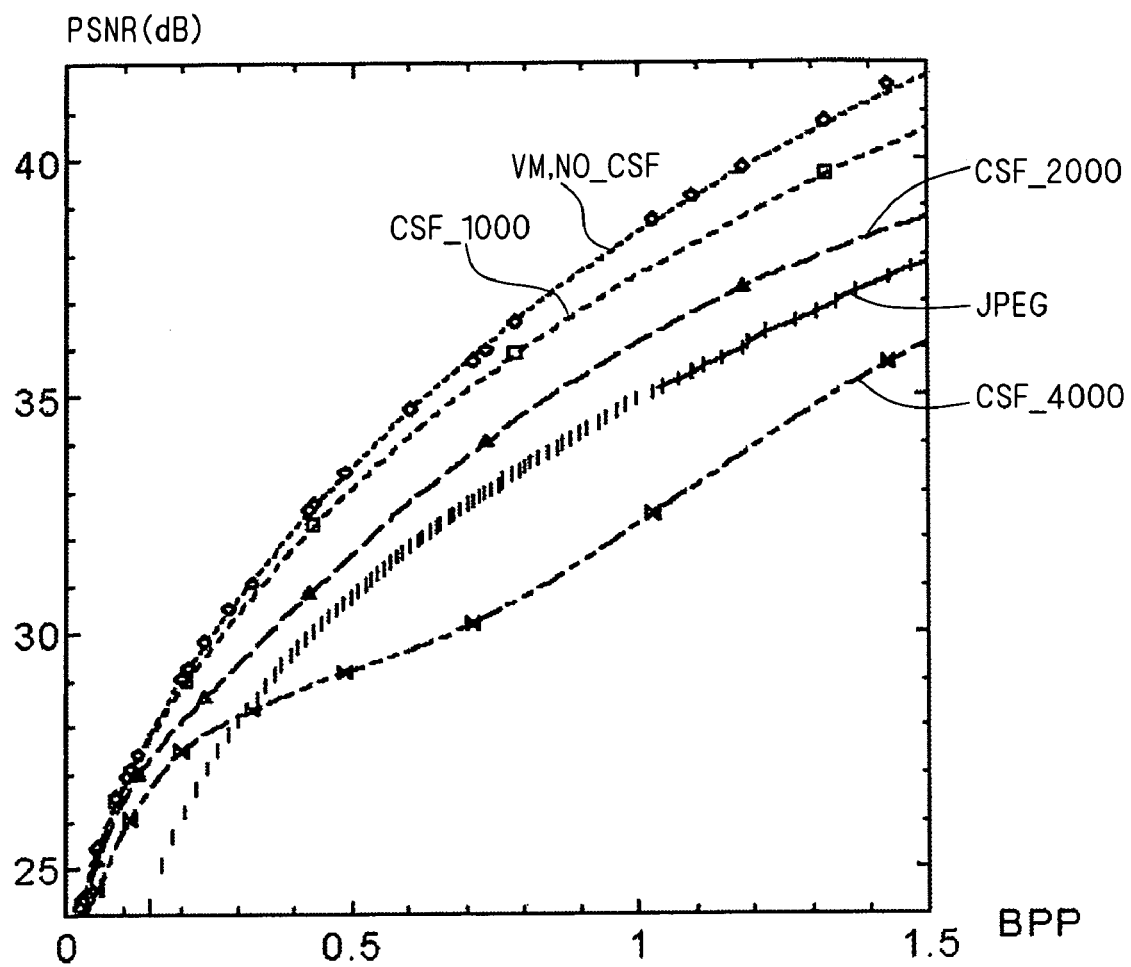
FIG. 14 shows the comparison result of objective evaluation of compressed images between the first preferred embodiment according to the present invention and the conventional JPEG standard.
Figure 16:
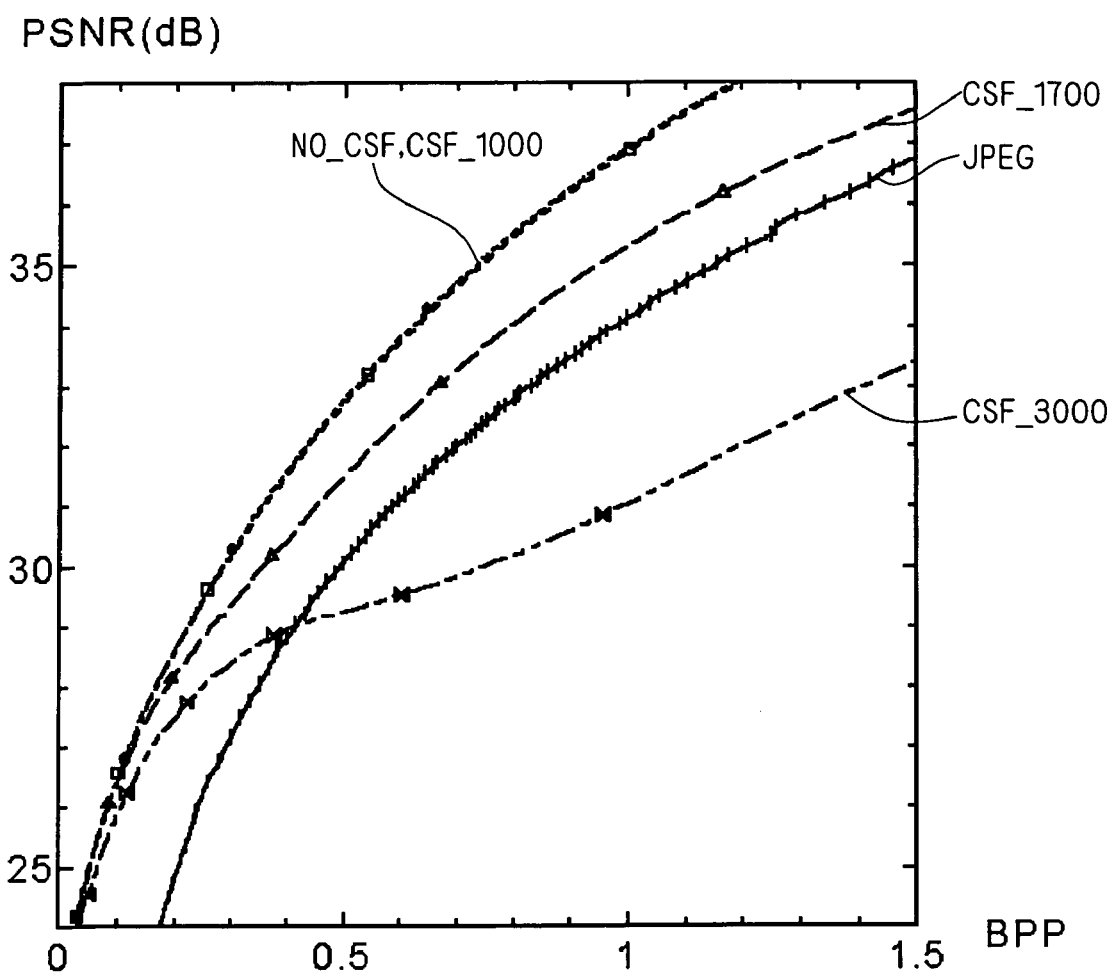
FIG. 16 shows the comparison result of objective evaluation of the G signal in YUV420 compressed images between the first preferred embodiment according to the present invention and the conventional JPEG standard.
Figure 17:
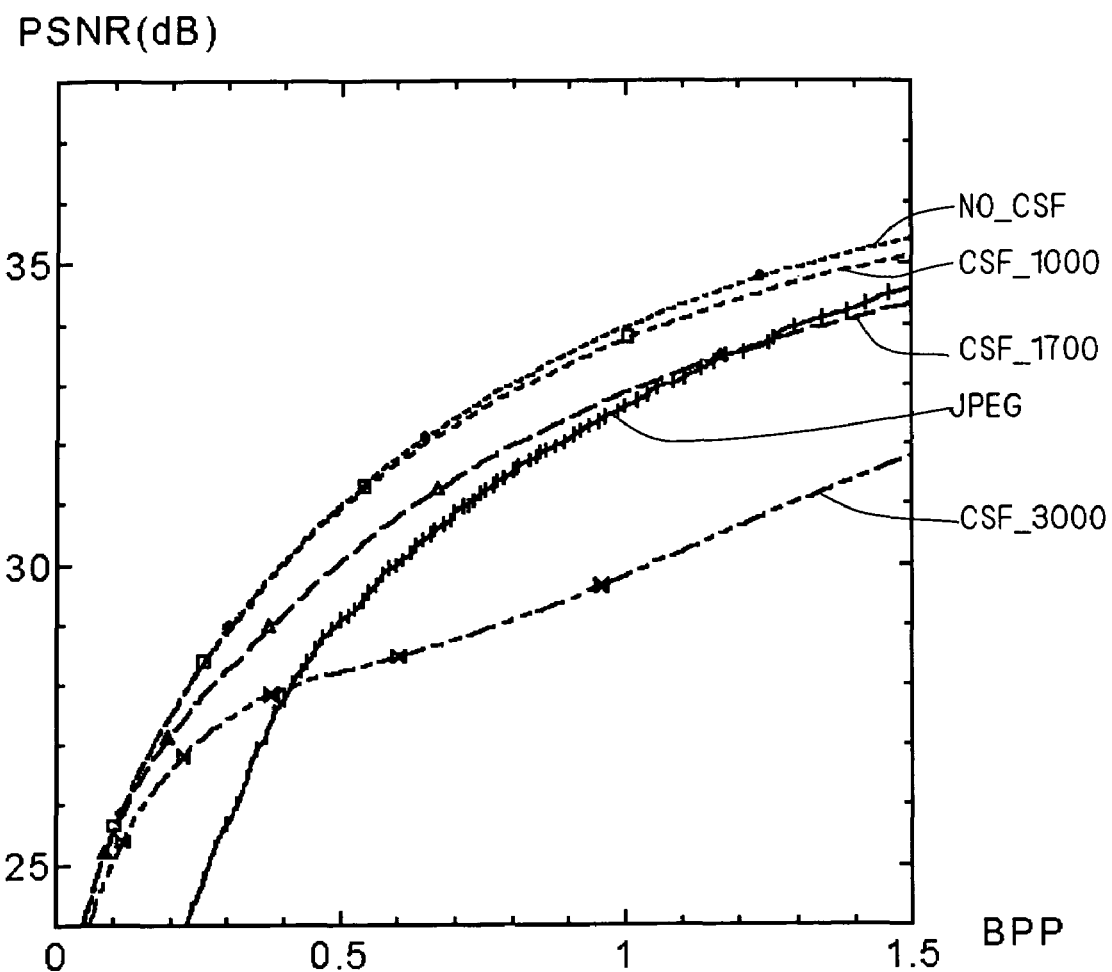
FIG. 17 shows the comparison result of objective evaluation of the B signal in YUV420 compressed images between the first preferred embodiment according to the present invention and the conventional JPEG standard.
Figure 18:
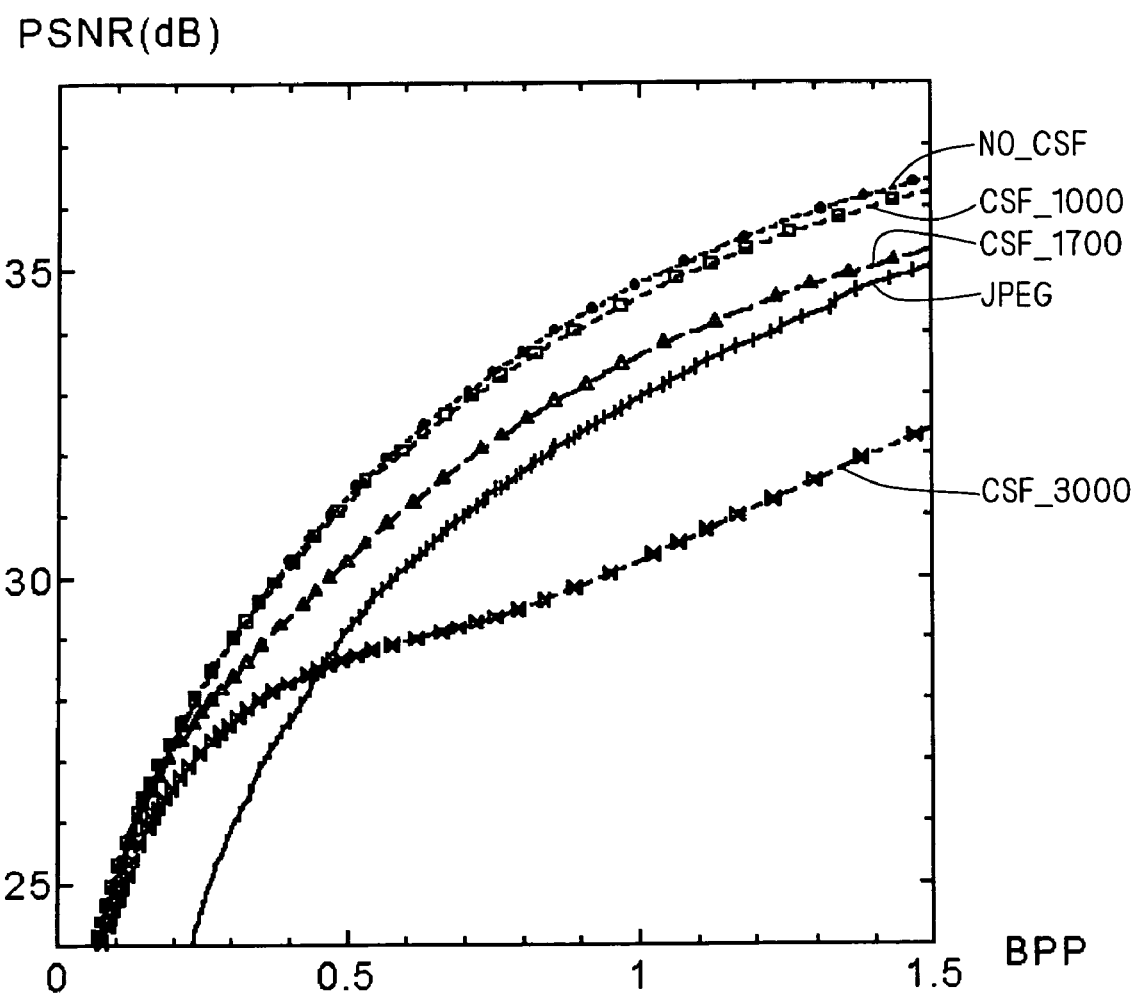
FIG. 18 shows the comparison result of objective evaluation of the R signal in YUV422 compressed images between the first preferred embodiment according to the present invention and the conventional JPEG standard.
Figure 19:
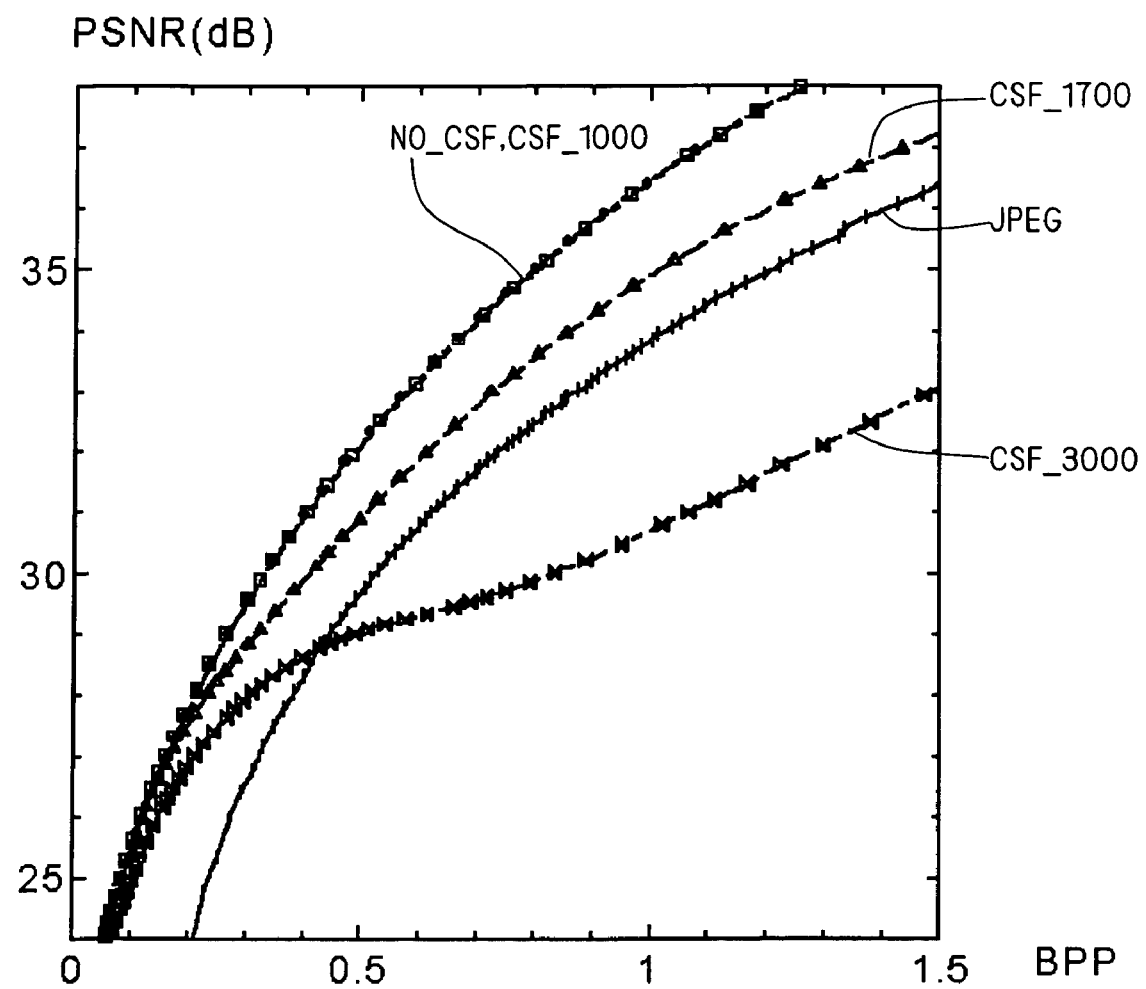
FIG. 19 shows the comparison result of objective evaluation of the G signal in YUV422 compressed images between the first preferred embodiment according to the present invention and the conventional JPEG standard.
Figure 20:
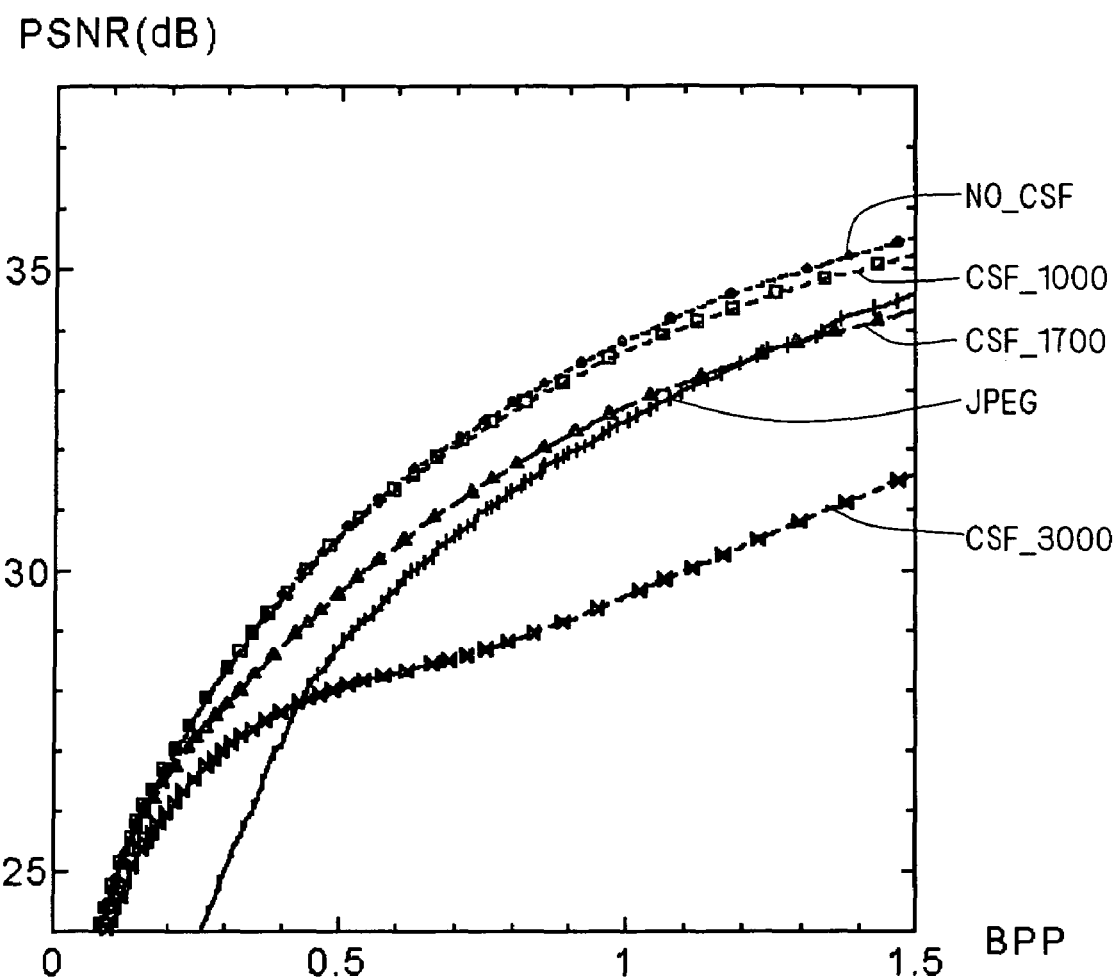
FIG. 20 shows the comparison result of objective evaluation of the B signal in YUV422 compressed images between the first preferred embodiment according to the present invention and the conventional JPEG standard.
Figure 21:
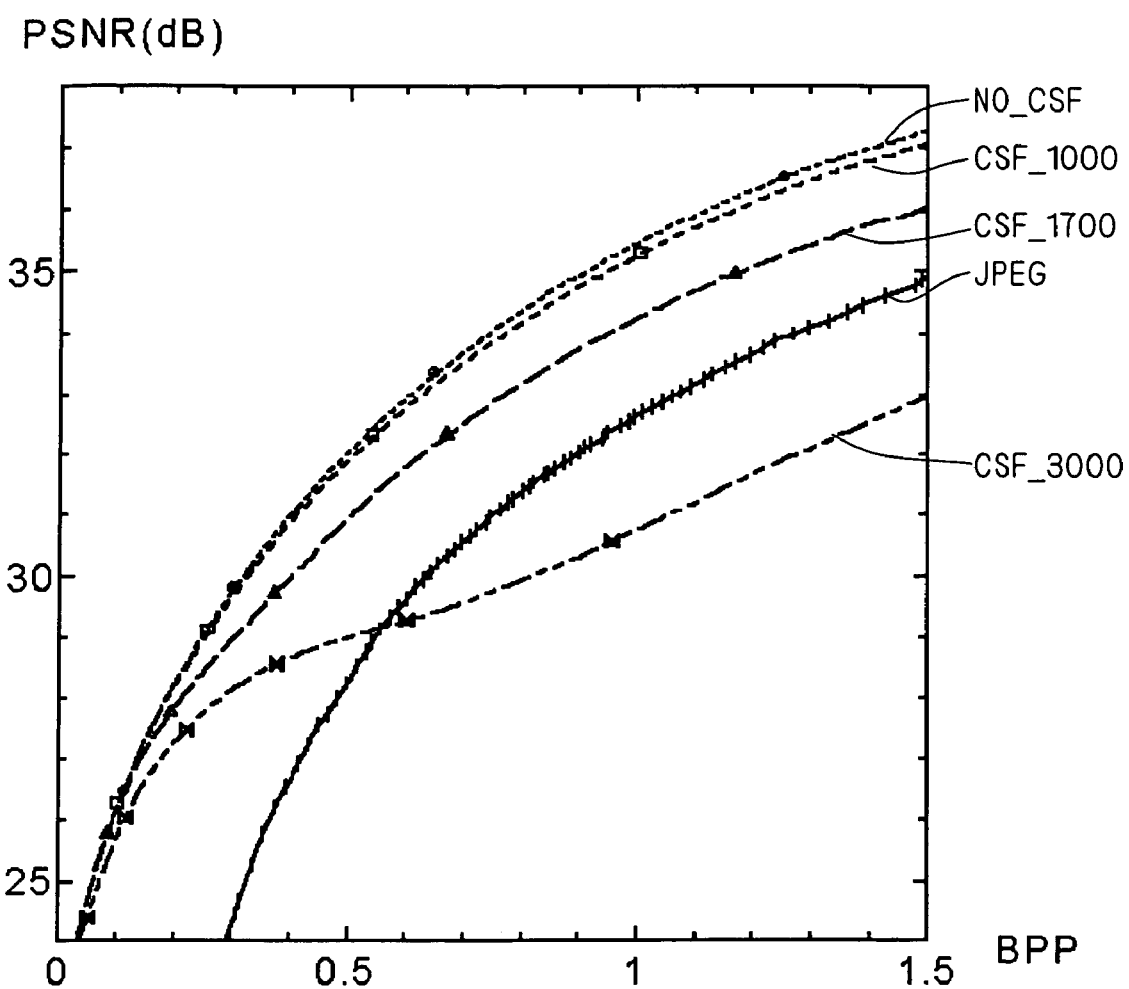
FIG. 21 shows the comparison result of objective evaluation of the R signal in YUV444 compressed images between the first preferred embodiment according to the present invention and the conventional JPEG standard.
Figure 22:
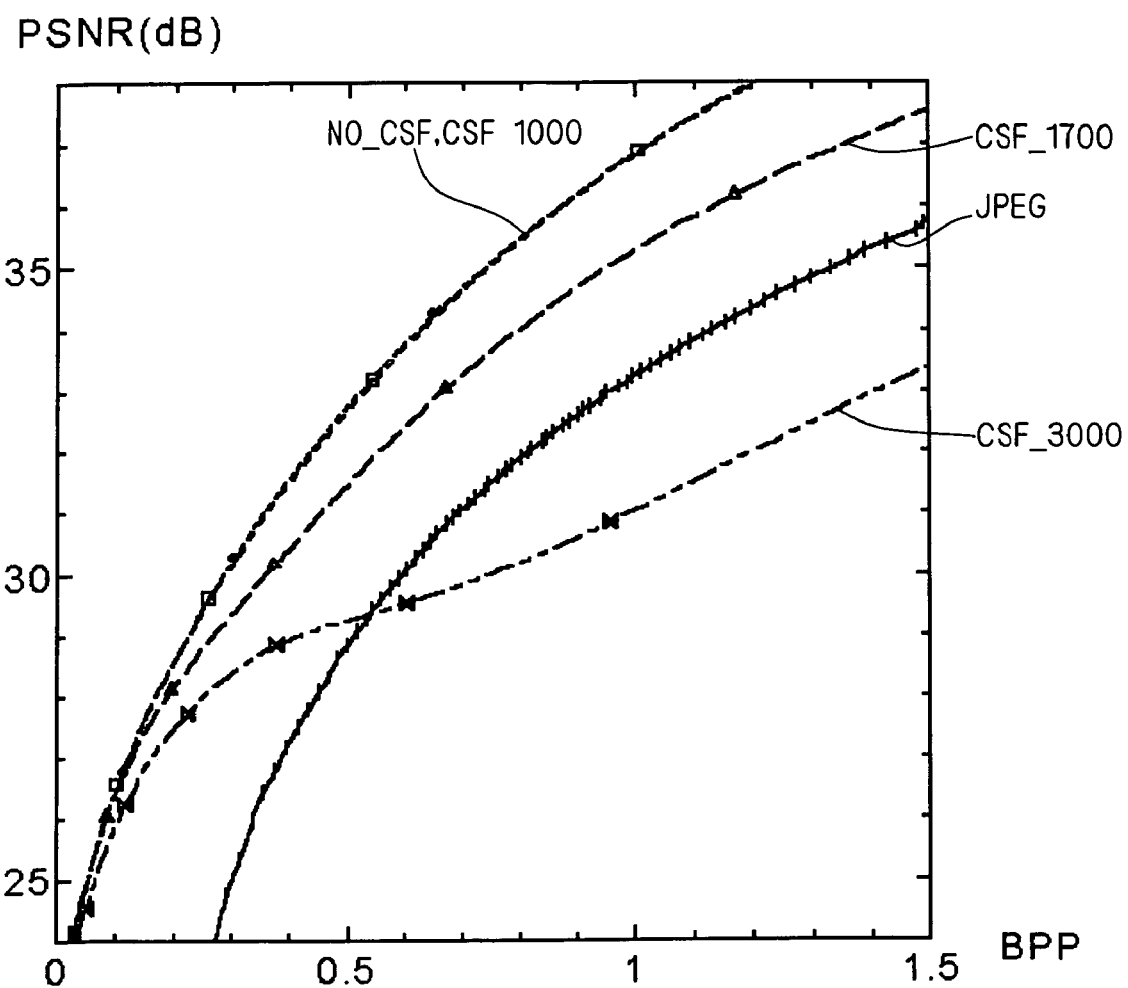
FIG. 22 shows the comparison result of objective evaluation of the G signal in YUV444 compressed images between the first preferred embodiment according to the present invention and the conventional JPEG standard.
Figure 23:
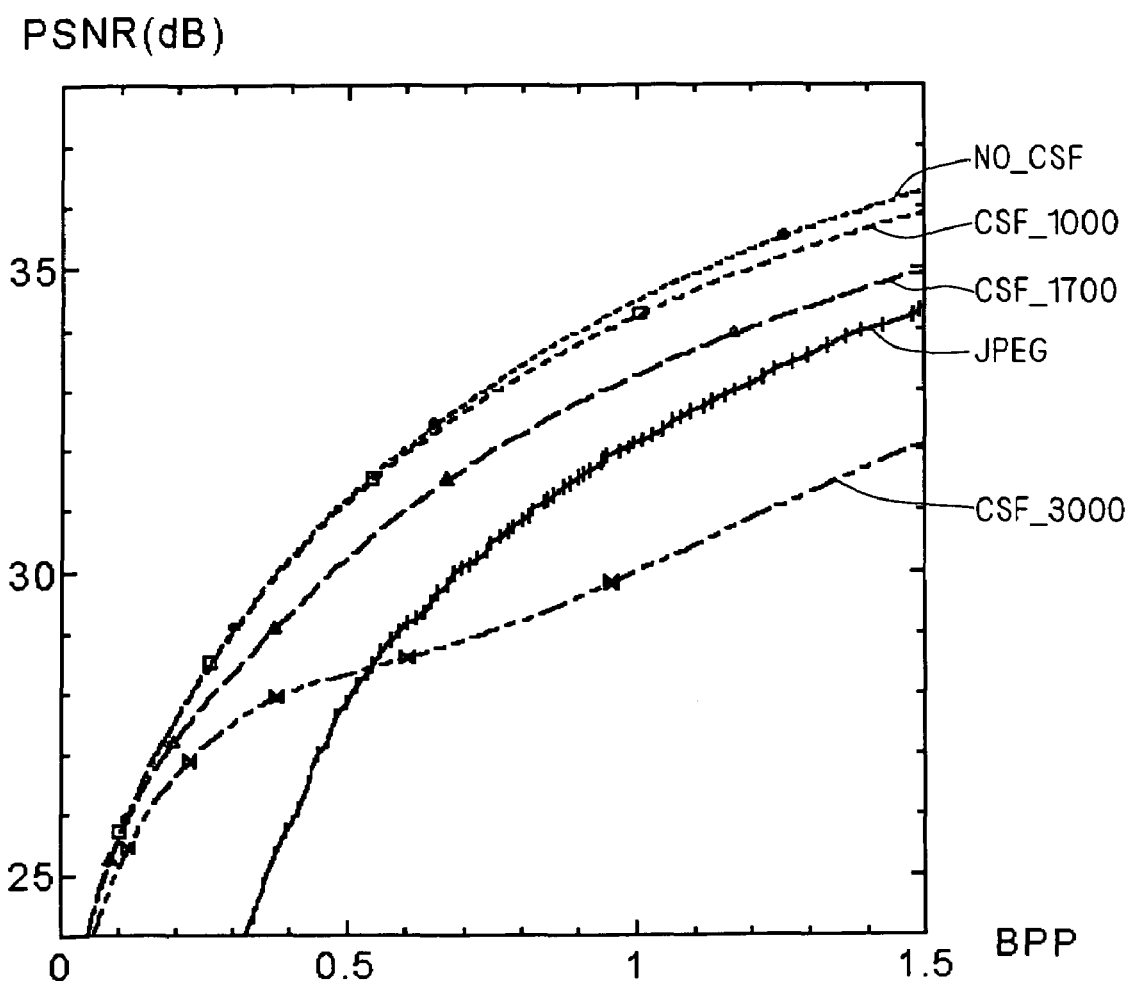
FIG. 23 shows the comparison result of objective evaluation of the B signal in YUV444 compressed images between the first preferred embodiment according to the present invention and the conventional JPEG standard.

FIG. 14 shows the evaluation results for a monochrome image. FIGS. 15-17 show the evaluation results of the RGB colors, respectively, in a color image compressed in YUV 420 format. Similarly, FIGS. 18-20 show the evaluation results of the RGB colors, respectively, in a color image compressed in YUV 422 format; and FIGS. 21-23 show the evaluation results of the RGB colors, respectively, in a color image compressed in YUV 444 format.

In FIGS. 14 to 23, data labeled as "JPEG" shows the evaluation result of data compressed in the conventional JPEG format, and all the other data show the evaluation results of data compressed in the JPEG2000 format.

In the case of compression in the JPEG2000 format, data labeled as "VM" shows the evaluation result of data compressed according to a Verification Model defined by ISO SC29/WG1, and other data labeled with symbols including "CSF" show the evaluation results of data compressed according to the aforementioned preferred embodiment of the present invention.

Of the data compressed according to the present invention, data labeled as "NO_CSF" shows the evaluation result of data compressed without applying visual weighting in obtaining the quantization step size $\Delta_b$, and data labeled with a combination of "CSF_" and a numerical value shows the evaluation result of data compressed with visual weighting. The numerical value combined with "CSF_" indicates a viewing distance. For example, "CSF_1000" represents data compressed with visual weighting optimized for a viewing distance of 1000 according to the aforementioned preferred embodiment of the present invention.

For example, the PSNR values in the case of compression without visual weighting or with visual weighting optimized for a viewing distance of 1000 are higher than those values in the case of compression in the conventional JPEG format. This shows that when image data is compressed into the same capacity, the compression technique according to the present invention produces higher quality of compressed image data and achieves better objective evaluation results. In the case of a greater viewing distance of 3000 or 4000, the objective evaluation by the PSNR value tends to get poorer results; however, it has already been demonstrated that the subjective evaluation is the highest level in the case of the viewing distance of 3000 or 4000.

Second Preferred Embodiment

Figure 24:
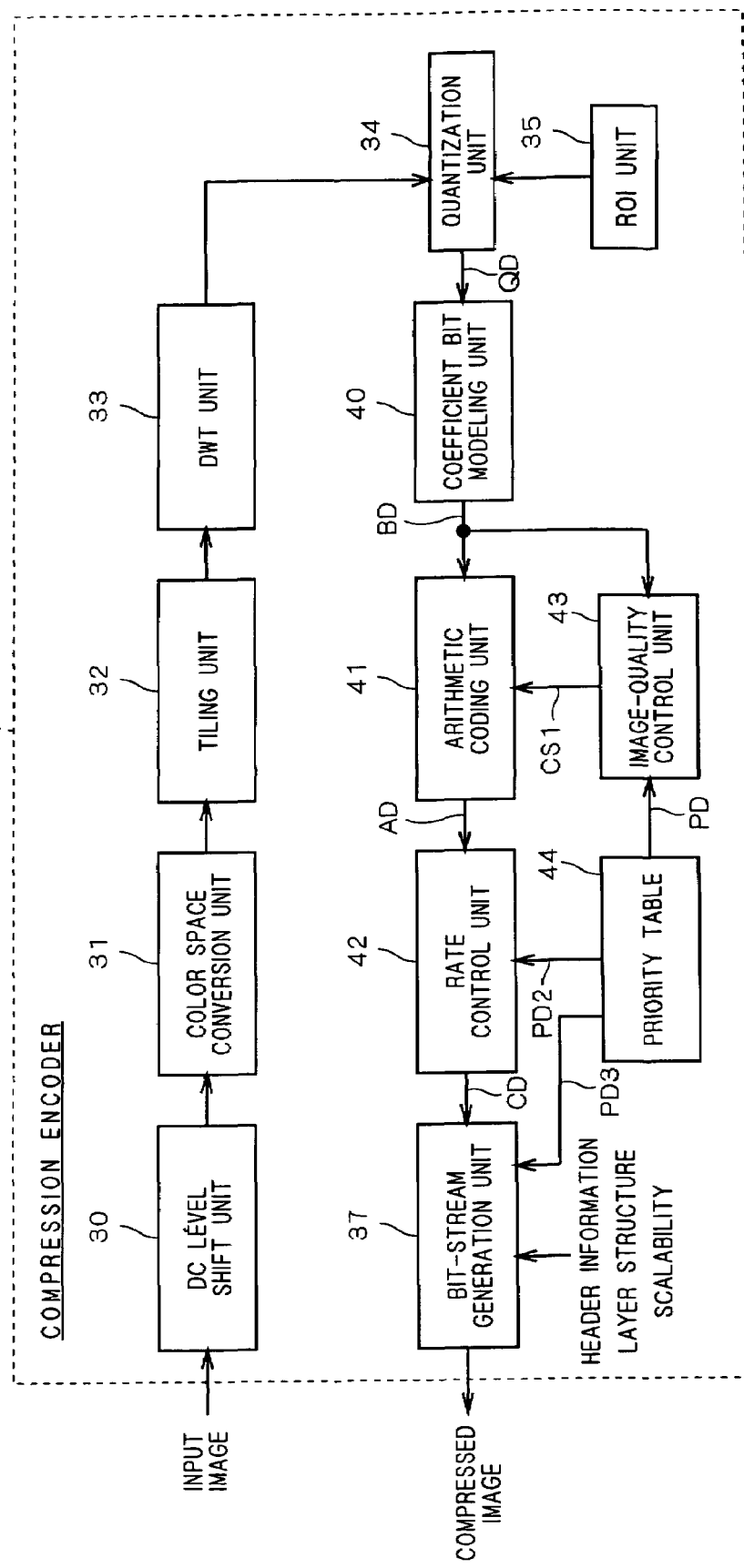
FIG. 24 is a functional block diagram showing a general configuration of a compression encoder according to a second preferred embodiment of the present invention.

<Compression Encoder>
FIG. 24 is a functional block diagram showing a general configuration of a compression encoder 200 according to a second preferred embodiment of the present invention. After general description of the configuration and function of this compression encoder 200, code blocks and their coding technique according to this preferred embodiment will be described in detail.

The compression encoder 200 comprises a DC level shift unit 30, a color-space conversion unit 31, a tiling unit 32, a DWT unit 33, a quantization unit 34, an ROI unit 35, a coefficient bit modeling unit 40, an arithmetic coding (entropy coding) unit 41, a rate control unit 42, an image-quality control unit 43, a priority table 44, and a bit-stream generation unit 37.

All or parts of the units 30-35, 37, and 40-44 in the compression encoder 200 may consist of hardware or programs that run on a microprocessor.

An image signal inputted to the compression encoder 200 is DC level shifted in the DC level shift unit 30 as needed, and outputted to the color-space conversion unit 31. The color-space conversion unit 31 converts and outputs the color space of an input signal. The JPEG2000 standard provides reversible component transformation (RCT) and irreversible component transformation (ICT) for color space conversion, either of which can be selected as necessary. Thus, for example, an input RGB signal is converted into a YCbCr or YUV signal.

Then, the tiling unit 32 divides an image signal inputted from the color-space conversion unit 31 into a plurality of rectangular regional components called "tiles" and outputs those components to the DWT unit 33. Here, the image signal is not always necessarily divided into tiles, and instead a single frame of image signal may be outputted as-is to the next functional block.

The DWT unit 33 performs integer or real-number DWT on each tile of an image signal inputted from the tiling unit 32, thereby to recursively divide the image signal into high- and low-pass components according to the aforementioned octave band splitting method. As a result, transform coefficients in a plurality of subbands HH1-LL3 as shown in FIG. 45 are generated and outputted to the quantization unit 34. More specifically, the real-number DWT uses a 9/7-, 5/3-, or 7/5-tap filter, and the integer DWT uses a 5/3- or 13/7-tap filter. Such filtering may be implemented through a convolution operation or by a lifting scheme which is more efficient than the convolution operation.

The quantization unit 34 has the function of performing scalar quantization on transform coefficients inputted from the DWT unit 33. The quantization unit 34 also has the function of performing a bit-shift operation in which higher priority is given to the image quality of an ROI (region of interest) which is specified by the ROI unit 35. The quantization unit 34 may either perform or not perform the scalar quantization.

Then, transform coefficients QD outputted from the quantization unit 34 are entropy coded on a block-by-block basis in the coefficient bit modeling unit 40 and the arithmetic coding unit 41, and they are rate controlled in the rate control unit 42.

The coefficient bit modeling unit 40, like the coefficient bit modeling unit 108 shown in FIG. 44, divides each subband of input transform coefficients QD into code blocks of approximately size 32×32 or 64×64 and further decomposes each code block into a plurality of bit planes each constituting a 2-D array of bits. As a result, each code block is decomposed into a plurality of bit planes $122_0$ through $122_{n-1}$ as shown in FIG. 47. The coefficient bit modeling unit 40 further judges the context of each bit, decomposes each bit plane into three types of coding passes for coding: the cleanup (CL) pass, the magnitude refinement (MR) pass, and the significance propagation (SIG) pass, and then outputs resultant coded data BD.

The arithmetic coding unit 41 performs arithmetic coding of only a target to be coded which is specified from the coded data BD inputted from the coefficient bit modeling unit 40 by the image-quality control unit 43, and then outputs resultant coded data AD to the rate control unit 42. The arithmetic coding unit 41 sometimes performs bypass processing in which part of the target to be coded is not arithmetically coded but instead is outputted as-is as part of the coded data AD. While this preferred embodiment adopts the arithmetic coding, the present invention is not limited to this only and may adopt other techniques for entropy coding.

The image-quality control unit 43 sets priorities which indicate the order of coding for each subband according to priority data PD obtained from the priority table 44 and determines a target to be coded which is provided to the arithmetic coding unit 41. The techniques for priority setting and the method of determining a target to be coded will be described later in detail.

The rate control unit 42 has the function of controlling the rate of coded data AD inputted from the arithmetic coding unit 41 by using priority data PD 2 obtained from the priority table 44. That is, the rate control unit 42 has the function of performing post-quantization in which, according to a target rate (final rate of compressed image), the coded data AD is sequentially truncated in ascending order of priority on a subband-by-subband, bit-plane-by-bit-plane, or coding-pass-by-coding-pass basis. The procedure of post-quantization will be described later.

The bit-stream generation unit 37 generates a bit stream by multiplexing coded data CD outputted from the rate control unit 42 and attached information (header information, layer structure, scalability, quantization table, etc.) and outputs it as a compressed image to the outside.

<First Technique for Priority Setting>

Figure 25:
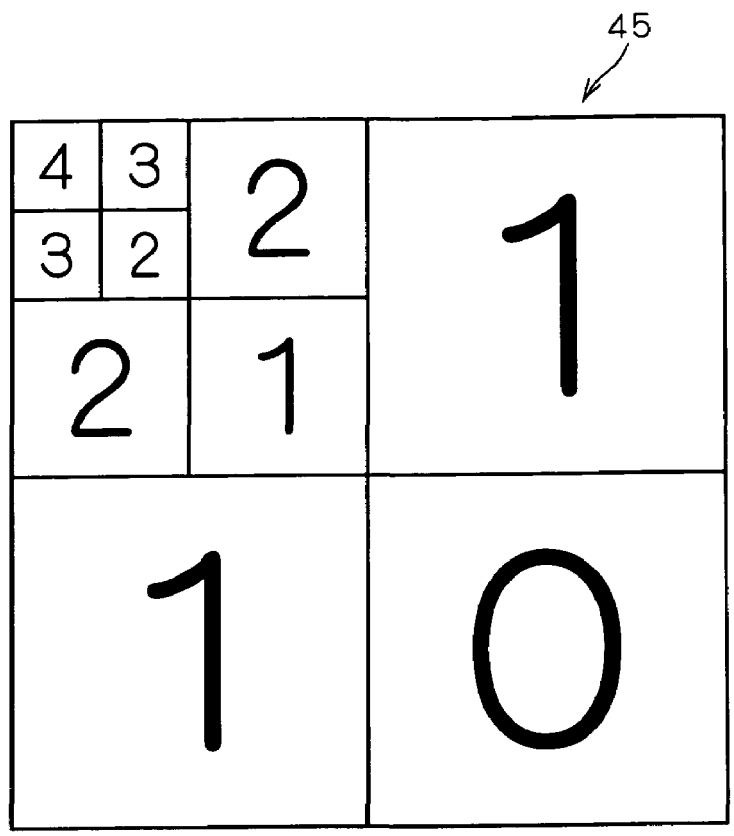
FIG. 25 is a schematic view showing a two-dimensional (2-D) image divided into subbands by wavelet transform.

Next, one technique for setting priorities to be recorded in the priority table 44 is described. According to the present invention, the priorities are set for each subband according to the number of recursive divisions into low-pass components. In this preferred embodiment, the priorities of subbands HHn, HLn, LHn, and LLn of the n-th decomposition level (n is an integer of 1 or more) are determined to be n−1, (n−1)+1, (n−1)+1, and (n−1)+2, respectively. For example, the priorities of the subbands HH1 and LL3 in FIG. 45 are determined to be "0" and "4," respectively. FIG. 25 is a schematic view showing a 2-D image 25 which is divided into subbands according to the octave band splitting method. Each subband is given a priority of any one of "0," "1," "2," "3," and "4."

The priority table 44 records priority information which corresponds to each of the subbands HHn, HLn, LHn, and LLn. The image-quality control unit 43 and the rate control unit 42 set priorities for each subband according to the priority data PD and PD2 obtained from the priority table 44. More specifically, transform coefficients in each subband are shifted by the number of bits corresponding to priorities, whereby the priorities are set for each subband. In this bit-shifting process, it is not necessary to actually perform a bit-shift operation on each transform coefficient, and instead only the position of each bit of each transform coefficient should be shifted virtually. In this case, there is no change in the position of the bit plane to which each bit of the transform coefficients belongs.

Figure 26:
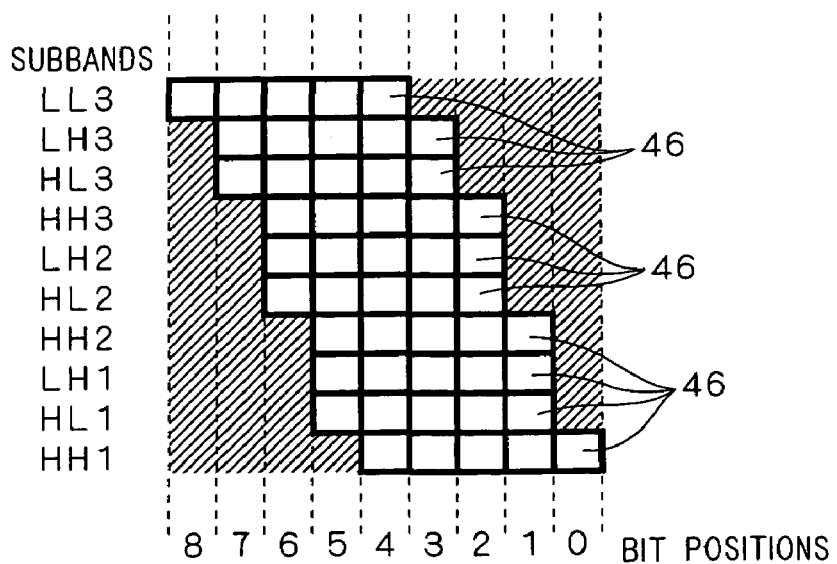
FIG. 26 is an explanatory diagram for priority setting by bit shifting.
Figure 27:
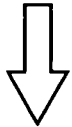
FIG. 27 illustrates bit-shifted transform coefficients.

FIG. 26 is an explanatory diagram for priority setting by bit shifting. In the example of FIG. 25, since the priority of the subband LL3 is "4", appropriate transform coefficients 46 are shifted to the left by 4 bits. The transform coefficients 46 in the subbands HL3 and LH3 having the priority of "3" are shifted to the left by 3 bits; the transform coefficients 46 in the subbands HH3, HL2, and LH2 having the priority of "2" are shifted to the left by 2 bits; and the transform coefficients 46 in the subbands HH2, HL1 and LH1 having the priority of "1" are shifted to the left by 1 bit. At this time, as shown in FIG. 27, transform coefficients in a 2-D image 45A prior to bit shifting are changed into those shown in a 2-D image 45B by the aforementioned left bit shifting. For example, the transform coefficient value (=4) in the subband LL3 is converted into $4 \times 2^4 = 64$ by 4-bit shifting to the left.

As later described, the image-quality control unit 43 can efficiently determine a target to be coded which is provided to the arithmetic coding unit 41, from an array of bit-shifted transform coefficients as shown in FIG. 26.

Next, the reason (theoretical background) for setting priorities as above described is described below.

In the conventional R-D optimization method previously described, optimization is performed using distortion measures. According to the foregoing first non-patent literature by David S. Taubman, et. al., a distortion measure $D_i^{(z)}$ can be calculated from the following equation:

$$D_i^{(z)} = G_{b[i]} \sum_j \left( o y_i^{K[i,j]}[j] - y_i[j] \right)^2, \qquad (14)$$

where $K[i, j] = p_i^{(z)}[j]$

In the above equation (14), z is the bit truncation point; $oy_i^{K[i,j]}[j]$ is the j-th sample value (coefficient value) of a code block which is inverse quantized in the K[i, j]-th bit plane; $y_i[j]$ is the j-th sample value (coefficient value) of that code block; and $G_{b[i]}$ is the squared norm of a synthesis filter coefficient for subband b[i], i.e., represents the weighting factor for a distortion model associated with that subband b[i]. For convenience of description, the notation of symbols in the above equation (14) differs slightly from that in the first non-patent literature.

In R-D optimization, optimization is performed to minimize the sum of the distortion measures $D_i^{(z)}$ in subband b[i]. The weighting factor $G_b$ for subband b represents weighting for reduction of image distortion.

The weighting factor $G_b$ for subband b is, as above described, given by:

$$G_b = \|S_b\|^2, \text{ where } S_b = s_b[n] \qquad (3)$$

In the above equation (3), $s_b[n]$ is the 1-D synthesis filter coefficient for subband b, and $\|x\|$ is the norm of the vector x.

According to equations (4.39) and (4.40) given in the foregoing first no-patent literature, the 1-D synthesis filter coefficient $S_{L[1]}[n]$ for the low-pass component L1 of the first decomposition level and the 1-D synthesis filter coefficient $S_{H[1]}[n]$ for the high-pass component H1 of the same decomposition level are calculated from the following equations (4):

$$\begin{cases} S_{L[i]}[n] = g_0[n] \\ S_{H[i]}[n] = g_1[n] \end{cases} \quad (4)$$

In the above equations (4), $g_0[n]$ and $g_1[n]$ are respectively low- and high-pass coefficients for a forward transform filter used in band splitting of an image signal.

Also, the 1-D synthesis filter coefficient $S_{L[d]}[n]$ for the low-pass component Ld of the d-th decomposition level (d=1, 2, . . . , D) and the 1-D synthesis filter coefficient $S_{H[d]}[n]$ for the high-pass component Hd of the same decomposition level are calculated from the following equations (5):

$$\begin{cases} S_{L[d]}[n] = \sum_k S_{L[d-1]}[k] g_0[n - 2k] \\ S_{H[d]}[n] = \sum_k S_{H[d-1]}[k] g_0[n - 2k] \end{cases} \quad (5)$$

Then, the squared norm of the 1-D synthesis filter coefficient for the low-pass component Ld of the d-th decomposition level is calculated from the following equation (6):

$$G_{L[d]} = \|S_{L[d]}[n]\|^2 = \sum_j |S_{L[d]}[j]|^2 \quad (6)$$

Also, the squared norm of the 1-D synthesis filter coefficient for the high-pass component Hd can be calculated from a similar equation to the equation (6).

Then, the 2-D synthesis filter coefficients for the subbands LLD, HLd, LHd, HHd of the d-th decomposition level (d=1, 2, . . . , D; D is an integer value) can be expressed as the product of the above 1-D synthesis filter coefficients, and the 2-D weighting factor $G_b$ for subband b can be expressed as the product of the 1-D weighting factors. More specifically, the 2-D synthesis filter coefficients and the 2-D weighting factors can be calculated from the following equations (7):

$$\begin{cases} S_{LL[D]}[n_1, n_2] = S_{L[D]}[n_1] S_{L[D]}[n_2] \Rightarrow G_{LL[D]} = G_{L[D]} \cdot G_{L[D]} \\ S_{HL[d]}[n_1, n_2] = S_{L[d]}[n_1] S_{H[d]}[n_2] \Rightarrow G_{HL[d]} = G_{L[d]} \cdot G_{L[d]} \\ S_{LH[d]}[n_1, n_2] = S_{H[d]}[n_1] S_{L[d]}[n_2] \Rightarrow G_{LH[d]} = G_{H[d]} \cdot G_{L[d]} \\ S_{HH[d]}[n_1, n_2] = S_{H[d]}[n_1] S_{H[d]}[n_2] \Rightarrow G_{HH[d]} = G_{H[d]} \cdot G_{H[d]} \end{cases} \quad (7)$$

In the above equations (7), the subscripts LL[D], HL[d], LH[d], and HH[d] represent the subbands LLD, HLd, LHd, and HHd, respectively.

The square root of the weighting factor $G_b$ is the norm. TABLEs 2, 3, 19, and 20 below show the calculation results of the 2-D weighting factors $G_b$. TABLE 2 gives the numerical values of the squared norms of each subband for the 9/7 filter (9/7-tap filter), and TABLE 3 gives the numerical values of the norms corresponding to TABLE 2. Also, TABLE 19 gives the numerical values of the squared norms of each subband for the 5/3 filter (5/3-tap filter), and TABLE 20 gives the numerical values of the norms corresponding to TABLE 19.

TABLE 2

(Squared norms of) weighting coefficients G for distortion model for 9/7 filter

| Decomposition Level | LL | HL | LH | HH |
|---|---|---|---|---|
| 1 | 3.86479 | 1.02270 | 1.02270 | 0.27063 |
| 2 | 16.99426 | 3.98726 | 3.98726 | 0.93551 |
| 3 | 70.84158 | 17.50056 | 17.50056 | 4.32330 |
| 4 | 286.81360 | 72.83113 | 72.83113 | 18.49415 |
| 5 | 1150.90066 | 294.69647 | 294.69647 | 75.45917 |
| 6 | 4607.30956 | 1182.34209 | 1182.34209 | 303.41630 |
| 7 | 18432.96262 | 4732.98083 | 4732.98083 | 1215.27440 |
| 8 | 73735.57967 | 18935.55202 | 18935.55202 | 4862.71528 |
| 9 | 294946.04918 | 75745.84127 | 75745.84127 | 19452.48118 |
| 10 | 1179787.92756 | 302986.99951 | 302986.99951 | 77811.54539 |
| 11 | 4719155.44117 | 1211951.63280 | 1211951.63280 | 311247.80240 |

TABLE 3

Norms of 9/7 filter

| Decomposition Level | LL | HL | LH | HH |
|---|---|---|---|---|
| 1 | 1.96591 | 1.01129 | 1.01129 | 0.52022 |
| 2 | 4.12241 | 1.99681 | 1.99681 | 0.96722 |
| 3 | 8.41674 | 4.18337 | 4.18337 | 2.07926 |
| 4 | 16.93557 | 8.53412 | 8.53412 | 4.30048 |
| 5 | 33.92493 | 17.16673 | 17.16673 | 8.68672 |
| 6 | 67.87717 | 34.38520 | 34.38520 | 17.41885 |
| 7 | 135.76805 | 68.79666 | 68.79666 | 34.86079 |
| 8 | 271.54296 | 137.60651 | 137.60651 | 69.73317 |
| 9 | 543.08936 | 275.21962 | 275.21962 | 139.47215 |
| 10 | 1086.18043 | 550.44255 | 550.44255 | 278.94721 |
| 11 | 2172.36172 | 1100.88675 | 1100.88675 | 557.89587 |

TABLE 19

(Squared norms of) weighting coefficients G for distortion model for 5/3 filter

| Decomposition Level | LL | HL | LH | HH |
|---|---|---|---|---|
| 1 | 2.25000 | 1.07813 | 1.07813 | 0.51660 |
| 2 | 7.56250 | 2.53516 | 2.53516 | 0.84985 |
| 3 | 28.89063 | 8.52441 | 8.52441 | 2.51520 |
| 4 | 114.22266 | 32.52173 | 32.52173 | 9.25966 |
| 5 | 455.55566 | 128.52106 | 128.52106 | 36.25827 |
| 6 | 1820.88892 | 512.52089 | 512.52089 | 144.25793 |
| 7 | 7282.22223 | 2048.52085 | 2048.52085 | 576.25784 |
| 8 | 29127.55556 | 8192.52084 | 8192.52084 | 2304.25782 |
| 9 | 116508.88889 | 32768.52083 | 32768.52083 | 9216.25781 |
| 10 | 466034.22222 | 131072.52083 | 131072.52083 | 36864.25781 |
| 11 | 1864135.55556 | 524288.52083 | 524288.52083 | 147456.25781 |

TABLE 20

Norms of 5/3 filter

| Decomposition Level | LL | HL | LH | HH |
|---|---|---|---|---|
| 1 | 1.50000 | 1.03833 | 1.03833 | 0.71875 |
| 2 | 2.75000 | 1.59222 | 1.59222 | 0.92188 |
| 3 | 5.37500 | 2.91966 | 2.91966 | 1.58594 |
| 4 | 10.68750 | 5.70278 | 5.70278 | 3.04297 |
| 5 | 21.34375 | 11.33671 | 11.33671 | 6.02148 |
| 6 | 42.67188 | 22.63892 | 22.63892 | 12.01074 |
| 7 | 85.33594 | 45.26059 | 45.26059 | 24.00537 |
| 8 | 170.66797 | 90.51255 | 90.51255 | 48.00269 |
| 9 | 341.33398 | 181.02077 | 181.02077 | 96.00134 |
| 10 | 682.66699 | 362.03939 | 362.03939 | 192.00067 |
| 11 | 1365.33350 | 724.07770 | 724.07770 | 384.00034 |

Figure 28:
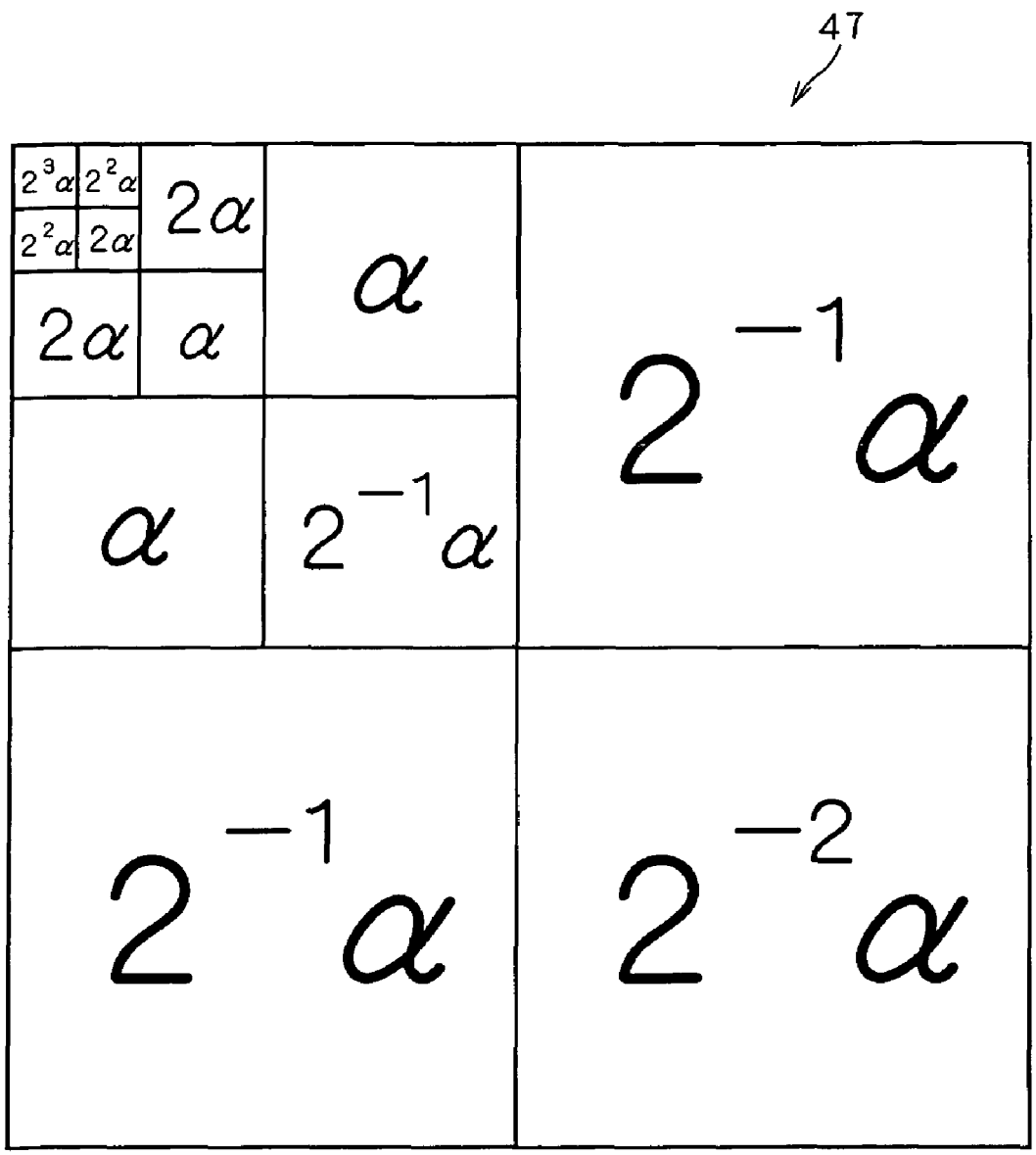
FIGS. 28 and 29 are schematic views showing a 2-D image divided into subbands by wavelet transform.

Further, if $\alpha$ is the norm of the low-pass component LL1 of the first decomposition level, the values as shown in FIG. 28 are set for each subband by using the norm $\alpha$. A 2-D image 47 in FIG. 28 shows the 2-D image 120 which is divided into subbands by the octave band splitting method. The set values for the subbands HHn, HLn, LHn, and LLn of the n-th decomposition level (n is an integer of 1 or more) are $2^{n-3} \times \alpha$, $2^{n-2} \times \alpha$, $2^{n-2} \times \alpha$, and $2^{n-1} \times \alpha$, respectively. For example, the set value for the subband LH1 is $2^{-1} \times \alpha$.

The above set values and the numerical values of the norms shown in TABLEs 3 and 20, when compared, are closely analogous. For example, in the case of TABLE 3 ($\alpha=1.96591$), the "set values (and corresponding subbands)" shown in FIG. 28 are approximately 0.49 (HH1), approximately 0.98 (HL1, LH1, and HH2), approximately 1.96 (HL2, LH2, and HH3), approximately 3.93 (HL3 and LH3), and approximately 7.86 (LL3), which are found to be closely analogous to the numerical values of the norms shown in TABLE 3.

In FIG. 28, the values obtained by rounding the norm of the subband LL1 to $\alpha=2$ and shifting the set value for each subband to the left by 1 bit, i.e., multiplying all the set values by $2^1$, are found to be in agreement with the priorities shown in FIG. 25. Thus, as above described, setting a priority for each subband is approximately equivalent to multiplying a sample value (transform coefficient value) of each subband by the norm (the square root of the weighting factor) of a filter used in R-D optimization. Accordingly, the priorities according to this preferred embodiment are determined in order to reduce image distortion.

<Second Technique for Priority Setting>

The technique for priority setting is not limited to the one described above and may of course be in the following form.

In this technique, a value obtained by dividing the norm or the square root of the above weighting factor $G_b$ for each subband by the norm of the horizontally and vertically low-pass component LL of the highest decomposition level is rounded to the appropriate power of 2, and the absolute value of the exponent of that power of 2 is set as a priority. More specifically, the priority p is calculated from $p=|I[R[x/\alpha]]|$, where $\alpha$ is the norm of the horizontally and vertically low-pass component LL of the highest (n-th) decomposition level; x is the norm of the other subbands; R[y] is the function of the variable y which is rounded to the appropriate power of 2; $m=I\lfloor 2^m \rfloor$ is the function for calculating the exponent m of the powers of 2, i.e., $2^m$, of the variable y; and |y| is the absolute value of the variable y.

Figure 29:
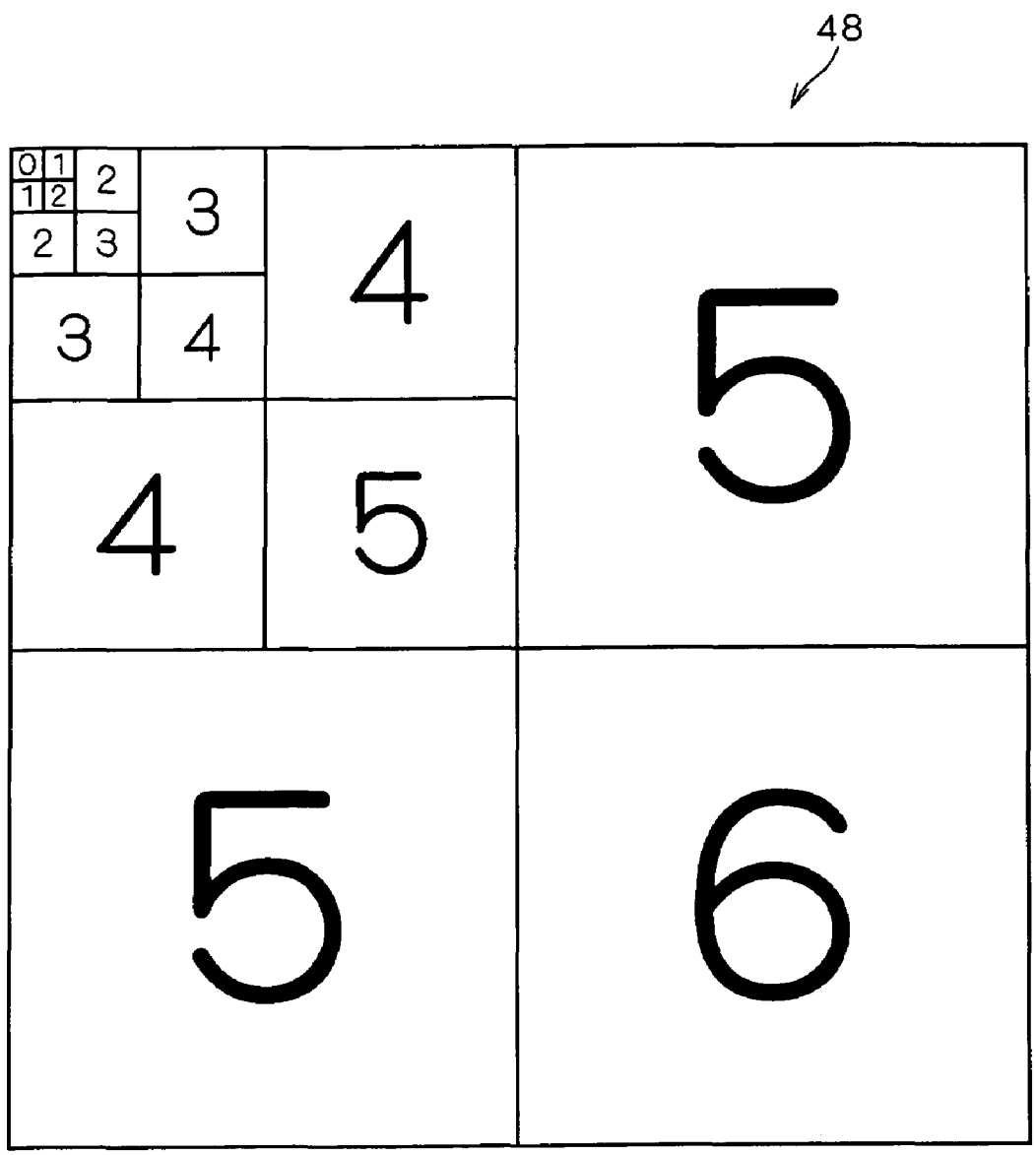

TABLE 21 below shows priorities calculated by using the norms of the 9/7 filter shown in TABLE 3 above. Further, FIG. 29 shows a 2-D image 48 divided into subbands which are labeled with the priorities shown in TABLE 21. Here, the highest decomposition level is 5, and $\alpha=33.92493$. The symbol X in the table indicates that the priority of that subband is not calculated.

TABLE 21

Priorities for 9/7 filter

| Decomposition Level | LL | HL | LH | HH |
|---|---|---|---|---|
| 1 | X | 5 | 5 | 6 |
| 2 | X | 4 | 4 | 5 |
| 3 | X | 3 | 3 | 4 |
| 4 | X | 2 | 2 | 3 |
| 5 | 0 | 1 | 1 | 2 |

Also, TABLE 22 below shows priorities calculated by using the norms of the 5/3 filter shown in TABLE 20 above.

TABLE 22

Priorities for 5/3 filter

| Decomposition Level | LL | HL | LH | HH |
|---|---|---|---|---|
| 1 | X | 4 | 4 | 5 |
| 2 | X | 4 | 4 | 5 |
| 3 | X | 3 | 3 | 4 |

TABLE 22-continued

Priorities for 5/3 filter

| Decomposition Level | LL | HL | LH | HH |
|---|---|---|---|---|
| 4 | X | 2 | 2 | 3 |
| 5 | 0 | 1 | 1 | 2 |

Figure 30:
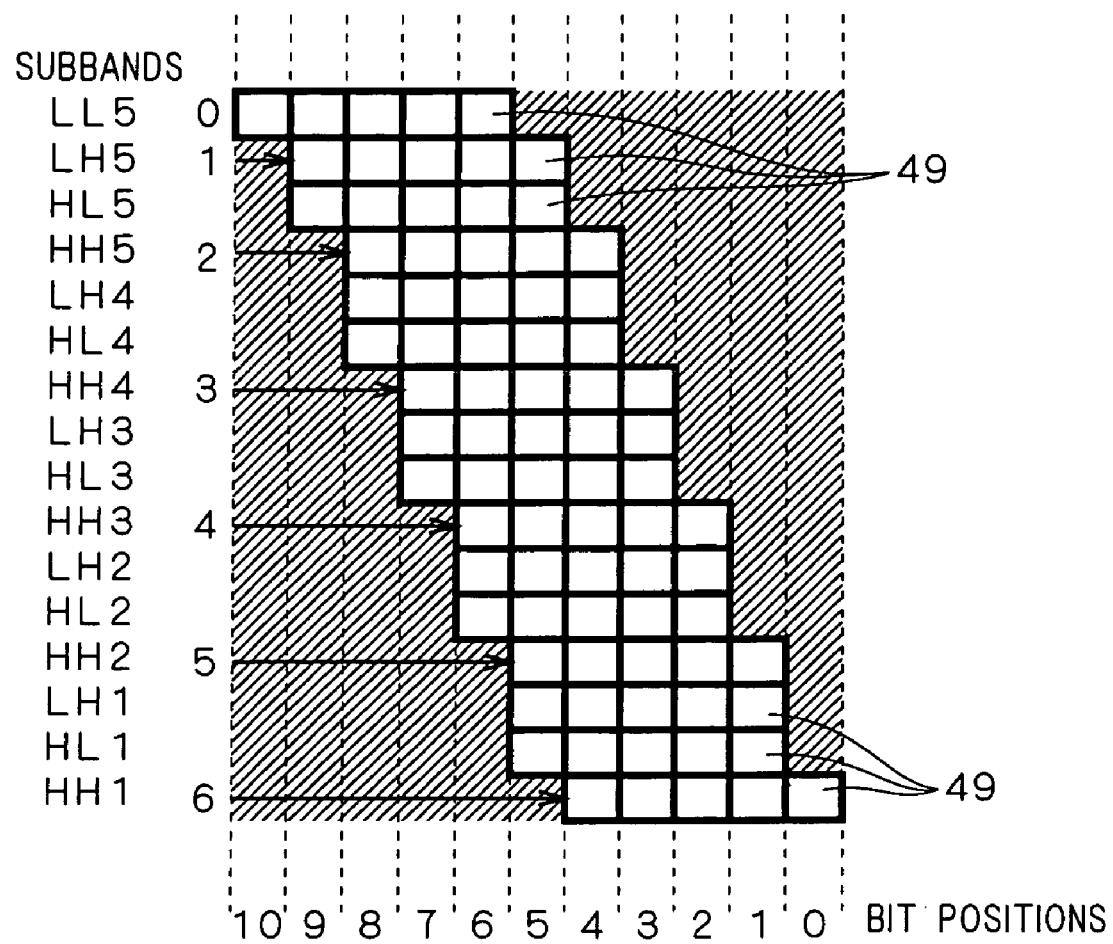
FIG. 30 is a schematic view showing transform coefficients in subbands which are right bit shifted according to priorities shown in FIG. 29.

While, in the aforementioned first technique for priority setting, the priorities are set by shifting transform coefficients in each subband to the left by the number of bits corresponding to the priorities; in the present example, transform coefficients in each subband are shifted to the right by the number of bits corresponding to the priorities. This right bit shifting is done to increase the bit length of each transform coefficient. FIG. 30 is a schematic view showing transform coefficients 49 in the subbands which are shifted to the right by the number of bits corresponding to the priorities shown in FIG. 29.

<Third Technique for Priority Setting>

Next described is another technique for priority setting in consideration of human visual characteristics. When the priorities determined by the aforementioned second technique for priority setting are applied to a high-resolution image of approximately several million pixels, the image quality of a decoded image will be highly rated in objective evaluation, but it is not always rated so well in human visual evaluation. Thus, a priority setting technique in the present example adopts priorities which are assigned weights in consideration of the human visual characteristics. This allows the generation of compressed images with high display quality.

The foregoing first non-patent literature describes in chapter 16 the weighted mean squared error (WMSE) based on the contrast sensitivity function (CSF) of the human visual system. According to this description, for improvement in human visual evaluation, the above equation (14) should desirably be rewritten as:

$$D_i^{(z)} = W_{b[i]}^{csf} G_{b[i]} \sum_j \left( o y_i^{K[i,j]}[j] - y_i[j] \right)^2 \quad (15)$$

In the above equation (15), $$W_{b[i]}^{csf}$$

is called the "energy weighting factor" for subband b[i], the recommended numerical value of which is given in the second non-patent literature. FIGS. 2 through 4 show the numerical values of the "energy weighting factors" described in the second non-patent literature.

In FIGS. 2 to 4, "level" and "Lev" stand for the deposition level, and "Comp" stands for the luminance component Y and the color difference components Cb and Cr. Examples are shown for viewing distances of 1000, 1700, 2000, 3000, and 4000. The "Viewing distance 1000," "Viewing distance 1700," "Viewing distance 2000," "Viewing distance 3000," and "Viewing distance 4000", respectively, represent viewing distances when displays or prints of 100 dpi, 170 dpi, 200 dpi, 300 dpi, and 400 dpi are viewed from 10 inches away.

Using the numerical values shown in FIGS. 2-4, the square root of the weighting factor $$\left( W_{b[i]}^{csf} \cdot G_{b[i]} \right)^{1/2}$$

in the above equation (15) is calculated. The calculation results are shown in TABLEs 23-34 below. TABLEs 23-25 give numerical values for monochrome imagery with the 9/7 filter, calculated by using the numerical values shown in FIG. 2; TABLEs 26-28 give numerical values for color imagery with the 9/7 filter, calculated by using the numerical values shown in FIGS. 3 and 4; TABLEs 29-31 give numerical values for monochrome imagery with the 5/3 filter, calculated by using the numerical values shown in FIG. 2; and TABLEs 32-34 give numerical values for color imagery with the 5/3 filter, calculated by using the numerical values shown in FIGS. 3 and 4.

TABLE 23

Numerical values for monochrome imagery with 9/7 filter

| Decomposition Level | Viewing distance 1000 | | | |
|---|---|---|---|---|
| | LL | HL | LH | HH |
| 1 | X | 0.567135 | 0.567135 | 0.147832 |
| 2 | X | 1.996812 | 1.996812 | 0.703332 |
| 3 | X | 4.183367 | 4.183367 | 2.079256 |
| 4 | X | 8.534116 | 8.534116 | 4.300482 |
| 5 | 33.92493 | 17.16673 | 17.16673 | 8.686724 |

TABLE 24

Numerical values for monochrome imagery with 9/7 filter

| Decomposition Level | Viewing distance 2000 | | | |
|---|---|---|---|---|
| | LL | HL | LH | HH |
| 1 | X | 0.180509 | 0.180509 | 0.022698 |
| 2 | X | 1.119894 | 1.119894 | 0.274876 |
| 3 | X | 4.183367 | 4.183367 | 1.512041 |
| 4 | X | 8.534116 | 8.534116 | 4.300482 |
| 5 | 33.92493 | 17.16673 | 17.16673 | 8.686724 |

TABLE 25

Numerical values for monochrome imagery with 9/7 filter

| Decomposition Level | Viewing distance 4000 | | | |
|---|---|---|---|---|
| | LL | HL | LH | HH |
| 1 | X | 0.014941 | 0.014941 | 0.000298 |
| 2 | X | 0.358645 | 0.358645 | 0.042464 |
| 3 | X | 2.360858 | 2.360858 | 0.594601 |
| 4 | X | 8.534116 | 8.534116 | 3.146525 |
| 5 | 33.92493 | 17.16673 | 17.16673 | 8.686724 |

TABLE 26

Numerical values for color imagery with 9/7 filter

| | Decomposition Level | Viewing distance 1000 | | | |
|---|---|---|---|---|---|
| | | LL | HL | LH | HH |
| Y | 1 | X | 0.76489 | 0.76489 | 0.298115 |
| | 2 | X | 1.99337 | 1.99337 | 0.963884 |

TABLE 26-continued

Numerical values for color imagery with 9/7 filter

Viewing distance 1000

| Decomposition | Level | LL | HL | LH | HH |
|---|---|---|---|---|---|
| | 3 | X | 4.183367 | 4.183367 | 2.079256 |
| | 4 | X | 8.534116 | 8.534116 | 4.300482 |
| | 5 | 33.92493 | 17.16673 | 17.16673 | 8.686724 |
| Cb | 1 | X | 0.233105 | 0.233105 | 0.059194 |
| | 2 | X | 0.900041 | 0.900041 | 0.299041 |
| | 3 | X | 2.721205 | 2.721205 | 1.10554 |
| | 4 | X | 6.77171 | 6.77171 | 3.063212 |
| | 5 | 33.92493 | 15.16158 | 15.16158 | 7.241097 |
| Cr | 1 | X | 0.33996 | 0.33996 | 0.104307 |
| | 2 | X | 1.10404 | 1.10404 | 0.405203 |
| | 3 | X | 3.03569 | 3.03569 | 1.299749 |
| | 4 | X | 7.177464 | 7.177464 | 3.337948 |
| | 5 | 33.92493 | 15.63678 | 15.63678 | 7.578107 |

TABLE 27

Numerical values for color imagery with 9/7 filter

Viewing distance 1700

| Decomposition | Level | LL | HL | LH | HH |
|---|---|---|---|---|---|
| Y | 1 | X | 0.310658 | 0.310658 | 0.056662 |
| | 2 | X | 1.72044 | 1.72044 | 0.718005 |
| | 3 | X | 4.183367 | 4.183367 | 2.079256 |
| | 4 | X | 8.534116 | 8.534116 | 4.300482 |
| | 5 | 33.92493 | 17.16673 | 17.16673 | 8.686724 |
| Cb | 1 | X | 0.09892 | 0.09892 | 0.01622 |
| | 2 | X | 0.559243 | 0.559243 | 0.147297 |
| | 3 | X | 2.098595 | 2.098595 | 0.753271 |
| | 4 | X | 5.883453 | 5.883453 | 2.490925 |
| | 5 | 33.92493 | 14.05553 | 14.05553 | 6.47921 |
| Cr | 1 | X | 0.179438 | 0.179438 | 0.040124 |
| | 2 | X | 0.775746 | 0.775746 | 0.240417 |
| | 3 | X | 2.5039 | 2.5039 | 0.979107 |
| | 4 | X | 6.465668 | 6.465668 | 2.86391 |
| | 5 | 33.92493 | 14.77858 | 14.77858 | 6.976933 |

TABLE 28

Numerical values for color imagery with 9/7 filter

Viewing distance 3000

| Decomposition | Level | LL | HL | LH | HH |
|---|---|---|---|---|---|
| Y | 1 | X | 0.038921 | 0.038921 | 0.0016 |
| | 2 | X | 0.819947 | 0.819947 | 0.176768 |
| | 3 | X | 3.85307 | 3.85307 | 1.763882 |
| | 4 | X | 8.534116 | 8.534116 | 4.300482 |
| | 5 | 33.92493 | 17.16673 | 17.16673 | 8.686724 |
| Cb | 1 | X | 0.023571 | 0.023571 | 0.001776 |
| | 2 | X | 0.247647 | 0.247647 | 0.043245 |
| | 3 | X | 1.337728 | 1.337728 | 0.385929 |
| | 4 | X | 4.603618 | 4.603618 | 1.734612 |
| | 5 | 33.92493 | 12.31002 | 12.31002 | 5.331711 |
| Cr | 1 | X | 0.060957 | 0.060957 | 0.007791 |
| | 2 | X | 0.423067 | 0.423067 | 0.097358 |
| | 3 | X | 1.793238 | 1.793238 | 0.597979 |
| | 4 | X | 5.39042 | 5.39042 | 2.192081 |
| | 5 | 33.92493 | 13.39161 | 13.39161 | 6.038385 |

TABLE 29

Numerical values for monochrome imagery with 5/3 filter

Viewing distance 1000

| Decomposition Level | LL | HL | LH | HH |
|---|---|---|---|---|
| 1 | X | 0.5823 | 0.5823 | 0.204249 |
| 2 | X | 1.592217 | 1.592217 | 0.670362 |
| 3 | X | 2.91966 | 2.91966 | 1.585938 |
| 4 | X | 5.702783 | 5.702783 | 3.042969 |
| 5 | 21.34375 | 11.33671 | 11.33671 | 6.021484 |

TABLE 30

Numerical values for monochrome imagery with 5/3 filter

Viewing distance 2000

| Decomposition Level | LL | HL | LH | HH |
|---|---|---|---|---|
| 1 | X | 0.185335 | 0.185335 | 0.03136 |
| 2 | X | 0.892981 | 0.892981 | 0.26199 |
| 3 | X | 2.91966 | 2.91966 | 1.153299 |
| 4 | X | 5.702783 | 5.702783 | 3.042969 |
| 5 | 21.34375 | 11.33671 | 11.33671 | 6.021484 |

TABLE 31

Numerical values for monochrome imagery with 5/3 filter

Viewing distance 4000

| Decomposition Level | LL | HL | LH | HH |
|---|---|---|---|---|
| 1 | X | 0.01534 | 0.01534 | 0.000412 |
| 2 | X | 0.285977 | 0.285977 | 0.040473 |
| 3 | X | 1.647693 | 1.647693 | 0.453527 |
| 4 | X | 5.702783 | 5.702783 | 2.226443 |
| 5 | 21.34375 | 11.33671 | 11.33671 | 6.021484 |

TABLE 32

Numerical values for color imagery with 5/3 filter

Viewing distance 1000

| Decomposition | Level | LL | HL | LH | HH |
|---|---|---|---|---|---|
| Y | 1 | X | 0.785342 | 0.785342 | 0.411885 |
| | 2 | X | 1.589472 | 1.589472 | 0.918699 |
| | 3 | X | 2.91966 | 2.91966 | 1.585938 |
| | 4 | X | 5.702783 | 5.702783 | 3.042969 |
| | 5 | 21.34375 | 11.33671 | 11.33671 | 6.021484 |
| Cb | 1 | X | 0.239338 | 0.239338 | 0.081784 |
| | 2 | X | 0.717674 | 0.717674 | 0.285023 |
| | 3 | X | 1.899186 | 1.899186 | 0.843243 |
| | 4 | X | 4.525084 | 4.525084 | 2.167491 |
| | 5 | 21.34375 | 10.01254 | 10.01254 | 5.019401 |
| Cr | 1 | X | 0.349051 | 0.349051 | 0.144114 |
| | 2 | X | 0.880339 | 0.880339 | 0.386208 |
| | 3 | X | 2.118672 | 2.118672 | 0.991374 |
| | 4 | X | 4.796223 | 4.796223 | 2.361891 |
| | 5 | 21.34375 | 10.32635 | 10.32635 | 5.25301 |

TABLE 33

Numerical values for color imagery with 5/3 filter

| | Decomposition Level | Viewing distance 1700 | | | |
|---|---|---|---|---|---|
| | | LL | HL | LH | HH |
| Y | 1 | X | 0.318965 | 0.318965 | 0.078286 |
| | 2 | X | 1.371843 | 1.371843 | 0.684347 |
| | 3 | X | 2.91966 | 2.91966 | 1.585938 |
| | 4 | X | 5.702783 | 5.702783 | 3.042969 |
| | 5 | 21.34375 | 11.33671 | 11.33671 | 6.021484 |
| Cb | 1 | X | 0.101565 | 0.101565 | 0.02241 |
| | 2 | X | 0.445929 | 0.445929 | 0.140392 |
| | 3 | X | 1.464653 | 1.464653 | 0.574552 |
| | 4 | X | 3.931521 | 3.931521 | 1.762548 |
| | 5 | 21.34375 | 9.282115 | 9.282115 | 4.491275 |
| Cr | 1 | X | 0.184236 | 0.184236 | 0.055437 |
| | 2 | X | 0.618564 | 0.618564 | 0.229147 |
| | 3 | X | 1.747524 | 1.747524 | 0.746807 |
| | 4 | X | 4.320576 | 4.320576 | 2.026468 |
| | 5 | 21.34375 | 9.759606 | 9.759606 | 4.836288 |

TABLE 34

Numerical values for color imagery with 5/3 filter

| | Decomposition Level | Viewing distance 3000 | | | |
|---|---|---|---|---|---|
| | | LL | HL | LH | HH |
| Y | 1 | X | 0.039962 | 0.039962 | 0.00221 |
| | 2 | X | 0.653809 | 0.653809 | 0.168482 |
| | 3 | X | 2.689138 | 2.689138 | 1.345389 |
| | 4 | X | 5.702783 | 5.702783 | 3.042969 |
| | 5 | 21.34375 | 11.33671 | 11.33671 | 6.021484 |
| Cb | 1 | X | 0.024201 | 0.024201 | 0.002453 |
| | 2 | X | 0.197468 | 0.197468 | 0.041218 |
| | 3 | X | 0.933628 | 0.933628 | 0.294364 |
| | 4 | X | 3.076292 | 3.076292 | 1.227391 |
| | 5 | 21.34375 | 8.129398 | 8.129398 | 3.695849 |
| Cr | 1 | X | 0.062587 | 0.062587 | 0.010765 |
| | 2 | X | 0.337345 | 0.337345 | 0.092794 |
| | 3 | X | 1.251539 | 1.251539 | 0.456105 |
| | 4 | X | 3.60206 | 3.60206 | 1.551089 |
| | 5 | 21.34375 | 8.843668 | 8.843668 | 4.185702 |

Then, using the numerical values given in TABLEs 23-34, the priority of each subband is calculated through the same procedure as described in the aforementioned second technique for priority setting. That is, the priority p is calculated from $p=|I[R[x/\alpha]]|$, where $\alpha$ is the numerical value of the horizontal and vertical low-pass component $LLn$ of the highest (n-th) decomposition level; x is the numerical value of the other subbands; R[y] is the function of the variable y which is rounded to the appropriate power of 2; $m=I\lfloor 2^m \rfloor$ is the function for calculating the exponent m of the powers of 2, i.e., $2^m$, of the variable y; and |y| is the absolute value of the variable y.

TABLEs 35-46 below show the priorities. The priorities shown in TABLEs 35-46 are calculated by using the numerical values given in TABLEs 23-34 above, respectively.

TABLE 35

Priority table for monochrome imagery with 9/7 filter

| Decomposition Level | Viewing distance 1000 | | | |
|---|---|---|---|---|
| | LL | HL | LH | HH |
| 1 | X | 6 | 6 | 8 |
| 2 | X | 4 | 4 | 6 |
| 3 | X | 3 | 3 | 4 |
| 4 | X | 2 | 2 | 3 |
| 5 | 0 | 1 | 1 | 2 |

TABLE 36

Priority table for monochrome imagery with 9/7 filter

| Decomposition Level | Viewing distance 2000 | | | |
|---|---|---|---|---|
| | LL | HL | LH | HH |
| 1 | X | 8 | 8 | 11 |
| 2 | X | 5 | 5 | 7 |
| 3 | X | 3 | 3 | 5 |
| 4 | X | 2 | 2 | 3 |
| 5 | 0 | 1 | 1 | 2 |

TABLE 37

Priority table for monochrome imagery with 9/7 filter

| Decomposition Level | Viewing distance 4000 | | | |
|---|---|---|---|---|
| | LL | HL | LH | HH |
| 1 | X | 11 | 11 | 17 |
| 2 | X | 7 | 7 | 10 |
| 3 | X | 4 | 4 | 6 |
| 4 | X | 2 | 2 | 4 |
| 5 | 0 | 1 | 1 | 2 |

TABLE 38

Priority table for color imagery with 9/7 filter

| | Decomposition Level | Viewing distance 1000 | | | |
|---|---|---|---|---|---|
| | | LL | HL | LH | HH |
| Y | 1 | X | 6 | 6 | 7 |
| | 2 | X | 4 | 4 | 5 |
| | 3 | X | 3 | 3 | 4 |
| | 4 | X | 2 | 2 | 3 |
| | 5 | 0 | 1 | 1 | 2 |
| Cb | 1 | X | 7 | 7 | 9 |
| | 2 | X | 5 | 5 | 7 |
| | 3 | X | 4 | 4 | 5 |
| | 4 | X | 2 | 2 | 4 |
| | 5 | 0 | 1 | 1 | 2 |
| Cr | 1 | X | 7 | 7 | 8 |
| | 2 | X | 5 | 5 | 6 |
| | 3 | X | 4 | 4 | 5 |
| | 4 | X | 2 | 2 | 3 |
| | 5 | 0 | 1 | 1 | 2 |

TABLE 39

Priority table for color imagery with 9/7 filter

| | Decomposition Level | Viewing distance 1700 | | | |
|---|---|---|---|---|---|
| | | LL | HL | LH | HH |
| Y | 1 | X | 7 | 7 | 9 |
| | 2 | X | 4 | 4 | 6 |
| | 3 | X | 3 | 3 | 4 |
| | 4 | X | 2 | 2 | 3 |
| | 5 | 0 | 1 | 1 | 2 |
| Cb | 1 | X | 9 | 9 | 11 |
| | 2 | X | 6 | 6 | 8 |
| | 3 | X | 4 | 4 | 6 |
| | 4 | X | 3 | 3 | 4 |
| | 5 | 0 | 1 | 1 | 2 |
| Cr | 1 | X | 8 | 8 | 10 |
| | 2 | X | 6 | 6 | 7 |
| | 3 | X | 4 | 4 | 5 |
| | 4 | X | 2 | 2 | 4 |
| | 5 | 0 | 1 | 1 | 2 |

TABLE 40

Priority table for color imagery with 9/7 filter

| | Decomposition Level | Viewing distance 3000 | | | |
|---|---|---|---|---|---|
| | | LL | HL | LH | HH |
| Y | 1 | X | 10 | 10 | 14 |
| | 2 | X | 5 | 5 | 8 |
| | 3 | X | 3 | 3 | 4 |
| | 4 | X | 2 | 2 | 3 |
| | 5 | 0 | 1 | 1 | 2 |
| Cb | 1 | X | 11 | 11 | 14 |
| | 2 | X | 7 | 7 | 10 |
| | 3 | X | 5 | 5 | 7 |
| | 4 | X | 3 | 3 | 4 |
| | 5 | 0 | 2 | 2 | 3 |
| Cr | 1 | X | 9 | 9 | 12 |
| | 2 | X | 6 | 6 | 9 |
| | 3 | X | 4 | 4 | 6 |
| | 4 | X | 3 | 3 | 4 |
| | 5 | 0 | 1 | 1 | 3 |

TABLE 41

Priority table for monochrome imagery with 5/3 filter

| Decomposition Level | Viewing distance 1000 | | | |
|---|---|---|---|---|
| | LL | HL | LH | HH |
| 1 | X | 5 | 5 | 7 |
| 2 | X | 4 | 4 | 5 |
| 3 | X | 3 | 3 | 4 |
| 4 | X | 2 | 2 | 3 |
| 5 | 0 | 1 | 1 | 2 |

TABLE 42

Priority table for monochrome imagery with 5/3 filter

| Decomposition Level | Viewing distance 2000 | | | |
|---|---|---|---|---|
| | LL | HL | LH | HH |
| 1 | X | 7 | 7 | 9 |
| 2 | X | 5 | 5 | 6 |
| 3 | X | 3 | 3 | 4 |
| 4 | X | 2 | 2 | 3 |
| 5 | 0 | 1 | 1 | 2 |

TABLE 43

Priority table for monochrome imagery with 5/3 filter

| Decomposition Level | Viewing distance 4000 | | | |
|---|---|---|---|---|
| | LL | HL | LH | HH |
| 1 | X | 11 | 11 | 16 |
| 2 | X | 6 | 6 | 9 |
| 3 | X | 4 | 4 | 6 |
| 4 | X | 2 | 2 | 3 |
| 5 | 0 | 1 | 1 | 2 |

TABLE 44

Priority table for color imagery with 5/3 filter

| | Decomposition Level | Viewing distance 1000 | | | |
|---|---|---|---|---|---|
| | | LL | HL | LH | HH |
| Y | 1 | X | 5 | 5 | 6 |
| | 2 | X | 4 | 4 | 5 |
| | 3 | X | 3 | 3 | 4 |
| | 4 | X | 2 | 2 | 3 |
| | 5 | 0 | 1 | 1 | 2 |
| Cb | 1 | X | 7 | 7 | 8 |
| | 2 | X | 5 | 5 | 6 |
| | 3 | X | 4 | 4 | 5 |
| | 4 | X | 2 | 2 | 3 |
| | 5 | 0 | 1 | 1 | 2 |
| Cr | 1 | X | 6 | 6 | 7 |
| | 2 | X | 5 | 5 | 6 |
| | 3 | X | 3 | 3 | 5 |
| | 4 | X | 2 | 2 | 3 |
| | 5 | 0 | 1 | 1 | 2 |

TABLE 45

Priority table for color imagery with 5/3 filter

| | Decomposition Level | Viewing distance 1700 | | | |
|---|---|---|---|---|---|
| | | LL | HL | LH | HH |
| Y | 1 | X | 6 | 6 | 8 |
| | 2 | X | 4 | 4 | 5 |
| | 3 | X | 3 | 3 | 4 |
| | 4 | X | 2 | 2 | 3 |
| | 5 | 0 | 1 | 1 | 2 |
| Cb | 1 | X | 8 | 8 | 10 |
| | 2 | X | 6 | 6 | 7 |
| | 3 | X | 4 | 4 | 5 |
| | 4 | X | 3 | 3 | 4 |
| | 5 | 0 | 1 | 1 | 2 |
| Cr | 1 | X | 7 | 7 | 9 |
| | 2 | X | 5 | 5 | 7 |
| | 3 | X | 4 | 4 | 5 |
| | 4 | X | 2 | 2 | 3 |
| | 5 | 0 | 1 | 1 | 2 |

TABLE 46

Priority table for color imagery with 5/3 filter

| | Decomposition Level | Viewing distance 3000 | | | |
|---|---|---|---|---|---|
| | | LL | HL | LH | HH |
| Y | 1 | X | 9 | 9 | 13 |
| | 2 | X | 5 | 5 | 7 |
| | 3 | X | 3 | 3 | 4 |
| | 4 | X | 2 | 2 | 3 |
| | 5 | 0 | 1 | 1 | 2 |
| Cb | 1 | X | 10 | 10 | 13 |
| | 2 | X | 7 | 7 | 9 |
| | 3 | X | 5 | 5 | 6 |
| | 4 | X | 3 | 3 | 4 |
| | 5 | 0 | 1 | 1 | 3 |
| Cr | 1 | X | 8 | 8 | 11 |
| | 2 | X | 6 | 6 | 8 |
| | 3 | X | 4 | 4 | 6 |
| | 4 | X | 3 | 3 | 4 |
| | 5 | 0 | 1 | 1 | 2 |

In the present example, as in the aforementioned second technique for priority setting, the priorities are set for transform coefficients in each subband by shifting those transform coefficients to the right by the number of bits corresponding to the priorities given in TABLEs 35-46 above. This allows priority setting in consideration of the human visual characteristics.

Hereinbelow, a description is given of processing based on the priorities which are determined by any one of the aforementioned first through third techniques for priority setting.

<Image Quality Control>

Figure 31:
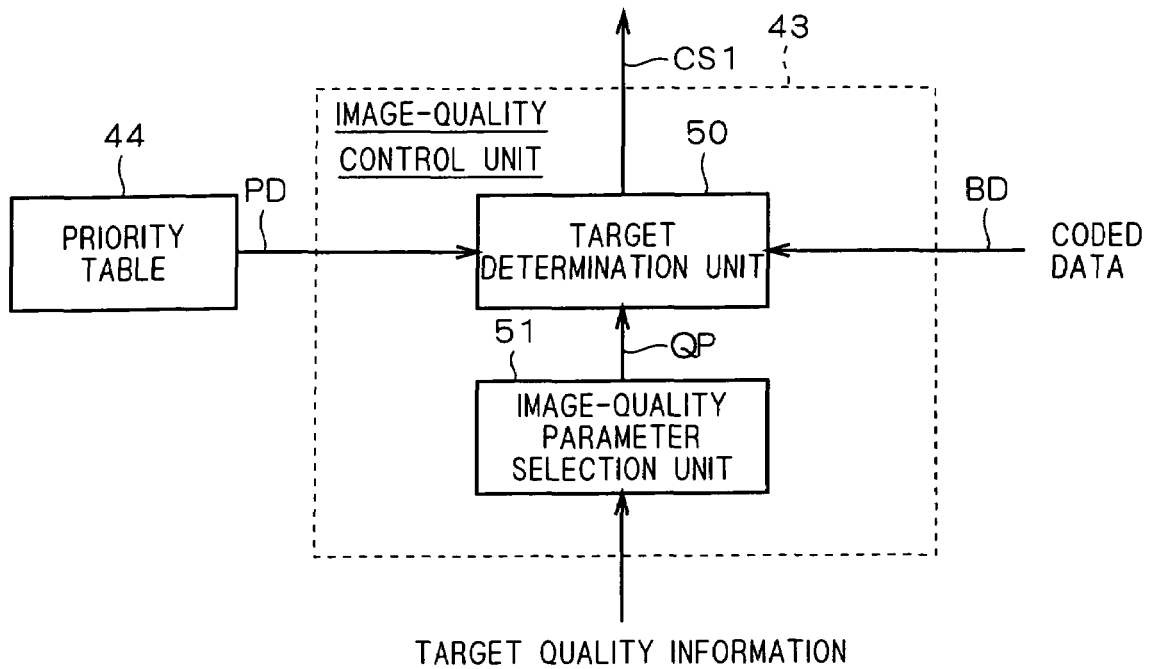
FIG. 31 is a functional block diagram showing a general configuration of an image-quality control unit according to the second preferred embodiment.

Now, the configuration and processing details of the image-quality control unit 43 shown in FIG. 24 are described. FIG. 31 is a functional block diagram showing a general configuration of the image-quality control unit 43.

The image-quality control unit 43 comprises an image-quality parameter selection unit 51 for, on the basis of target quality information (high quality, standard quality, low quality, resolution information, etc.) provided from the outside, selecting and outputting an appropriate image-quality parameter QP for the target quality information from a plurality of image-quality parameters; and a target determination unit 50 for determining a target to be coded. The target determination unit 50 sets the aforementioned priorities for each subband in the coded data BD according to the priority data PD obtained from the priority table 44. Also, the target determination unit 50 determines, according to the set priorities, a target to be coded which is appropriate to target image quality specified by the image-quality parameter QP, and generates and outputs an image-quality control signal CS1.

Figure 32:
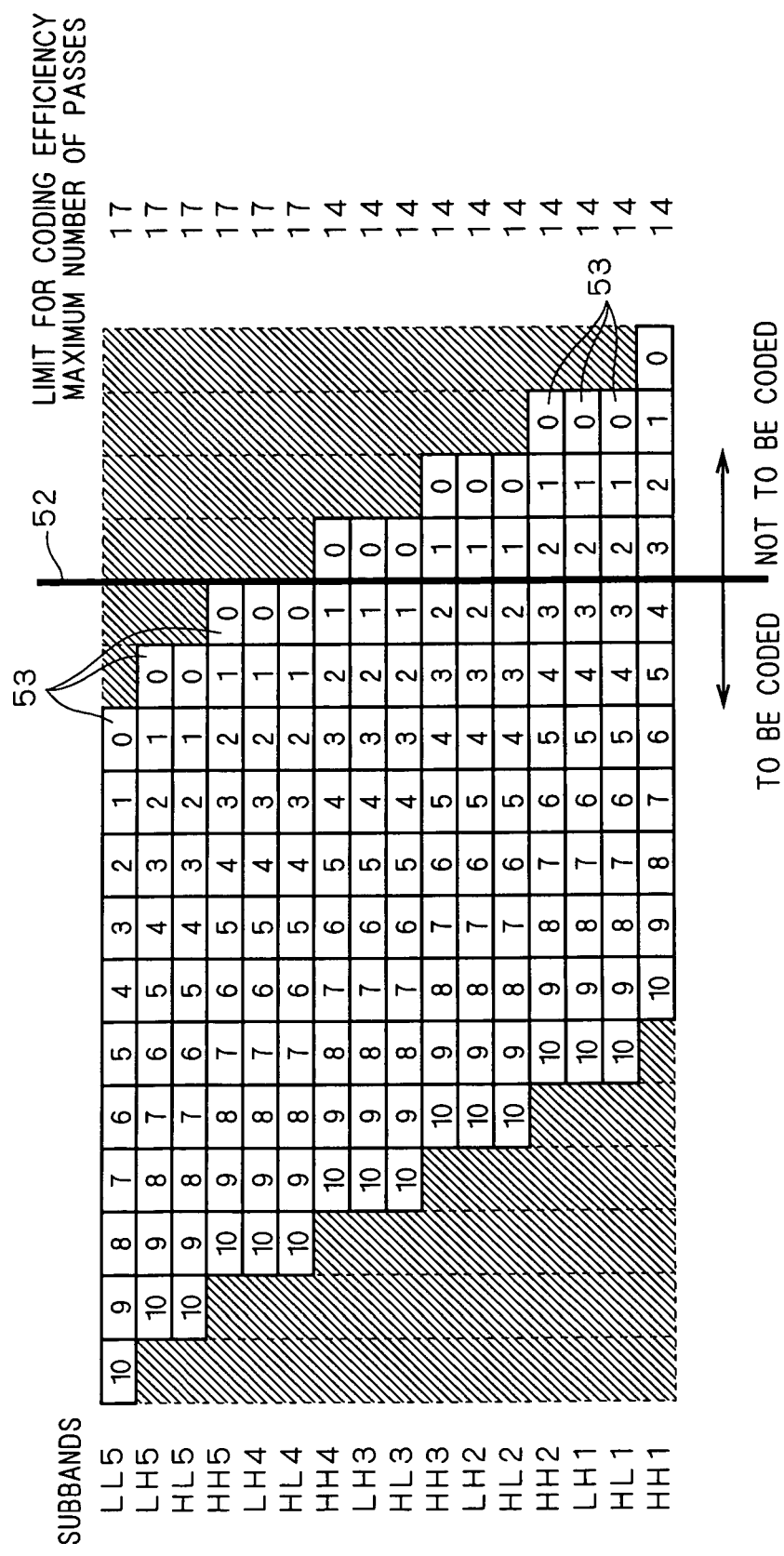
FIG. 32 is a schematic view illustrating transform coefficients which are bit shifted according to priorities.

Hereinbelow, a method of determining a target to be coded is described. FIG. 32 is a schematic view illustrating transform coefficients 53 which are bit shifted according to the priorities. The numbers 0 through 10 on each bit of the transform coefficients 53 indicate a number of a bit plane to which that bit belongs. Here, the least significant bit number is 0, and the most significant bit number is 10.

The target determination unit 50 sets a coding end line 52 according to the image-quality parameter QP and generates the image-quality control signal CS1 so that the high-order bits on the left side of the coding end line 52 are determined as a target to be coded and the low-order bits on the right side of the line 52 are excluded from the target to be coded. This allows efficient selection of a target to be coded. As a result, the arithmetic coding unit 41 receiving the image-quality control signal CS1 performs arithmetic coding of only the high-order bit planes on the left side of the coding end line 52 and truncates the low-order bit planes on the right side of the line 52. The arithmetic coding unit 41 does not perform arithmetic coding of those bits which are zero-inserted by bit shifting.

The target determination unit 50 can further determine a target to be coded on a coding-pass-by-coding-pass basis according to the image-quality parameter QP. The image-quality parameter QP includes a group of parameters which indicate the limit for the number of bit planes to be coded and the limit for the number of coding passes (CL, SIG, and MR passes) to be coded. TABLE 47 below shows, by way of example, image-quality parameters QP appropriate to an image having a resolution of 2048×2560 pixels. Since the resolution of the horizontally and vertically low-pass subband needs to be reduced to 128×128 pixels or less, the fifth or more decomposition level is necessary.

TABLE 47

Examples of image-quality parameters

| | Limit for Priority | | Limit for Coding Efficiency |
|---|---|---|---|
| Subbands | Number of Bit Planes | Pass Name | Maximum Number of Passes |
| LL5 | 0 | CL | 17 |
| LH5 | 0 | CL | 17 |
| HL5 | 0 | CL | 17 |
| HH5 | 0 | CL | 17 |
| LH4 | 0 | CL | 17 |
| HL4 | 0 | CL | 17 |
| HH4 | 1 | MR | 14 |
| LH3 | 1 | MR | 14 |
| HL3 | 1 | MR | 14 |
| HH3 | 2 | SIG | 14 |
| HL2 | 2 | SIG | 14 |
| LH2 | 2 | SIG | 14 |
| HH2 | 3 | SIG | 14 |
| LH1 | 3 | SIG | 14 |
| HL1 | 3 | SIG | 14 |
| HH1 | 4 | CL | 14 |

CL: Cleanup pass
MR: Magnitude Refinement pass
SIG: Significant propagation pass In TABLE 47, "Number of Bit Planes" stands for the number of low-order bit planes to be truncated on the right side of the coding end line 52 in FIG. 32; "Pass Name" stands for the last coding pass of the target to be coded; and "Maximum Number of Passes" stands for the upper limit of the number of coding passes to be coded.

Figure 33:
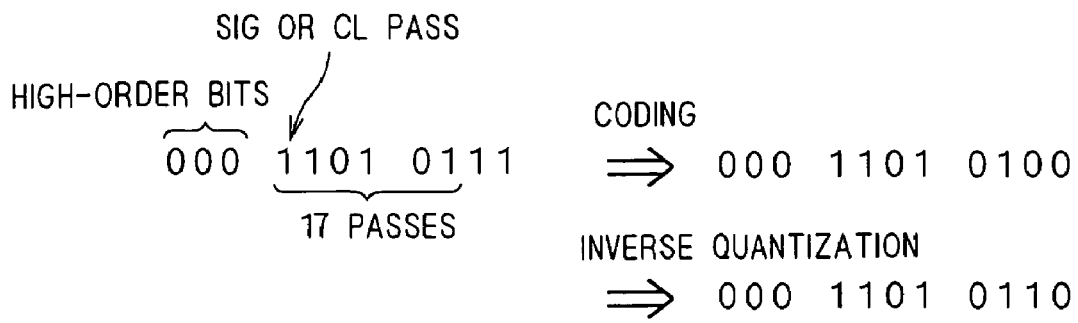
FIGS. 33 and 34 are explanatory diagrams for examples of coding transform coefficients in subband LL5.

One example of processing when FIG. 32 and TABLE 47 are applied is described below. FIG. 33 illustrates "0001101011$1_2$=$215_{10}$" ($Y_2$ is the binary value Y; $X_{10}$ is the decimal value X) as one transform coefficient 53 in the subband LL5. As shown in TABLE 47, the last coding pass of the subband LL5 is the CL pass, and the maximum number of passes is limited to 17.

A context judgment is made so that the seventh bit of the transform coefficient 53 shown in FIG. 33 belongs to either the SIG or CL pass. The eighth to tenth high-order bits are coded in a structure called "tag tree" when they belong to bit planes consisting only of 0 bits, whereas they are coded in the SIG or CL pass when coding has already started with coding passes. When the seventh bit belongs to the first coding pass (CL pass), a context judgment is made so that the lower-order bits than the seventh bit, including the sixth bit, belong to the MR pass. In general, lower-order bit planes than the bit plane from which coding starts are, from a view of coding efficiency, coded in the SIG, MR, and CL passes in this order. Since the maximum number of passes is limited to 17, a total of 17 passes ranging from the CL pass of the seventh bit to the SIG pass of the first bit are to be coded. However, the first bit is not coded because it belongs to the MR pass. Thus, in arithmetic coding, the lower-order two bits are truncated, and the value after coding becomes "$00011010100_2=212_{10}$." When inverse quantized at the midpoint, this value becomes "$00011010110_2=214_{10}$."

Figure 34:
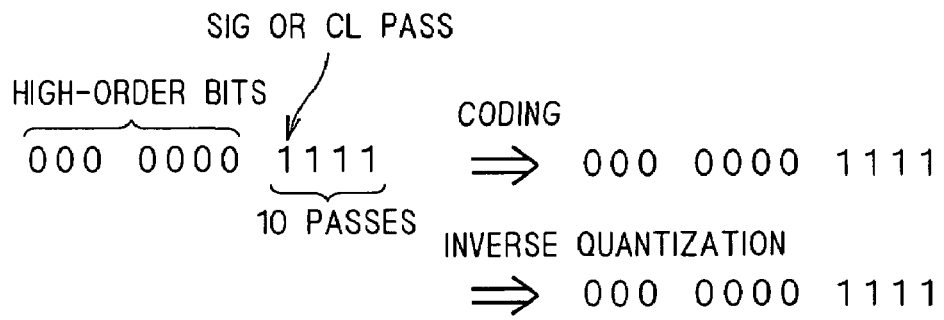

Next, FIG. 34 illustrates "$00000001111_2=15_{10}$" as one transform coefficient 53 in the subband LL5. The third bit of the transform coefficient 53 belongs to either the SIG or CL pass. The fourth to tenth high-order bits are coded in a tag tree structure when they belong to bit planes consisting only of 0 bits, whereas they are coded in either the SIG or CL pass when coding has already started with coding passes. When the third bit belongs to the first coding pass (CL pass), the lower-order bits than the third bit, including the second bit, belong to the MR pass, and a total of 10 passes ranging from the CL pass of the third bit to the CL pass of the zero-th bit are to be coded. The value after arithmetic coding is "$00000001111_2=15_{10}$", and when inverse quantized, it becomes "$00000001111_2=15_{10}$".

Figure 35:
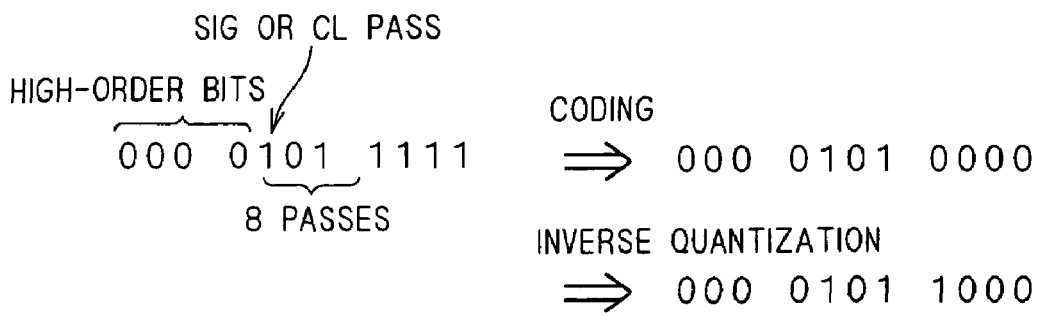
FIG. 35 is an explanatory diagram for an example of coding transform coefficients in subband HH2.

Next, FIG. 35 illustrates "$00001011111_2=95_{10}$" as one transform coefficient 53 in the subband HH2. As shown in TABLE 47, the last coding pass of the subband HH2 is the SIG pass, and the maximum number of passes is limited to 14. And, the lower-order three bit planes are truncated. The sixth bit of the transform coefficient 53 belongs to either the SIG or CL pass. The seventh to tenth high-order bits are coded in a tag tree structure when they belong to bit planes consisting only of 0 bits, whereas they are coded in either the SIG or CL pass when coding has already started with coding passes. When the sixth bit belongs to the first coding pass (CL pass), the lower-order bits than the sixth bit, including the fifth bit, belong to the MR pass. Since there is a limit that coding can be done on up to the SIG pass of the third bit plane, a total of 8 passes ranging from the CL pass of the sixth bit to the SIG pass of the third bit are to be coded; however, the third bit is not coded because it belongs to the MR pass. Thus, the value after arithmetic coding is "$00001010000_2=80_{10}$", and when inverse quantized at the midpoint, it becomes "$00001011000_2=88_{10}$".

Figure 36:
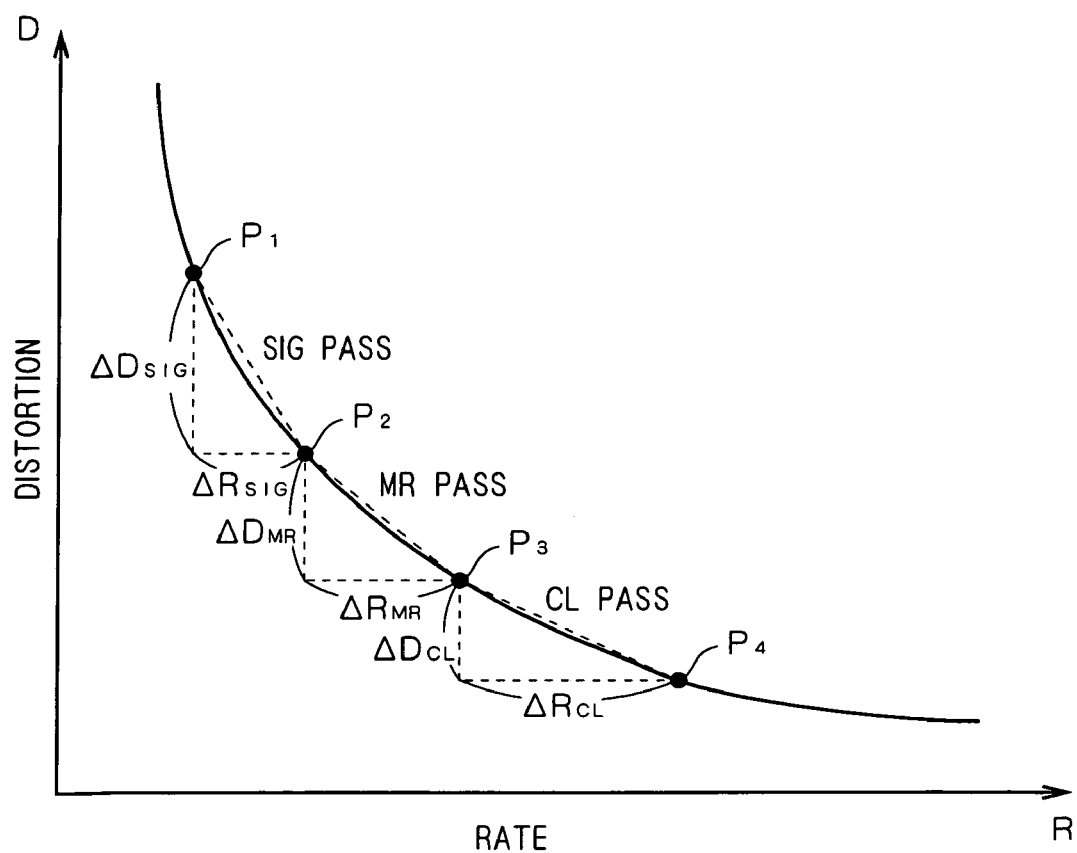
FIG. 36 shows a curve of rate-distortion characteristics.

The reason for coding each bit plane in the SIG, MR, and CL passes in this order is that it provides the highest coding efficiency against distortion in the SIG pass. FIG. 36 plots the rate-distortion characteristics in each coding pass. The portion of the R-D curve from the points $P_1$ to $P_2$ represents the SIG pass; the portion from the points $P_2$ to $P_3$ represents the MR pass; and the portion from the points $P_3$ to $P_4$ represents the CL pass. The ratios of distortion to rate $\Delta D_{SIG}/\Delta R_{SIG}$, $\Delta D_{MR}/\Delta R_{MR}$, $\Delta D_{CL}/\Delta R_{CL}$ in the respective coding passes show that the SIG pass has the steepest distortion-rate slope and thus achieves the highest coding efficiency.

As above described, in the image-quality control process according to this preferred embodiment, transform coefficients which are bit shifted according to the priorities are determined whether to be coded or not. Then, the arithmetic coding unit 41 selectively performs arithmetic coding of only a target to be coded. This allows efficient rate control in order to produce a high-quality compressed image with less distortion.

<Rate Control>

Figure 37:
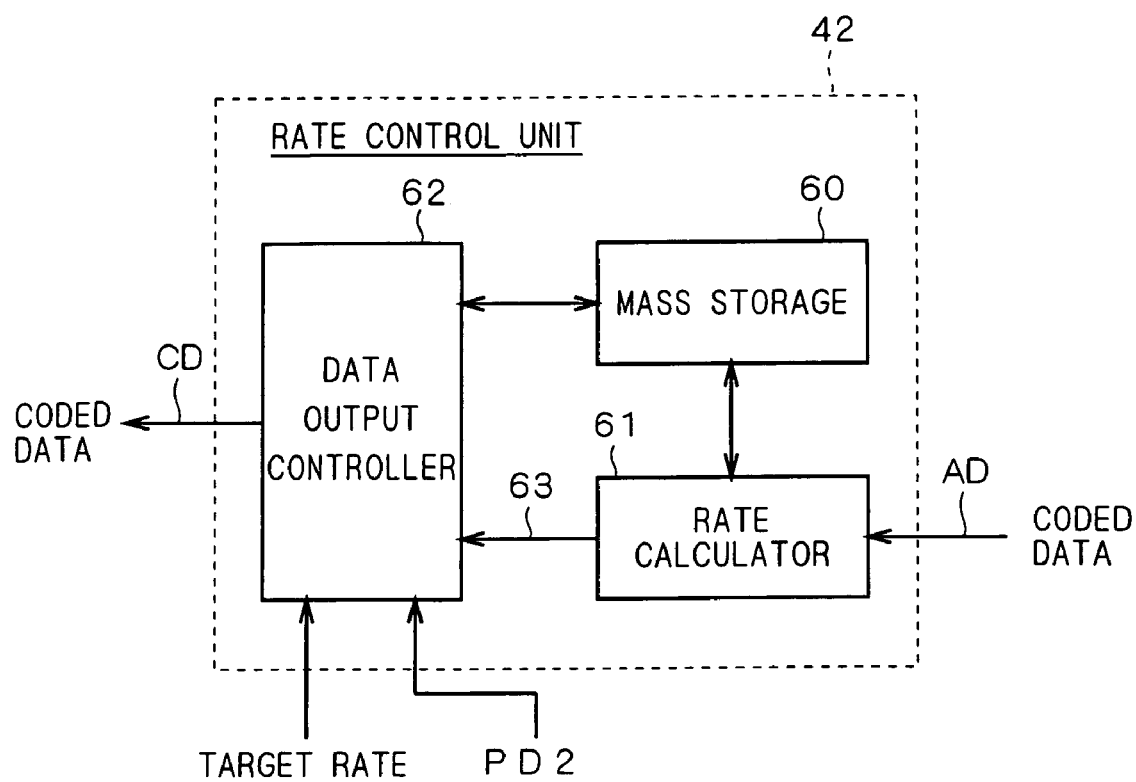
FIG. 37 is a functional block diagram showing a general configuration of a rate control unit according to the second preferred embodiment.

Next, the configuration and processing details of the rate control unit 42 shown in FIG. 24 are described. FIG. 37 is a functional block diagram showing a general configuration of the rate control unit 42.

This rate control unit 42 comprises a mass storage 60, a rate calculator 61, and a data output controller 62.

As previously described, the arithmetic coding unit 41 shown in FIG. 24 selectively performs arithmetic coding of only a target to be coded which is specified by the image-quality control unit 43, and outputs resultant coded data AD to the rate control unit 42. The rate calculator 61 calculates a subtotal of the capacity of input coded data AD on a subband-by-subband, bit-plane-by-bit-plane, or coding-pass-by-coding-pass basis and outputs resultant subtotal information 63 to the data output controller 62. The coded data AD is also temporarily stored in the mass storage 60 frame by frame or subframe by subframe.

The data output controller 62 reads out coded data AD which is temporarily stored in the mass storage 60 and performs a bit-shift operation by using the priority data PD2 according to any one of the aforementioned first through third techniques for priority setting. Then, the data output controller 62 sorts bit-shifted coded data in order of scanning described later to generate a code sequence and calculates a truncation point appropriate to a target rate from the code sequence. The data output controller 62 then outputs a part of the code sequence before the truncation point as coded data CD to the bit-stream generation unit 37.

Figure 38:
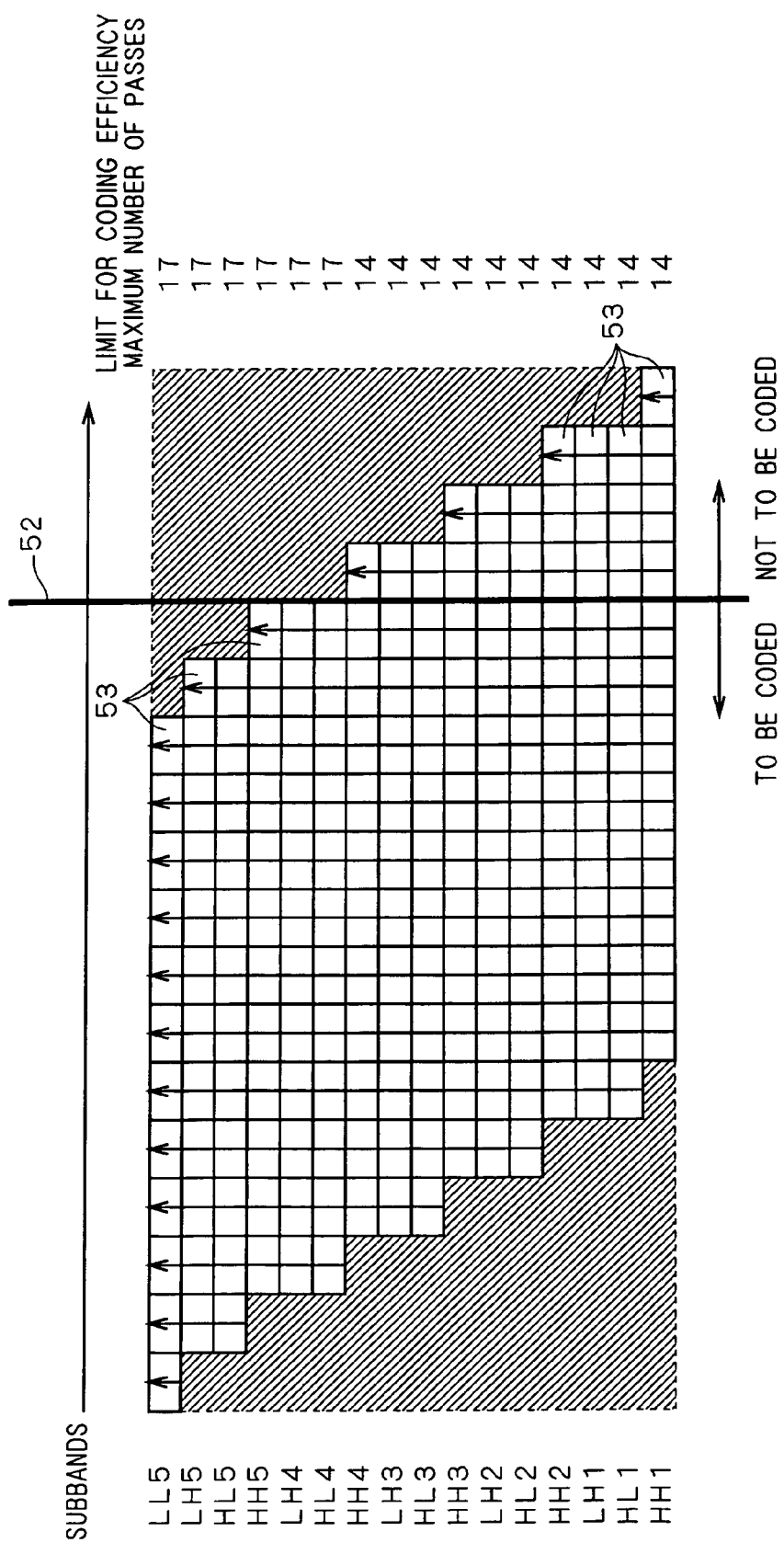
FIG. 38 is an explanatory diagram for an example of the order of scanning.
Figure 39:
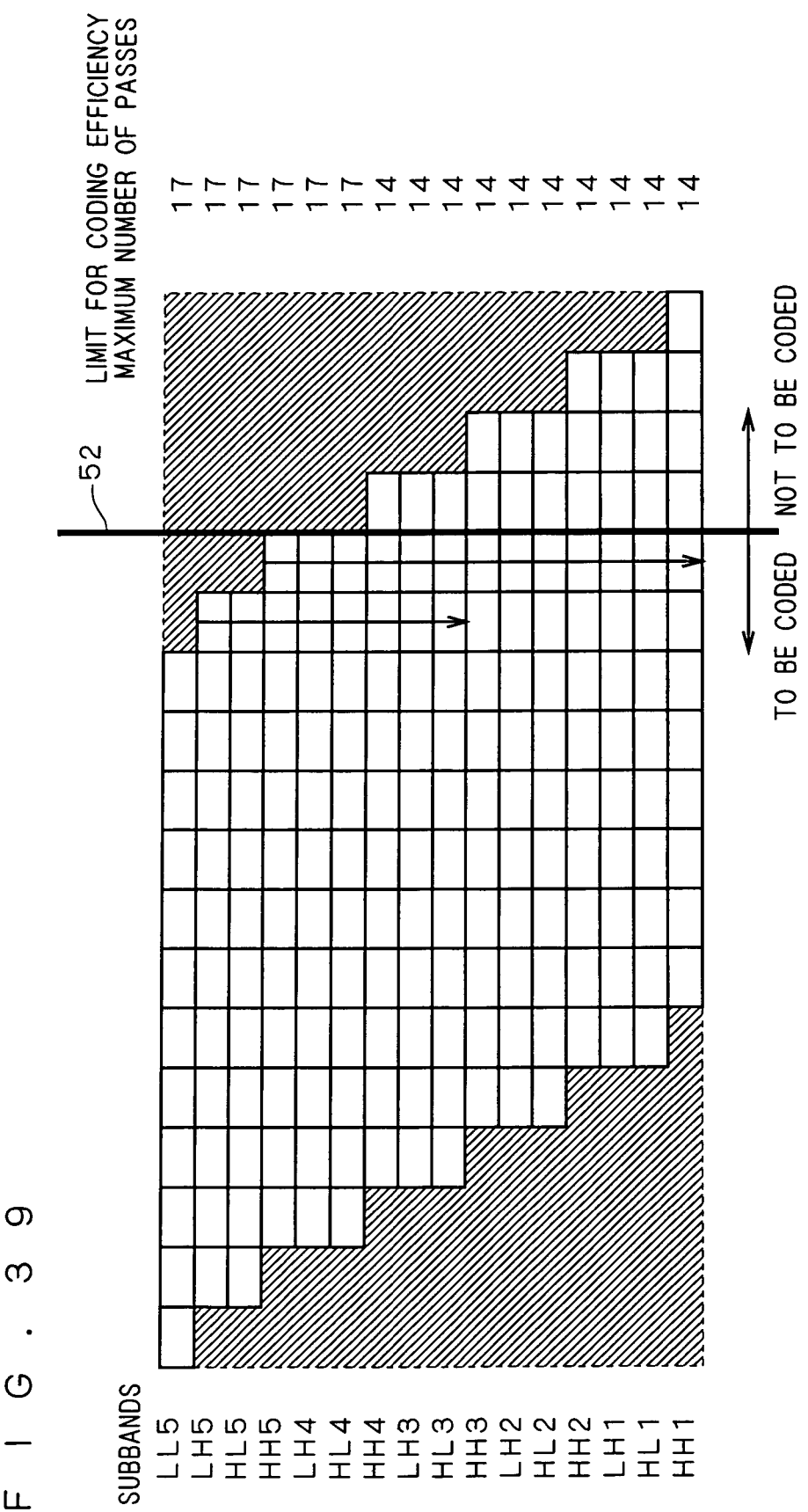
FIG. 39 is an explanatory diagram for an example of a truncation point.

FIGS. 38 and 39 are explanatory diagrams for examples of the above order of scanning and the truncation point. FIGS. 38 and 39 show transform coefficients 53 which are bit shifted according to priorities by the same rule shown in FIG. 32. The coded data AD consisting of the high-order bits on the left side of the coding end line 52 (i.e., bits on the left side of the figure) is inputted to the rate control unit 42.

As indicated by the arrows of FIG. 38, the transform coefficients 53 are sorted on a bit-plane-by-bit-plane or coding-pass-by-coding-pass basis in descending order of priority (from the most to the least significant bit) and, if the priority is the same, then in order of scanning from high pass to low pass. In general, there is a tendency that the lower the order of bit planes to be coded, the higher the ratio of the MR pass and then the lower the compression efficiency. Thus, at the same priority, the order of scanning from high pass to low pass is adopted in order to code as many SIG passes as possible and thereby to improve compression efficiency.

The data output controller 62 then determines a truncation point in order to satisfy conditions where the actual rate (number of bytes) is less than the target rate (number of bytes) as given by the following equation (16), and truncates the lower-order bit planes in the code sequence which are after the truncation point. This allows efficient rate control of arithmetically coded data according to the priorities determined for each subband.

$$(\text{Target rate(Number of bytes)}) \geq (\text{Actual rate(Number of bytes)}) \qquad (16)$$

When, as shown in FIG. 39, the second bit plane of the subband HL3 is determined as a truncation point to meet a target rate, bits indicated by the arrows are truncated.

Figure 40:
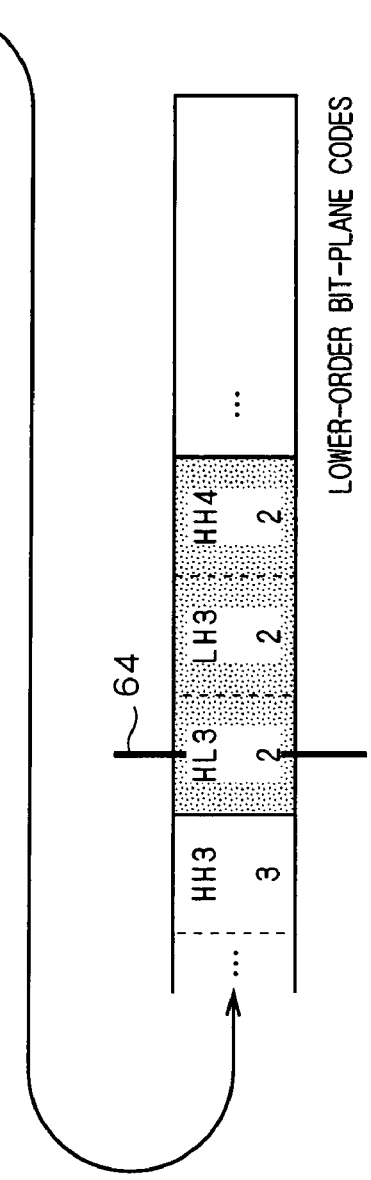
FIG. 40 shows a code sequence sorted by bit plane.

FIG. 40 illustrates a code sequence sorted by bit plane, and FIG. 41 illustrates a code sequence sorted by coding pass. In FIG. 40, each bit plane is labeled with a symbol indicating its subband such as LL5 and HL5, and with a bit-plane number such as 10 and 9. In this case, bit planes after a line 64 drawn on the second bit plane of the subband HL3 are truncated.

In FIG. 41, each bit plane is labeled with a symbol indicating its type of coding passes such as CL, SIG, and MR, with a symbol indicating its subband such as LL5 and HL5, and with a bit-plane number such as 10 and 9. In this case, bit planes after the line 64 drawn on the second bit plane of the subband HL3 in the MR pass are truncated.

In this way, the rate control process according to this preferred embodiment eliminates the necessity of calculating the amount of distortion in each coding pass for rate-distortion optimization and thereby achieves highly efficient rate control with high immediacy and with significantly reduced overhead.

Third Preferred Embodiment

<Layer Splitting>

In this preferred embodiment, the bit-stream generation unit 37 in the compression encoder 200 of the second preferred embodiment shown in FIG. 24 implements layer splitting. The configuration and operation of the compression encoder 200 and the techniques for setting priorities to be recorded in the priority table 44 are identical to those described in the second preferred embodiment, and thus not described here. The following description is given only of layer splitting based on priority, at which point this preferred embodiment is different from the second preferred embodiment.

The priority table 44 records priority information which corresponds to each of the subbands HHn, HLn, LHn, and LLn. As shown in FIG. 24, the image-quality control unit 43, the rate control unit 42, and the bit-stream generation unit 37 set priorities for each subband according to the priority data PD, PD2 and PD3 obtained from the priority table 44. More specifically, transform coefficients in each subband are shifted by the number of bits corresponding to priorities, whereby the priorities are set for each subband. In this bit-shifting process, it is not necessary to actually perform a bit-shift operation on each transform coefficient, and instead only the position of each bit of each transform coefficient should be shifted virtually. In this case, there is no change in the position of the bit plane to which each bit of each transform coefficient belongs.

Figure 42:
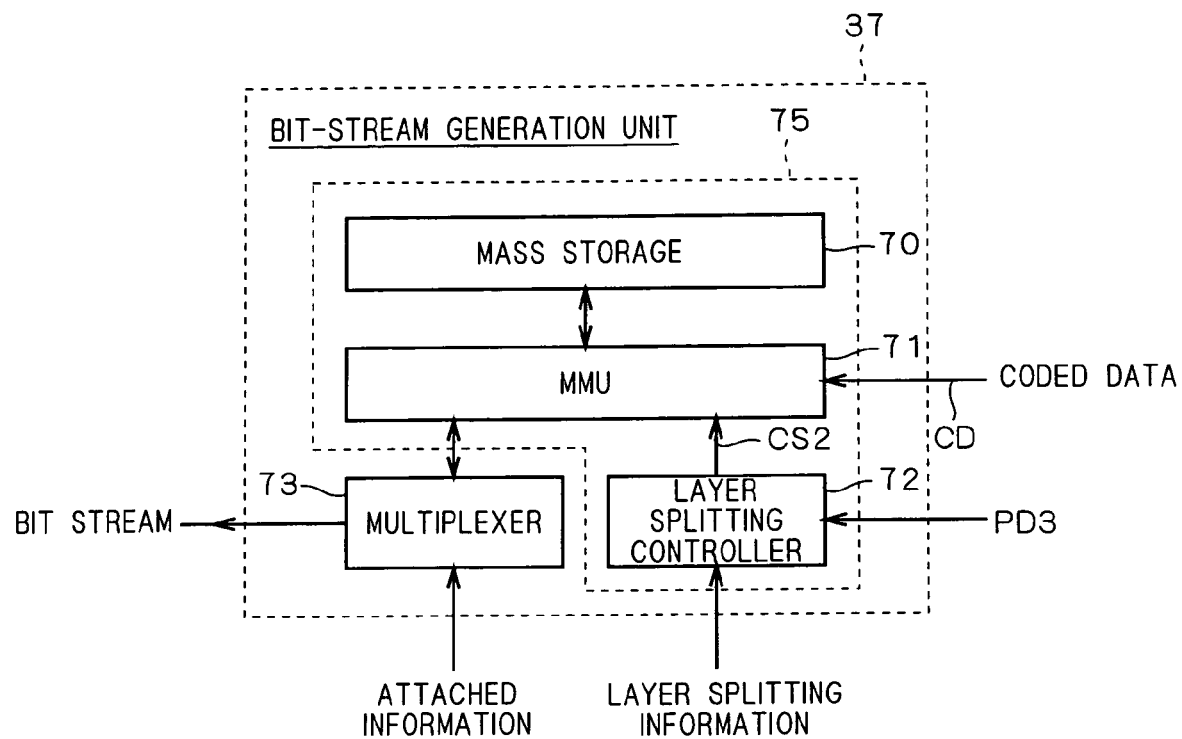
FIG. 42 is a functional block diagram showing a general configuration of a bit-stream generation unit.

FIG. 42 is a functional block diagram showing a general configuration of the bit-stream generation unit 37 shown in FIG. 24. This bit-stream generation unit 37 comprises a memory management unit (MMU) 71, a mass storage 70, a layer splitting controller 72, and a multiplexer 73. The layer splitting process according to this preferred embodiment is implemented by a layer splitting block 75 consisting of the mass storage 70, the MMU 71, and the layer splitting controller 72.

Now, all or parts of the units 70-73 in the bit-stream generation unit 37 may consist of hardware or programs that run on a microprocessor.

The layer splitting block 75 has the function of, by using the priority data PD3 obtained from the priority table 44, converting coded data CD inputted from the rate control unit 42 into a code sequence which is bit-shifted by the number of bits corresponding to priorities and dividing the code sequence into a plurality of layers (multiple layers). The multiplexer 73 multiplexes coded data outputted from the layer splitting block 75 and attached information (header information, layer structure, scalability, quantization table, etc.) to generate and output a bit stream to the outside.

Hereinbelow, the layer splitting process in the layer splitting block 75 is described. The MMU 71 temporarily stores coded data CD inputted from the rate control unit 42 in the mass storage 70. The layer splitting controller 72 obtains a data structure of the coded data CD from the MMU 71. The layer splitting controller 72 then obtains the priority data PD3 from the priority table 44 and shifts transform coefficients in each subband in the coded data CD by a predetermined number of bits in correspondence with priorities included in the priority data PD3. Thereby, the priorities are set for transform coefficients in each subband. As a method of setting priority, any one of the aforementioned first through third techniques for priority setting may be adopted.

Figure 43:
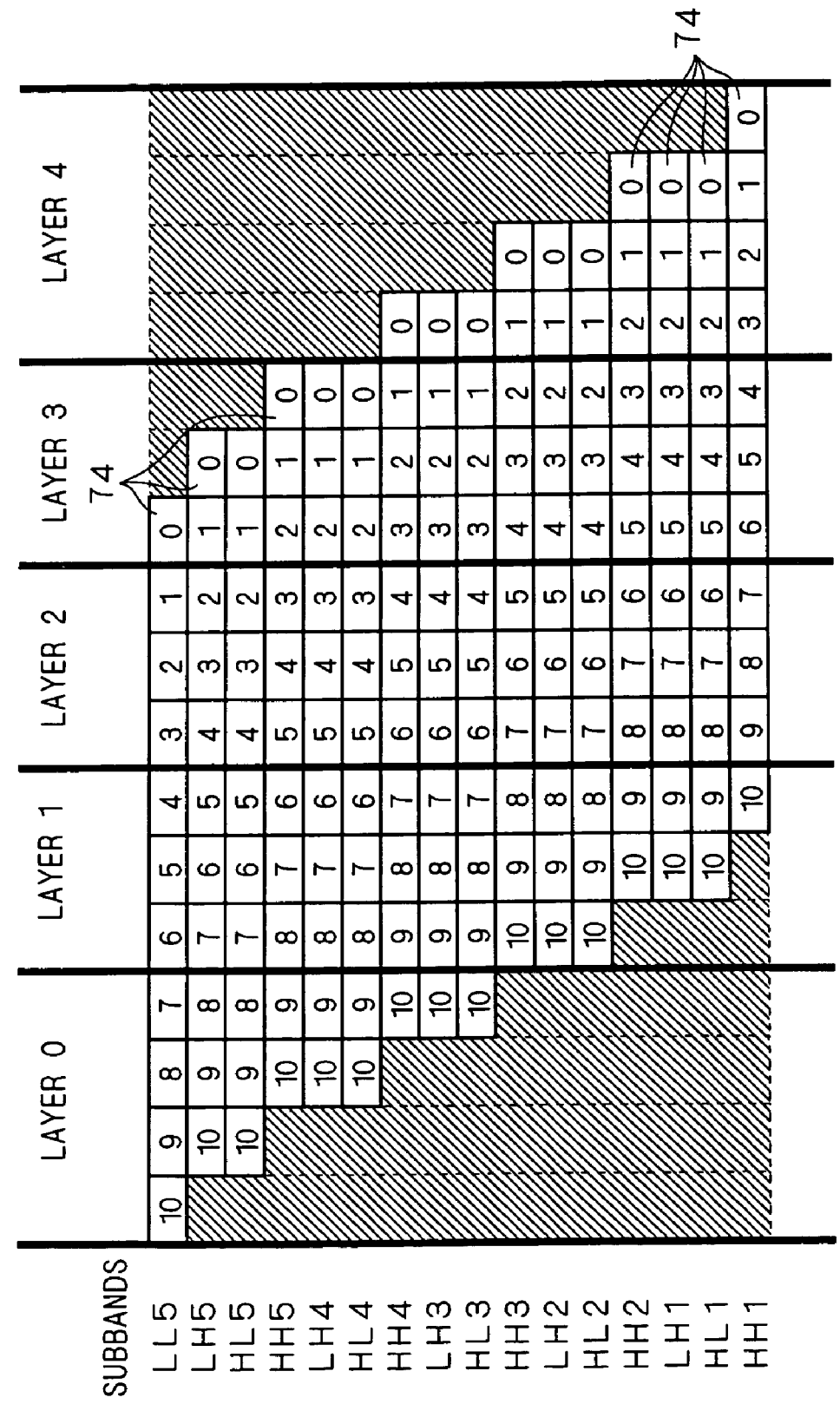
FIG. 43 is a schematic view illustrating transform coefficients which are shifted by the number of bits corresponding to priorities.

FIG. 43 is a schematic view illustrating transform coefficients 74 which are shifted by the number of bits corresponding to priorities. The transform coefficients 74 in each of the subbands LL5 through HH1 are shifted to the right or left by the number of bits corresponding to the priorities. The numbers 0 through 10 on each bit of each transform coefficient 74 indicate a number of a bit plane to which that bit belongs. Here, the least significant bit number is 0, and the most significant bit number is 10.

Then, the layer splitting controller 72 determines, according to layer splitting information, splitting positions so that bit-shifted coded data CD is grouped into a plurality of layers on a bit-plane-by-bit-plane or coding-pass-by-coding-pass basis. The layer splitting information includes selection information for selecting either a single layer or multiple layers, and information for specifying layer splitting positions on a bit-plane-by-bit-plane or coding-pass-by-coding-pass basis. In the example of FIG. 43, splitting positions are shown at which the coded data CD is divided into five layers 0 through 4 on a bit-plane-by-bit-plane basis. Then, the layer splitting controller 72 supplies to the MMU 71 the control signal CS2 for reading out the coded data CD layer by layer according to the splitting positions. The MMU 71, according to the control signal CS2, sequentially reads out the coded data CD stored in the mass storage 70 from the highest- to the lowest-order layer and outputs to the multiplexer 73.

It should be noted here that the mass storage 70 and the MMU 71 do not necessarily have to be incorporated within the bit-stream generation unit 37, and instead may be incorporated within the compression encoder 200 in such a form that they can be shared with other functional blocks.

In the aforementioned layer splitting process, priorities are set by shifting transform coefficients by the number of bits corresponding to the priorities. Splitting bit-shifted transform coefficients into multiple layers in this way allows efficient generation of multiple layers on a bit-plane-by-bit-plane or coding-pass-by-coding-pass basis, so as to reduce distortion for a given rate. Accordingly, it is not necessarily required to use the aforementioned R-D optimization in the layer splitting process, so that layer splitting with high immediacy is allowed in order to reduce distortion.

While the invention has been shown and described in detail, the foregoing description is in all aspects illustrative and not restrictive. It is therefore understood that numerous modifications and variations can be devised without departing from the scope of the invention.

What is claimed is:

1. A compression encoder for compressing and coding an image signal, comprising:
    a wavelet transformer for recursively dividing an image signal into high- and low-pass components by wavelet transform and generating and outputting transform coefficients in a plurality of bandpass components;
    an image-quality controller for determining a quantization step size by dividing a quantization parameter which indicates target image quality by a norm of a synthesis filter coefficient; and
    a quantizer for quantizing said transform coefficients with said quantization step size.

2. The compression encoder according to claim 1, wherein said image-quality controller includes a unit for, in determining said quantization step size, applying weighting in consideration of human visual characteristics by dividing said quantization parameter by a value obtained by multiplying a norm of a synthesis filter coefficient by an energy weighting factor which is a predetermined value determined based on the human visual characteristics.

3. The compression encoder according to claim 1, wherein said image-quality controller includes a unit for, when said quantization step size is less than a predetermined value, multiplying said quantization step size by powers of 2 so that said quantization step size is not less than said predetermined value.

4. A compression encoder for compressing and coding an image signal, comprising:
a wavelet transformer for recursively dividing an image signal into high- and low-pass components by wavelet transform and generating and outputting transform coefficients in a plurality of bandpass components;
an image-quality controller for determining a quantization step size by dividing a quantization parameter which indicates target image quality by a norm of a synthesis filter coefficient;
an entropy coder for entropy coding said transform coefficients; and
a rate controller for controlling a rate by sorting coded data which is outputted from said entropy coder by said quantization step size to generate a code sequence and then by truncating part of said code sequence so that a total capacity of said coded data meets a target rate.

5. The compression encoder according to claim 4, wherein said image-quality controller includes a unit for, in determining said quantization step size, applying weighting in consideration of human visual characteristics by dividing said quantization parameter by a value obtained by multiplying said norm of said synthesis filter coefficient by an energy weighting factor which is a predetermined value determined based on the human visual characteristics.

6. The compression encoder according to claim 4, wherein said image-quality controller includes a unit for, when said quantization step size is less than a predetermined value, multiplying said quantization step size by powers of 2 so that said quantization step size is not less than said predetermined value.

7. The compression encoder according to claim 6, wherein said rate controller includes a unit for, when said quantization step size used in sorting coded data to generate a code sequence is a value obtained by multiplication by powers of 2 in said image-quality controller, shifting said coded data which has been quantized with said quantization step size, by the number of bits corresponding to an exponent of said powers of 2.

8. A compression encoder for compressing and coding an image signal, comprising:
a wavelet transformer for recursively dividing an image signal into high- and low-pass components by wavelet transform and generating and outputting transform coefficients in a plurality of bandpass components;
an entropy coder for selectively entropy coding only a target to be coded which is specified from said transform coefficients; and
an image-quality controller for setting a priority for each of said bandpass components according to the number of recursive divisions into said low-pass components and for determining said target to be coded which is provided to said entropy coder, according to said priority.

9. The compression encoder according to claim 8, wherein said image-quality controller includes a unit for, in setting said priority, applying weighting in consideration of human visual characteristics.

10. The compression encoder according to claim 8, wherein said image-quality controller includes a unit for determining said target to be coded from transform coefficients in each of said bandpass components which are shifted by the number of bits corresponding to said priority.

11. The compression encoder according to claim 8, further comprising:
a coefficient bit modeling unit for generating coded data by decomposing said transform coefficients outputted from said wavelet transformer into a plurality of bit planes each constituting a two-dimensional array of respective one bits of said transform coefficients and by decomposing said bit planes into coding passes according to the significance of said respective one bits,
wherein said entropy coder includes a unit for selectively entropy coding only said target to be coded which is specified from said coded data generated by said coefficient bit modeling unit.

12. The compression encoder according to claim 11, wherein said image-quality controller includes a unit for determining said target to be coded in units of said bit planes.

13. The compression encoder according to claim 11, wherein said image-quality controller includes a unit for determining said target to be coded in units of said coding passes.

14. The compression encoder according to claim 11, further comprising:
a rate controller for controlling a rate of coded data outputted from said entropy coder, said rate controller including:
a rate calculator for calculating a subtotal of a capacity of coded data outputted from said entropy coder in units of at least one of said bandpass components, said bit planes, and said coding passes; and
a data output controller for, by using said subtotal obtained by said rate calculator, calculating a truncation point appropriate to a target rate from a code sequence which is generated by sorting said coded data in a predetermined order of scanning, and for outputting part of said code sequence which is before said truncation point.

15. The compression encoder according to claim 14, wherein said data output controller includes a unit for generating said code sequence by sorting said transform coefficients in descending order of said priority and, if said priority is the same, then in said predetermined order of scanning from high-pass to low-pass.

16. A compression encoder for coding an image signal by splitting into a plurality of layers, comprising:
a wavelet transformer for recursively dividing an image signal into high- and low-pass components by wavelet transform and generating and outputting transform coefficients in a plurality of bandpass components; and
a layer splitter for bit shifting said transform coefficients in each of said bandpass components by the number of bits corresponding to a priority which is determined by the number of recursive divisions into said low-pass components, and for dividing said transform coefficients which have been bit shifted into a plurality of layers.

17. The compression encoder according to claim 16, wherein
said layer splitter includes a unit for, in setting said priority, applying weighting in consideration of human visual characteristics.

18. The compression encoder according to claim 16, further comprising:
a coefficient bit modeling unit for generating coded data by decomposing said transform coefficients outputted from said wavelet transformer into a plurality of bit planes each constituting a two-dimensional array of respective one bits of said transform coefficients and by decomposing said bit planes into coding passes according to the significance of said respective one bits, wherein said layer splitter includes a unit for bit shifting a code sequence outputted from said coefficient bit modeling unit and for dividing said code sequence which has been bit shifted into a plurality of layers.

19. A compression encoding method in a compression encoder for compressing and coding an image signal, comprising the steps of:
(a) recursively dividing in the compression encoder an image signal into high- and low-pass components by wavelet transform and generating and outputting transform coefficients in a plurality of bandpass components;
(b) determining a quantization step size in the compression encoder by dividing a quantization parameter which indicates target image quality by a norm of a synthesis filter coefficient; and
(c) quantizing said transform coefficients in the compression encoder with said quantization step size.

20. The compression encoding method according to claim 19, wherein
said step (b) includes the step of, in determining said quantization step size, applying weighting in consideration of human visual characteristics by dividing said quantization parameter by a value obtained by multiplying a norm of a synthesis filter coefficient by an energy weighting factor which is a predetermined value determined based on the human visual characteristics.

21. The compression encoding method according to claim 19, wherein
said step (b) includes the step of:
(b-1) when said quantization step size is less than a predetermined value, multiplying said quantization step size by powers of 2 so that said quantization step size is not less than said predetermined value.

22. A compression encoding method in a compression encoder for compressing and coding an image signal, comprising the steps of:
(a) recursively dividing an image signal in the compression encoder into high- and low-pass components by wavelet transform and generating and outputting transform coefficients in a plurality of bandpass components;
(b) determining a quantization step size in the compression encoder by dividing a quantization parameter which indicates target image quality by a norm of a synthesis filter coefficient;
(c) entropy coding said transform coefficients in the compression encoder; and
(d) controlling a rate in the compression encoder by sorting coded data obtained in said step (c) by said quantization step size to generate a code sequence and then by truncating part of said code sequence so that a total capacity of said coded data meets a target rate.

23. The compression encoding method according to claim 22, wherein
said step (b) includes the step of, in determining said quantization step size, applying weighting in consideration of human visual characteristics by dividing said quantization parameter by a value obtained by multiplying said norm of said synthesis filter coefficient by an energy weighting factor which is a predetermined value determined based on the human visual characteristics.

24. The compression encoding method according to claim 22, wherein
said step (b) includes the step of:
(b-1) when said quantization step size is less than a predetermined value, multiplying said quantization step size by powers of 2 so that said quantization step size is not less than said predetermined value.

25. The compression encoding method according to claim 24, wherein
said step (d) includes the step of, when said quantization step size used in sorting coded data to generate a code sequence is obtained in said step (b-1), shifting said coded data by the number of bits corresponding to an exponent of said powers of 2.

26. A compression encoding method in a compression encoder for compressing and coding an image signal, comprising the steps of:
(a) recursively dividing an image signal in the compression encoder into high- and low-pass components by wavelet transform and generating and outputting transform coefficients in a plurality of bandpass components;
(b) selectively entropy coding only a target to be coded which is specified from said transform coefficients in the compression encoder; and
(c) setting a priority for each of said bandpass components in the compression encoder according to the number of recursive divisions into said low-pass components and determining said target to be coded which is specified in said step (b) according to said priority.

27. The compression encoding method according to claim 26, wherein
said step (c) includes the step of, in setting said priority, applying weighting in consideration of human visual characteristics.

28. The compression encoding method according to claim 26, wherein
said step (c) includes the step of determining said target to be coded from transform coefficients in each of said bandpass components which are shifted by the number of bits corresponding to said priority.

29. The compression encoding method according to claim 26, further comprising the step of:
(d) generating coded data in the compression encoder by decomposing said transform coefficients generated in said step (a) into a plurality of bit planes each constituting a two-dimensional array of respective one bits of said transform coefficients and by decomposing said bit planes into coding passes according to the significance of said respective one bits,
said step (d) being performed after said step (a) and before said step (b),
said step (b) includes the step of selectively entropy coding only said target to be coded which is specified from said coded data generated in said step (d).

30. The compression encoding method according to claim 29, wherein
said step (c) includes the step of determining said target to be coded in units of said bit planes.

31. The compression encoding method according to claim 29, wherein
said step (c) includes the step of determining said target to be coded in units of said coding passes.

32. The compression encoding method according to claim 29, further comprising the step of:
(e) in the compression encoder, controlling a rate of coded data which has been entropy-coded in said step (b),
said step (e) including the steps of:
(e-1) calculating a subtotal of a capacity of coded data which has been entropy coded in said step (b) in units of at least one of said bandpass components, said bit planes, and said coding passes; and
(e-2) by using said subtotal obtained in said step (e-1), calculating a truncation point appropriate to a target rate from a code sequence which is generated by sorting said coded data in a predetermined order of scanning, and then outputting part of said code sequence which is before said truncation point.

33. The compression encoding method according to claim 32, wherein
said step (e-2) includes the step of generating said code sequence by sorting said transform coefficients in descending order of said priority, and if said priority is the same, then in said predetermined order of scanning from high-pass to low-pass.

34. A compression encoding method in a compression encoder for coding an image signal by splitting into a plurality of layers, comprising the steps of:
(a) recursively dividing an image signal in the compression encoder into high- and low-pass components by wavelet transform and generating and outputting transform coefficients in a plurality of bandpass components; and
(b) bit shifting said transform coefficients in the compression encoder in each of said bandpass components by the number of bits corresponding to a priority which is determined by the number of recursive divisions into said low-pass components, and dividing said transform coefficients which have been bit shifted into a plurality of layers.

35. The compression encoding method according to claim 34, wherein
said step (b) includes the step of bit shifting said transform coefficients by using said priority to which weighting is applied in consideration of human visual characteristics.

36. The compression encoding method according to claim 34, further comprising the step of:
(c) generating coded data in the compression encoder by decomposing said transform coefficients generated in said step (a) into a plurality of bit planes each constituting a two-dimensional array of respective one bits of said transform coefficients and by decomposing said bit planes into coding passes according to the significance of said respective one bits,
said step (c) being performed after said step (a) and before said step (b),
said step (b) including the step of bit shifting coded data generated in said step (c) and dividing said coded data which has been bit shifted into a plurality of layers.

37. A computer-readable medium storing a program for compressing and coding an image signal, said program being executed on a microprocessor to perform a method, comprising:
recursively dividing an image signal into high- and low-pass components by wavelet transform and generating and outputting transform coefficients in a plurality of bandpass components;
determining a quantization step size by dividing a quantization parameter which indicates target image quality by a norm of a synthesis filter coefficient; and
quantizing said transform coefficients with said quantization step size.

38. The computer-readable medium according to claim 37, wherein
determining said quantization step size comprises applying weighting in consideration of human visual characteristics by dividing said quantization parameter by a value obtained by multiplying a norm of a synthesis filter coefficient by an energy weighting factor which is a predetermined value determined based on the human visual characteristics.

39. The computer-readable medium according to claim 37, wherein said method comprises:
when said quantization step size is less than a predetermined value, multiplying said quantization step size by powers of 2 so that said quantization step size is not less than said predetermined value.

40. A computer-readable medium storing a program for compressing and coding an image signal, said program being executed on a microprocessor to perform a method, comprising:
recursively dividing an image signal into high- and low-pass components by wavelet transform and generating and outputting transform coefficients in a plurality of bandpass components;
determining a quantization step size by dividing a quantization parameter which indicates target image quality by a norm of a synthesis filter coefficient;
entropy coding said transform coefficients; and
controlling a rate by sorting coded data obtained by said entropy coding by said quantization step size to generate a code sequence and then by truncating part of said code sequence so that a total capacity of said coded data meets a target rate.

41. The computer-readable medium according to claim 40, wherein
determining said quantization step size comprises applying weighting in consideration of human visual characteristics by dividing said quantization parameter by a value obtained by multiplying a norm of a synthesis filter coefficient by an energy weighting factor which is a predetermined value determined based on the human visual characteristics.

42. The computer-readable medium according to claim 40, wherein said method comprises:
when said quantization step size is less than a predetermined value, multiplying said quantization step size by powers of 2 so that said quantization step size is not less than said predetermined value.

43. The computer-readable medium according to claim 42, wherein said method comprises:
when said quantization step size used in sorting coded data to generate a code sequence is a value obtained by multiplication by powers of 2 in said image-quality controller, shifting said coded data which has been quantized with said quantization step size by the number of bits corresponding to an exponent of said powers of 2.

44. A computer-readable medium storing a program for compressing and coding an image signal, said program being executed on a microprocessor to perform a method, comprising:

recursively dividing an image signal into high- and low-pass components by wavelet transform and generating and outputting transform coefficients in a plurality of bandpass components;

selectively entropy coding only a target to be coded which is specified from said transform coefficients; and setting a priority for each of said bandpass components according to the number of recursive divisions into said low-pass components and for determining said target to be coded which is provided to said entropy coding, according to said priority.

45. The computer-readable medium according to claim 44, wherein setting said priority comprises applying weighting in consideration of human visual characteristics.

46. The computer-readable medium according to claim 44, wherein said method comprises:

determining said target to be coded from transform coefficients in each of said bandpass components which are shifted by the number of bits corresponding to said priority.

47. The computer-readable medium according to claim 44, wherein said method comprises:

generating coded data by decomposing said transform coefficients into a plurality of bit planes each constituting a two-dimensional array of respective one bits of said transform coefficients and by decomposing said bit planes into coding passes according to the significance of said respective one bits, and selectively entropy coding only said target to be coded which is specified from said coded data.

48. The computer-readable medium according to claim 47, wherein said method comprises:

determining said target to be coded in units of said bit planes.

49. The computer-readable medium according to claim 47, wherein said method comprises:

determining said target to be coded in units of said coding passes.

50. The computer-readable medium according to claim 47, wherein said method comprises:

controlling a rate of coded data obtained by said entropy coding, and calculating a subtotal of a capacity of coded data obtained by said entropy coding in units of at least one of said bandpass components, said bit planes, and said coding passes; and using said subtotal obtained by said calculating, calculating a truncation point appropriate to a target rate from a code sequence which is generated by sorting said coded data in a predetermined order of scanning, and for outputting part of said code sequence which is before said truncation point.

51. The computer-readable medium according to claim 50, wherein said method comprises:

generating said code sequence by sorting said transform coefficients in descending order of said priority and, if said priority is the same, then in said predetermined order of scanning from high pass to low pass.

52. A computer-readable medium storing program for coding an image signal by splitting into a plurality of layers, said program being executed on a microprocessor to perform a method, comprising:

recursively dividing an image signal into high- and low-pass components by wavelet transform and generating and outputting transform coefficients in a plurality of bandpass components; and bit shifting said transform coefficients in each of said bandpass components by the number of bits corresponding to a priority which is determined by the number of recursive divisions into said low-pass components, and for dividing said transform coefficients which have been bit shifted into a plurality of layers.

53. The computer-readable medium according to claim 52, wherein using said priority to which weighting is applied in consideration of human visual characteristics.

54. The computer-readable medium according to claim 52, wherein said method comprises:

generating coded data by decomposing said transform coefficients into a plurality of bit planes each constituting a two-dimensional array of respective one bits of said transform coefficients and by decomposing said bit planes into coding passes according to the significance of said respective one bits, bit shifting a code sequence and dividing said code sequence which has been bit shifted into a plurality of layers.

* * * * *